(12) United States Patent
Farrag et al.

(10) Patent No.: US 7,881,340 B2
(45) Date of Patent: Feb. 1, 2011

(54) DECENTRALIZED MEDIA ACCESS CONTROL FOR AD-HOC MOBILE WIRELESS NETWORK

(75) Inventors: Osama I. Farrag, Germantown, MD (US); William P. D'Amico, Baltimore, MD (US); Lotfi Benmohamed, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 748 days.

(21) Appl. No.: 11/876,087

(22) Filed: Oct. 22, 2007

(65) Prior Publication Data

US 2009/0103501 A1    Apr. 23, 2009

(51) Int. Cl.
*H04J 3/16* (2006.01)
(52) U.S. Cl. .................................... 370/468
(58) Field of Classification Search .............. 370/229, 370/230, 252, 310, 254, 468, 445, 447, 235, 370/348, 294
See application file for complete search history.

(56) References Cited

U.S. PATENT DOCUMENTS

| | | | |
|---|---|---|---|
| 5,513,210 A | 4/1996 | Vook et al. | |
| 6,028,853 A | 2/2000 | Haartsen | |
| 6,594,273 B1 | 7/2003 | McGibney | |
| 6,788,670 B1 | 9/2004 | Larsson | |
| 6,788,702 B1 | 9/2004 | Garcia-Luna-Aceves et al. | |
| 6,791,997 B2 | 9/2004 | Beyer et al. | |
| 6,807,146 B1 | 10/2004 | McFarland | |
| 6,807,165 B2 | 10/2004 | Belcea | |
| 6,842,460 B1 | 1/2005 | Olkkonen et al. | |
| 6,873,839 B2 | 3/2005 | Stanforth | |
| 6,928,061 B1 | 8/2005 | Garcia-Luna-Aceves et al. | |
| 6,961,575 B2 | 11/2005 | Stanforth | |
| 6,990,087 B2 | 1/2006 | Rao et al. | |
| 7,027,462 B2 | 4/2006 | Benveniste | |
| 2006/0034233 A1 | 2/2006 | Strutt et al. | |
| 2006/0050742 A1 | 3/2006 | Grandhi et al. | |
| 2006/0050826 A1 | 3/2006 | Date et al. | |
| 2006/0067280 A1 | 3/2006 | Howard et al. | |
| 2006/0068820 A1* | 3/2006 | Sugaya et al. ............... 455/512 |
| 2009/0067389 A1* | 3/2009 | Lee et al. .................... 370/336 |

* cited by examiner

*Primary Examiner*—Kwang B Yao
*Assistant Examiner*—Anh Ngoc Nguyen
(74) *Attorney, Agent, or Firm*—Albert J. Fasulo, II

(57) ABSTRACT

A method of operating a decentralized ad-hoc wireless network including wireless stations, comprises establishing a common time reference which is used by the wireless stations to share access to a common wireless channel, the common time reference having a periodic superframe structure including a Scheduled Beacon Period, a Contended Beacon Period, Contention Periods (CPs) and Contention Free Periods (CFPs). The method further comprises time-scheduling, using wireless communication between the wireless stations, the CFPs in the SBTT interval to at least some of the wireless stations requesting access to the CFPs, and granting access to the CPs to at least some of the wireless stations requesting access to the CPs.

25 Claims, 17 Drawing Sheets

CPs and CFPs within D²QMAC Superframe

CPs and CFPs within D²QMAC Superframe

D²QMAC Superframe Structure with Inter-Frame Space Intervals timing

D2QMAC Management Frame Format

Frame Control Field Format

CFP RTS/CTS Control Frame Format

Channel Resource Management frames format

Finite State Machine D²QMAC CRAM Function Dynamic Team Management

Three Nodes IBSS Join Exchange Enhances Beacon Schedule Synchronization Probability by Expanding the Geospatial Coverage Establishing New IBSS while Preserving CFP Timing Figure 11 IBSS Three Nodes CF Period Reservation Exchange Figure 12 CFPS synchronization process during reception of CF-RSV-REQ Frames Figure 13 CFPS synchronization process during reception of CF-RSV_RSP frames Figure 14 Decentralized CFPS Synchronization process during Beacon Reception Figure 15 Decentralized IBS synchronization process for Beacon reception

DECENTRALIZED MEDIA ACCESS CONTROL FOR AD-HOC MOBILE WIRELESS NETWORK

STATEMENT OF GOVERNMENTAL INTEREST

This invention was made with U.S. Government Support under NAVSEA Contract No. N00024-03-D-6606. The U.S. Government has certain rights in this invention.

CROSS REFERENCE TO RELATED APPLICATIONS

This application is related to U.S. Provisional Application No. 60/851,111, filed Oct. 12, 2006, which is incorporated herein in its entirety by reference.

BACKGROUND OF THE INVENTION

1. Field of the Invention

The present invention relates generally to wireless networks.

2. Description of the Related Art

Known networks disadvantageously generally require a dedicated or central control node established apriori for managing resources in and access to the network, in addition to inflexible methods tied to the use of such an apriori infrastructure. IEEE 802.11 standard and many other standard Wireless Local Area Networks (WLANs) use Carrier Sense Multiple Access/Collision Avoidance (CSMA/CA) technology. The collision avoidance mechanism employed by CSMA/CA adopts a random back-off period prior to each transmission. The random nature of the back-off reduces but does not eliminate the probability of collisions. In order to detect and recover from collisions, an acknowledgment mechanism must be used with each transmitted message; and for each retransmit attempt, the back-off period is randomly selected from an expanded contention time window using a binary exponential back-off scheme. Many published studies have shown that these random back-off and collision recovery schemes significantly compromise the performance of CSMA/CA WLANs in terms of access delay, delay jitter, and network throughput particularly as the number of stations and offered load increases. There is a need to for a more flexible and self-forming network and methods associated therewith that avoid the aforementioned drawbacks.

SUMMARY OF THE INVENTION

Embodiments of the present invention present Decentralized Deterministic Quality of Service (QoS) Media Access Control (MAC) for CSMA/CA Based Mobile Wireless LANs ($D^2QMAC$) (also referred to as D2MAC), a purely decentralized method to improve upon CSMA/CA Medium Access Control systems. It allows any number of mobile stations to self-organize and collaborate in managing the resources of a common channel in order to support dynamic reservation of periodic Contention Free Periods (CFP) to provide deterministic Quality of Service (QoS) for admitted traffic. In this scheme, each CFP is assigned to a specific station and the channel bandwidth is partitioned into periodic non-contiguous contention and contention free periods, or time slots. In addition to supporting deterministic QoS, $D^2QMAC$ contention free periods may be exploited by Mobile Ad Hoc Networks (MANET) routing protocols to improve TCP throughput over multi-hop connections and increase the capacity of these networks by reducing exposed node induced congestion, a known problem in CSMAICA based MANET.

An embodiment of the present invention includes a method of operating a decentralized ad-hoc wireless network including wireless stations, each of the wireless stations including a wireless transceiver configured to wirelessly communicate with each of the other wireless stations over a common wireless channel, comprising:

establishing, through wireless communication between the wireless stations, a common time reference among the wireless stations, which is used by the wireless stations to share access to the common wireless channel, the common time reference having a periodic superframe structure based on a repeating Scheduled Beacon Transmit Time (SBTT) interval, the SBTT interval including a Scheduled Beacon Period near a start time of the SBTT interval during which only one of the wireless stations is scheduled to transmit a Scheduled Beacon Message to all of the other wireless mobile stations, the Scheduled Beacon Message including wireless network information used by the wireless stations for managing the wireless mobile terminals in the ad-hoc network and controlling access of the mobile terminals to the shared channel, a Contended Beacon Period, following the Scheduled Beacon Period, during which each of the wireless stations that failed to receive the Scheduled Beacon Message, if any, transmits a respective Contended Beacon Message in contention with any of the other mobile stations that also failed to receive the Scheduled Beacon Message, and following the Contended Beacon Period, Contention Periods (CPs) during each of which the wireless stations may contend with each other for access to the common wireless channel for communication with each other over the common wireless channel, and Contention Free Periods (CFPs) during each of which only one of the wireless stations is scheduled for access to the common wireless channel for communication with each other over the common wireless channel;

granting access, using wireless communication between the wireless stations, to CPs in the SBTT interval to at least some of the wireless stations requesting access to the CPs; and time-scheduling, using wireless communication between the wireless stations, the CFPs in the SBTT interval to at least some of the wireless stations requesting access to the CFPs.

Another embodiment of the present invention includes a network, comprising at least one Independent Basic Service Set (IBSS), where an IBSS includes member wireless communication stations (WSs) that share access to a common wireless channel, the WSs including one or more Channel Resources Allocation and Management (CRAM) stations that each perform CRAM functions, the CRAM stations including an initiator WS (IWS) that initially formed the IBSS, and non-CRAM stations, if any, that do not perform CRAM functions, wherein the CRAM functions include:

establishing, through wireless inter-communication with the other CRAM stations over the wireless channel, a common time reference for the IBSS including a repeating SBTT interval, the SBTT interval including a period for a Beacon Message during which only one of the wireless stations is scheduled to transmit a Beacon Message, Contention Free Periods (CFPs) during which only one of the wireless stations is scheduled for non-contended access to the wireless channel, Contention Periods (CPs) during which the wireless stations may contend with each other for access to the wireless channel; transmitting a Beacon Message including an IBSS Beacon Schedule (IBS) identifying the CRAM stations and an order in which they are to transmit their respective Beacon Messages in successive SBTT intervals, and a Contention Free Period Schedule (CFPS) that defines a timing of the CFPs in the current SBTT interval, and identities of the wireless stations allocated thereto; and scheduling WSs to the CFPs, wherein each CRAM station performs the CRAM functions only when it is no more than a first predetermined number of hops away from the IWS and no more than a second predetermined number of hops away from at least one other of the CRAM stations.

Further embodiments, including related methods and systems, will become apparent to one of ordinary skill in the relevant arts having read the present application.

BRIEF DESCRIPTION OF THE DRAWINGS

Various embodiments are described below with reference to the drawings

Figure 1:
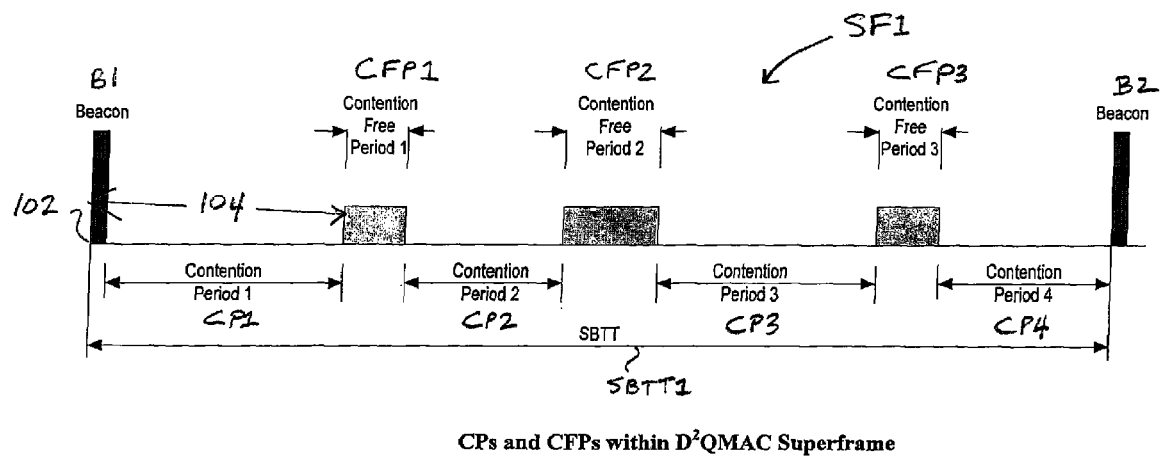
FIG. 1 is an illustration of CPs and CFPs within an example D2QMAC Superframe.

DETAILED DESCRIPTION OF EMBODIMENT(S) INCLUDING THE FIGS.

1. Introduction

IEEE 802.11 standard made Carrier Sense Multiple Access/Collision Avoidance (CSMA/CA) technology the preferred method for building Wireless Local Area Networks (WLANs). In particular, research and experiments for Mobile Ad hoc Networks (MANET) over the last several years has relied on simulation or wireless communication devices using IEEE 802.11 CSMA/CA MAC. MANET protocols allow impromptu setup of wireless network between mobile devices without requiring setup of infrastructure equipment nor any human planning or intervention. Rapid advances in hardware allowed development of low cost computing, memory, and wireless communication chipsets which enabled low cost manufacture of very small battery operated computing devices such as PDAs, and tiny disposable sensors. Large number of these devices can now be spread over large and small areas, mounted on various types of autonomous air, ground and sea vehicles, embedded on many instruments, and carried by people. MANET technology is a key enabler for many promising military, medical, and civilian applications where the facility of computing resources, unattended sensors scattered in the environment, actuators, and autonomous devices and vehicles can be integrated to perform tasks and serve humans by reading and influencing the contextual state of the surrounding environment. MANET protocols allow setup of highly resilient wireless networks on moment notice any where in a cost effective manner. Unlike cellular and hotspots based wireless networks, where setting up the network requires considerable effort in planning and selecting the location of each infrastructure node, and where loss of any infrastructure node will annihilate the communication capability for all devices served by that node.

Mobility, limited stored energy, and common wireless communication impediments such as signal fading, noise interference, Multipath, and shadowing make design of MANET protocols challenging. Regardless of the application, MANET need bandwidth and energy efficient distributed algorithms to control and schedule nodes access to the shared wireless link and to determine network organization in a highly dynamic mobile environment. The Distributed Coordinator Function (DCF) described in IEEE 802.11 standard is based on the CSMA/CA method allowing any number of mobile stations to contend for transmission to be able to share a common wireless communication medium. Before transmitting on the channel, CSMA/CA devices ensure that the medium is idle using Clear Channel Assessment (CCA) circuit then each device backs-off from transmission for a duration locally selected from a random Contention Window (CW); the maximum possible duration of this back-off CW is 7 slot-times on first attempt to transmit a packet and grows exponentially on each subsequent retransmission attempt until it reaches 255 slot-times. CSMA/CA MAC protocols, in general, are characterized by simplicity, fairness and adequacy in supporting best effort applications by giving equal access to all traffic originating from any station that shares the common wireless medium. CSMA/CA is an adequate scheme where the traffic load is very low relative to channel capacity and where the number of stations competing for transmissions is small. Unfortunately, the random access delay and exponential back-off methods used in CSMA/CA for collision avoidance and recovery are inadequate when the offered load approaches channel capacity and when many devices contend for transmission.

Increasingly multimedia and interactive real time traffic support is becoming an important requirement for many promising MANET applications. This delay sensitive traffic imposes strict low latency and minimum bandwidth constraints that can not be guaranteed by CSMA/CA based MANET. There is considerable body of research work aimed at extending IEEE 802.11 CSMA/CA MAC to provide improved QoS communication support. The proposed solutions in the surveyed QoS research can be classified into decentralized prioritized QoS solutions or parameterized QoS solutions. Prioritized QoS solutions offer differentiated QoS service among traffic flows without any assurances of specific QoS metrics. There are known approaches for prioritized QoS solutions that use decentralized stochastic priority based methods. Generally, these approaches support a limited set of traffic priorities and each message must be assigned to one of these priorities. These methods modify basic CSMA/CA MAC in order to provide higher priority traffic precedence on transmission by reducing the deferral period and/or back-off time window that a station must wait before transmitting in idle channel. These methods differentiate between the high priority and low priority traffic. However, these approaches are not adequate when different applications need specific data rates or minimum delay because it is not easy to translate these needs into the finite set of priority classes supported by these methods. In addition, the random nature of delay and potential of collisions remain an impediment to providing deterministic QoS guarantees. There are known approaches that can be classified as adaptive stochastic methods that use decentralized fair scheduling algorithms. One approach proposes adjusting the size of the random back-off period adaptively by measuring the actual throughput against the desired throughput for each traffic flow. The source node decreases the contention window size for flows that need to increase actual throughput. The contention window size increases when the throughput needs to decrease or when network overloaded condition is detected. Another approach improves on the previous method by supporting traffic priority concept and employing an adaptive random function in selecting the back-off period that takes into account the traffic class and the length of message to be transmitted. Shorter messages are transmitted faster than longer messages when both messages are of same class. Also, messages with higher class are transmitted before lower class messages when both messages have equal message length. The message class is determined by the desired rate and priority. High throughput and high priority messages are high class messages. Another approach proposes Distributed adaptive Deficit Round Robin (DDRR) fair scheduling scheme to provide fair bandwidth allocation mechanism capable of supporting the desired throughput for various traffic flows. The approaches utilize a Deficit Counter (DC) for each traffic flow and use an adaptive random formula to compute DDRR Deferral Period Inter-Frame Space (DPIF) that a station must wait before sending a message for that traffic flow. Another approach enhances this DDRR approach by including support for absolute throughput. This approach guarantees traffic flow absolute throughput when the total load in the network does not exceed the "Effective" channel capacity. Clearly, these adaptive fair scheduling schemes are more effective than the stochastic basic priority methods in their ability to support absolute throughput. Unfortunately, all these priority based and the fair-scheduling based decentralized schemes are not effective in preventing collision and can not provide deterministic delay guarantees for traffic flows due to the stochastic nature of the approach used to compute the delay required prior to each transmission. Moreover, all these approaches are contention based channel access methods that use a channel reservation duration field in the header of each MAC frame to inform all stations within reception range of the sender or receiver of the scheduled end time of current exchange where other senders may contend to start a new exchange. Any station that receives a message must start a countdown timer initialized to the value of the channel reservation duration field in header of the received message; the station should not attempt to send nor respond to any message addressed to it before this count down timer expires. This timer is reinitialized every time a new message addressed to other stations is received. CSMA/CA contention access methods recommend sending a Request-To-Send (RTS) message first before sending long data message and then awaiting Clear-to-Send (CTS) message from the receiver in order to proceed with the data message; the channel reservation value in RTS header must include the time required to receive CTS plus the time required to send data and receive acknowledgment frame. RTS and CTS are very short messages; consequently, this method reduces the duration for detecting collisions which should reduce collision overhead than what would be possible when waiting for entire duration of long data message followed by an acknowledgment. The channel reservation field used in RTS/CTS frames is an effective mechanism to protect senders and receivers from potential interference from "Hidden Nodes", a station is considered "Hidden Node" whenever it is outside the transmission range of the sender, but within the transmission range of receiver. Collisions/Interference will occur at the receiver, if any hidden node transmits while the sender is transmitting. When a sender is transmitting, hidden nodes can not use carrier sense to determine when the channel is idle, they must rely on virtual clear channel assessment using channel reservation period information received in header of CTS or Acknowledgment messages sent by the receiver. Unfortunately, it is known that this scheme reduces the effective throughput in multi-hop MANET due to the exposed node induced congestion problem. An exposed node is any station that is within interference range of the transmitting station but outside the sensing range of the receiver. Exposed nodes can use carrier sense to detect channel busy condition, and transmissions by exposed nodes should not cause interference at the receivers. A known analysis of IEEE 802.11 CSMA/CA performance in MANET reveals these problems and concludes that CSMA/CA is not an appropriate MAC for MANET. In particular, this study reveals that TCP performs poorly in CSMA/CA based multi hop MANET. In conclusion, the random access delay inherent in the basic CSMA/CA technology and all the proposed decentralized improvements is the main impediment for supporting deterministic QoS for delay intolerant traffic and introduces major challenges in improving spectrum utilization in MANET.

The parameterized solutions offer deterministic QoS guarantees with specific quantitative values for throughput, delay, and delay jitter bounds. IEEE 802.11 Point Coordination Function (PCF) and IEEE 802.11e HCCA are two examples of these parameterized QoS solutions. Centralized MAC schemes such as Point Coordination Function (PCF) specified in IEEE 802.11 standard and Hybrid Control Function (HCF) Controlled Channel Access (HCCA) specified in IEEE 802.11e are two representative examples of parameterized QoS solutions. These systems support Contention Free (CF) access method in order to provide deterministic QoS for delay intolerant applications. In these schemes, specific stations that request contention free access are polled at regular interval and allowed to transmit traffic. Unfortunately, these are centralized solutions designed for single hop infrastructure based wireless LANs. These systems require considerable effort in planning and selecting the proper sites for access points and require mobile stations to remain within coverage area of access points. Also, as we stated, loss of infrastructure node will impact all other stations operating in its coverage area. Currently, Time Division Multiplexing (TDM) and Frequency Division Multiplexing (FDM) are prevalent technologies for many MANET applications that require wireless communication with deterministic QoS characteristics. Unfortunately these technologies don't use the spectrum efficiently and require significant management and planning effort to partition spectrum and allocate bandwidth. Applications that generate asynchronous non real-time traffic bursts and also delay intolerant traffic such as voice calls are required to utilize multiple communication interfaces, one for each traffic type, which increase the size, weight, power, and cost of the hardware platforms for these applications.

In this report we describe a novel MAC solution for establishing wireless LAN capable of supporting contention and contention free access on the same channel. $D^2QMAC$ is strictly decentralized solution to allow any number of mobile stations sharing a common wireless channel to collaborate in managing the channel resources. These stations will partition the channel bandwidth into non contiguous Contention Free Periods (CFP) and Contention Periods (CP). Each CFP is assigned exclusively for one station to transmit data to any station within range. Each CFP will occur at fixed periodic interval and transmission during CFP will not be preceded by random back-off period. Stations may contend to transmit data using CSMA/CA method during any CP. $D^2QMAC$ requires mobile stations managing the channel to maintain common state information regarding current allocation of channel resources in terms of duration and timing of each CFP and assignment to mobile station.

$D^2QMAC$ contention free access support permits deterministic delay and bandwidth QoS guarantees. Its capability to support contention and contention free medium access on single channel improves spectrum utilization efficiency for distributed applications that need wireless communication support for best effort asynchronous short traffic bursts as well as real-time delay sensitive traffic. Moreover, the cost and weight of the hardware platform for these applications can be reduced because it is sufficient to support a single $D^2QMAC$ transceiver instead of two; a dedicated channel and transceiver for contention based best effort traffic and a second dedicated transceiver and channel for delay sensitive traffic.

$D^2QMAC$ technology enables establishment of scalable and resilient MANET which is an essential requirement for many promising military applications. In particular, at the battle front lines, rapid establishment of wireless communication between drones, commanders, sensors, and smart weapons at moment notice will require low cost and low weight communication gear capable of supporting delay-sensitive as well as large volume of best effort traffic. $D^2QMAC$ based MANET can be formed at moment notice to allow front line commanders to use single communication interface to call dismounted warfighters, control weapons, and obtain integrated picture on ongoing battle using remote sensors. $D^2QMAC$ single channel/single transceiver for contention free and contention access makes efficient use of the spectrum and reduces the cost and weight of communication gear.

The same benefits are useful for many civilian applications. For example in recent years, many municipalities are planning to deploy IEEE 802.11 based wireless broadband service using a mesh network of hot spots located at light poles and rooftop of public building. Building an effective multi-hop backhaul network for the large number of access-points, hot spots, is complex and expensive component for these projects. $D^2QMAC$ CFP support can be exploited by Access Points deployed in these municipal broadband wireless networks to establish an overlay back-hauling mesh network using same channel and transceiver that the access point uses to communicate with hosts in its coverage area.

Next section defines the acronyms used in this technical report. Section 3 provides a general description of $D^2QMAC$ system. It describes the timing scheme, explains key concepts and defines critical data structures that stations will use to manage the resources of the shared channel. The section provides formal description of distributed algorithms used by mobile stations to control access to the channel. The channel access methods used in $D^2QMAC$ are described in detail in section 0. Section 5 provides format of all $D^2QMAC$ MAC protocol messages. Section 6 provides in depth description of decentralized control algorithms used in $D^2QMAC$ to define the geospatial boundaries of Independent Basic Service Set (IBSS), control the role and behaviors of stations participating in management of channel resources, and protocols to reserve and reclaim CFPs. Section 7 covers the techniques that each $D^2QMAC$ station employs to detect, cope, recover form out-of-synchronization in CFP allocations and channel resource and allocation management station membership list. Section 9 identifies all the claims that we will use in a patent disclosure for $D^2QMAC$ system.

2. Acronyms

| | |
|---|---|
| BBP | Beacon Back-off Period |
| BIS | Beacon Inter-frame Space |
| CAC | Channel Access Control |
| CAP | Contention Access Period |
| CBCFPS | Current Beacon Contention Free Periods Schedule |
| CBIBS | Current Beacon IBSS Beacon Schedule |
| CF | Contention Free |
| CFIS | Contention Free Inter-frame Space |
| CFMA | Contention Free Medium Access |
| CFP | Contention Free Period |
| CFPS | Contention Free Periods Schedule |
| CIS | Contention Inter-frame Space |
| CP | Contention Period |
| CRAM | Channel Resource Allocation Management |
| CW | Contention Window |
| $D^2QMAC$ | Decentralized Deterministic Quality of Service Medium Access Control |
| DCF | Distributed Control Function |
| IBS | IBSS Beacon Schedule |
| IBSS | Independent Basic Service Set |
| IBSSID | IBSS Identifier |
| IESS | IBSS Extended Superframe Structure |
| IIMS or IWS | IBSS Initiator Mobile Station or IBSS Initiator Wireless Station |
| ISS | IBSS Superframe Structure |
| LAN | Local Area Network |
| LCFPS | Local CF Periods Schedule |
| LIBS | Local IBSS Beacon Schedule |
| MAC | Medium Access Control |
| MANET | Mobile Ad-hoc Network |

-continued

| | |
|---|---|
| MS | Mobile Station |
| NAV | Network Allocation Vector |
| PDGP | Propagation Delay Guard Period |
| SBTT | Scheduled Beacon Transmit Time |
| SNR | Signal to Noise Ratio |
| TU | Time Unit |

3. D2QMAC General Description

D²QMAC defines a set of Medium Access Control (MAC) protocol messages and distributed algorithms to improve the IEEE 802.11 based wireless LANs to support deterministic Quality of Service (QoS) when operating in Mobile Ad-Hoc mode. D²QMAC Supports deterministic QoS guarantees for Mobile Stations (MS) traffic for Carrier Sense Multiple Access Collision Avoidance (CSMA/CA) wireless network by introducing Contention Free Medium Access (CFMA) method. D²QMAC supports CFMA by allowing Mobile Stations (MSs) to reserve periodic Contention Free Periods (CFPs) to use for data exchange with other MSs within their range.

D²QMAC enables any number of MSs to partition the communication capacity of a common wireless channel into Contention Free Periods (CFPs) and Contention Periods (CPs). Each CFP is allocated to specific MS to transmit using contention free access method, while all MS will share the available CPs using CSMA/CA fair and random contention access method. Any MS with an allocated CFP is guaranteed a specific minimum data rate, and specific maximum bounds on access delay and jitter for its outbound traffic. The following section describes D²QMAC CPs and CFPs in more detail.

D²QMAC decentralized algorithms and protocols are responsible of two main functions:

The Channel Resource Allocation Management (CRAM) function

The Channel Access Control (CAC) function.

The D²QMAC CRAM function handles assignment of CFP when a MS reserves it. CRAM function includes also the update and dissemination of a common resource allocation schedules for use by all MS that reside within Independent Basic Service Set (IBSS) coverage and collaborate in management and allocation of its common wireless communication channel resources.

The D²QMAC CAC function is a set of decentralized algorithms and protocols that direct when each MS is allowed to access the common medium and determine the access method that each MS should use to transmit when it is not prohibited from accessing the IBSS wireless medium.

3.1 Superframe and Extended Superframe Structures

FIG. 1 is an illustration of CPs and CFPs within an example D2QMAC Superframe SF1. With reference to FIG. 1, MSs need to establish among themselves and synchronize to a common time reference to be able to identify when each periodic CFP (e.g., CFP1-CFP3) will start and to establish regular periodic interval for each CFP. D²QMAC uses a beacon frame (also referred to interchangeably and equivalently as a "beacon message" or simply a "beacon;" the terms "frame" and "message" are used interchangeably and equivalently throughout the present application) (B1, B2) transmitted at regular and fixed interval, every Scheduled Beacon Transmit Time (SBTT) interval, to demark a start 102 of periodic time frame 102, referred to as the D²QMAC Superframe. In D²QMAC, the scheduled beacon message (B1, B2) must be transmitted exactly at the beginning 102 of SBTT; at SBTT start 102, all IBSS stations must yield the channel for the station scheduled to transmit beacon message B1, B2. Each CFP (CFP1-CFP4) is a fixed, but programmable, duration period at a specific time offset (e.g., time offset 104) from the start 102 of the D²QMAC super-frame. CPs are those remaining time periods within an SBTT interval that are not CFPs. FIG. 1 shows an example of a D²QMAC Superframe with CPs and CFPs.

D²QMAC limits the maximum duration of any CFP and the ratio of aggregate duration of CFPs to aggregate duration of CPs. In addition, internal algorithms and configuration recommendation avoid placing CFPs contiguously within its Superframe structure; instead it strives to extend the CP duration between the allocated CFPs and between beacon message and first and last CFP within an IBSS Superframe. These measures are designed to reduce probability of collisions during CPs, because firstly, as the CFP interval increase, other IBSS MSs that have messages to transmit will be required to wait for current CFP to expire, and as time elapses there will be greater likelihood of more stations with need to transmit and as the number of transmitters increase at end of CFP all these stations will contented for the channel and there will be greater likelihood of collisions. Secondly, extending aggregate CP duration provides all station with longer time period and more network capacity to transmit contention messages which reduces the likelihood of collisions.

Figure 2:
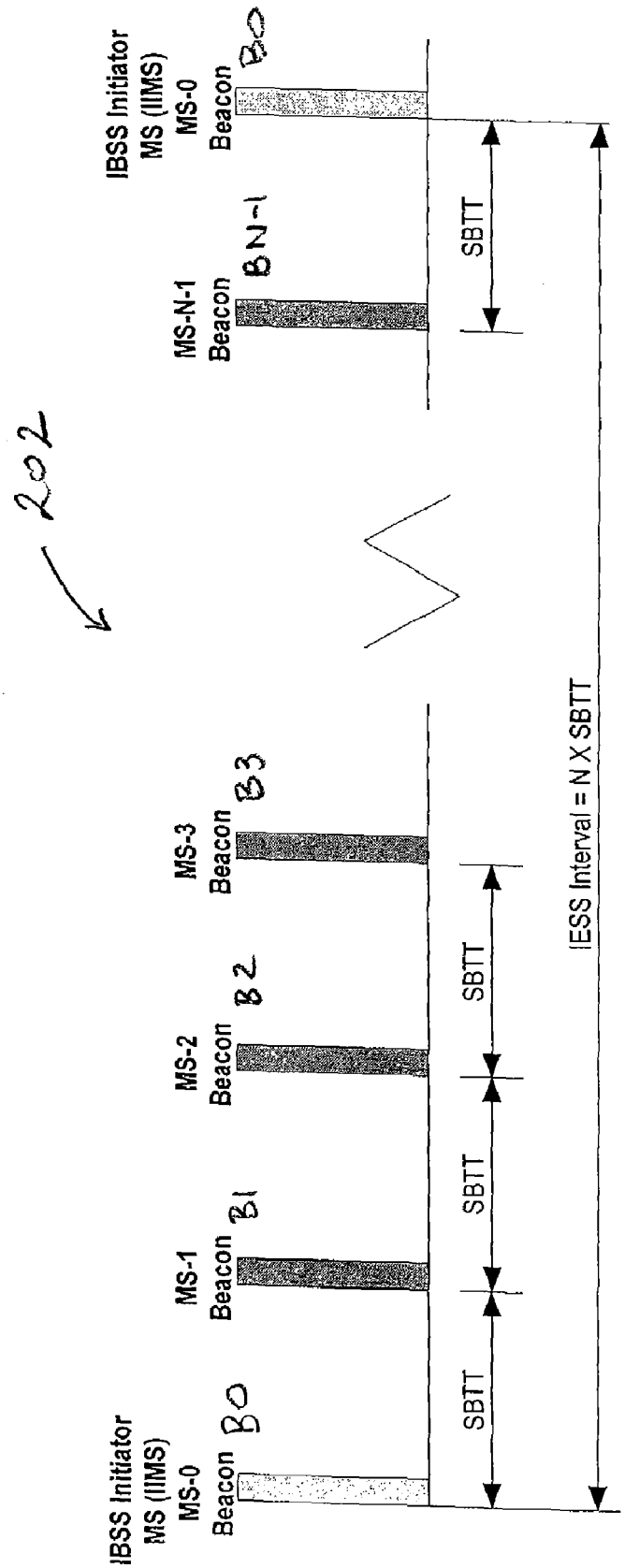
FIG. 2 is an illustration of an example D2QMAC IESS.

Transmitting beacon message every SBTT interval will impose a significant energy cost on the IBSS station required to maintain the IBSS Superframe structure. Typically, this responsibility is relegated to infrastructure node in wireless LANs that include infrastructure nodes such as Access Point (AP), typically these nodes are connected to permanent power source. However, it is impractical to assume presence of mains powered infrastructure nodes in MANET where all nodes are mobile and these wireless networks are formed at moment notice without opportunity to plan. Several existing MANET approaches delegate this responsibility to specific IBSS node, cluster head or cluster lead. For example, the IEEE 802.15.4 MAC standard for wireless LANs uses a Coordinator station. These centralized approaches also place a heavy energy burden on specific mobile station. Loss of this special station will require other stations to elect another station to take responsibility of transmitting beacons to maintain the IBSS Superframe structure. On the other hand, D²QMAC wireless LAN approach distributes consumption of Energy required to maintain its Superframe structure among multiple IBSS MSs. This allows stations with similar configuration and limited stored power to play an equal role in collaboration towards establishing an IBSS Superframe time reference which leads to longer operating duration for the collective MSs to accomplish mission without requiring any MS to have additional stored energy. As such, in D²QMAC a set of IBSS stations collaborate in maintaining the IBSS Superframe structure by taking turns in transmitting the IBSS beacon at fixed SBTT interval. A common beacon schedule maintained and shared by several stations within an IBSS allows those stations to identify the MSs that will transmit scheduled Beacon messages and the order in which these MSs will transmit the beacon messages at each SBTT interval. The first entry in the IBSS Beacon Schedule (IBS) will be the MAC address of the MS that established the IBSS, IBSS Initiator MS (IIMS). The remaining entries in the IBS are the MAC addresses of other MSs responsible for transmitting beacon messages for the IBSS. The MSs in the IBS are the stations responsible for performing CRAM function for the IBSS. D²QMAC IBSS Extended Superframe Structure (IESS) consists of a sequence of SBTT periods and is delimited by beacon messages transmitted by the IIMS. The duration of $D^2QMAC$ IESS is dependant on the number of entries in the IBS. FIG. 2 is an illustration of an example D2QMAC IESS 202. In FIG. 2, an IBSS includes CRAM stations MS-0 through MS-N-1. CRAM stations MS-0 through MS-N-1 each transmit respective beacon messages B0 through BN-1 one after the other in round-robin fashion at the start of respective successive SBTT intervals, as depicted in FIG. 2, in accordance with the common IBS, which is transmitted as part of each of the beacon messages MS-0 through MS-N-1. This process establishes and maintains a common time reference in the form of the Superframe.

$D^2QMAC$ IESS provides a common reference to support power saving sleep/awake scheduling. $D^2QMAC$ allows MS that need to save energy, sensor nodes for example, to disable its receiver and sleep for extended duration. These nodes may select a specific SBTT periods within $D^2QMAC$ IESS where it plans to be awake and ready to receive messages. A station operating in power save mode will send a message to all other stations that it expects to receive messages from identifying when it will be awake by listing the MAC addresses of the CRAM stations scheduled to transmit the beacon for SBTT periods where power saving station will be awake to monitor for any incoming messages. Any station with interest to send messages to sleeping station must wait for the proper SBTT interval within the $D^2QMAC$ IESS when they expect that sleeping station to revert to listening mode.

In order to avoid collisions at SBTT interval, $D^2QMAC$ MSs required to transmit scheduled beacon message must have identical copy of IBSS beacon schedule, IBS. A table listing the order in which IBSS stations will take turns in transmitting scheduled beacon message. This table can be statically configured in all MS that participate in CRAM function when $D^2QMAC$ IBSS is setup to operate in pre-provisioned mode. Alternatively this table, the IBSS Beacon Schedule (IBS), can be setup on-demand as MS stations join and leave an IBSS. The latter approach offers more flexibility and is supported when $D^2QMAC$ IBSS is setup to operate in on-demand mode.

All IBSS MSs must be aware of current assignment of each CFP, its duration, and its time alignment within the IBSS Superframe structure. $D^2QMAC$ stations transmitting beacon message must provide this CFP allocation information each time a beacon message is transmitted. Each Beacon message will include a CFP Allocation schedule which defines the timing, duration, and access right for each CFP. IBSS station will use the Beacon's CFP periods allocation information received within current SBTT interval, the Current Beacons CFP Schedules (CBCFPS), to determine when they are allowed to access the common channel. All IBSS stations that generate Beacon message must maintain a consistent CFP Allocation Schedule (CFPS). When $D^2QMAC$ is used in pre-provisioned mode, the CFP Allocation Schedule will be manually configured in IBSS MSs listed in the IBS. When $D^2QMAC$ on-demand mode of operation is utilized, then CFPS will be established at run time as MS reserve CF periods and will be maintained synchronized across IBSS MSs currently listed in the common IBS. Sections 3.1.1 and 3.1.2 provide additional details on $D^2QMAC$ IBS and CFPS.

3.1.1 IBSS Beacon Schedule (IBS)

IBSS Beacon Schedule (IBS) is an ordered list of globally unique identifiers for MSs responsible for generating Beacon Messages at the Scheduled Beacon Transmit Time (SBTT). IBS elements consist of the MAC Address of these MSs. In $D^2QMAC$, MSs listed in IBS which are responsible for sending a scheduled Beacon Message every SBTT interval are the IBSS stations responsible for the common wireless Channel Resources Allocation and Management (CRAM) function. $D^2QMAC$ does not require that all IBSS member stations to participate in management and control of access to the shared medium, CRAM function. However, $D^2QMAC$ recommends higher number of participants in order to improve the system robustness and resiliency, and expand load sharing of CRAM energy consumption across larger number of stations.

Every MS listed in IBS is an IBSS CRAM station. The first entry in IBS is the station that established the IBSS, IBSS Initiator Mobile Station (IIMS). The MAC address of IIMS is used as $D^2QMAC$ IBSS identifier (IBSSID) by setting the individual/group bit of the IIMS MAC address to 0 and the Universal/local bit to 1. The process ensures that each IBSS will have a universally unique identifier.

$D^2QMAC$ it is important to maintain common version of IBS schedule across all stations responsible for IBSS CRAM function, stations listed in the IBS. Maintaining common IBS version across multiple stations is trivial when contents of IBS are pre-provisioned. In $D^2QMAC$ pre-provisioned operational mode this information can be provisioned once and used by the stations thereafter without modifications in CRAM membership. However, $D^2QMAC$ on-demand operational mode offers more flexibility to allow IBSS stations to better adapt to changes in network topology, mobility, and failures; In this mode new stations could join an existing IBSS, and station may leave their current IBSS; in addition, IBSS wireless LAN may split and merge. $D^2QMAC$ employs several decentralized algorithms and protocol messages in order to maintain synchronization of IBS contents across all IBSS CRAM stations.

The following equation formally describes the $D^2QMAC$ IBS content; in this equation, l is an ordered set of MAC addresses of CRAM stations representing the IBS that will be shared among CRAM MSs:

$$l = \{s : s \in IBSS \text{ and } s \text{ is a CRAM MS}\} \quad \text{Equation 1}$$

A common copy of l must be maintained by every station performing CRAM function. The first entry in the ordered set l, station ($s_0$), is MAC address of the station that initiated the IBSS, $s_0$ will be followed by the MAC addresses of the CRAM stations that joined the IBSS in order of arrival. In this document will also use the symbol $l_N$ to represent the $N^{th}$ mobile station that joined the IBSS; and $l_0$ to represent the mobile station that initiated the IBSS, the IIMS. Note that in Pre-provisioned D2QMAC the size of the IBS and the contents of each entry will remain constant, however, the order of the CRAM stations within the IBS will change as these CRAM stations move in and out of their current IBSS coverage. When a CRAM station establishes a new IBSS, it must move its MAC address to be the first entry in the IBS, to become an IIMS; and if it merges with a dominant IBSS, the position of its MAC address will revert to the position stated in the received IBS within beacon of the dominant IBSS.

$D^2QMAC$ beacon frames must include the current contents of IBS schedule. The contents of the IBS schedule listed in a beacon frame are based on the current local image of the IBS as perceived by the station that generated that beacon frame. Stations that receive a beacon frame will compare the contents of the IBS in the received frame, Current Beacon IBSS Beacon Schedule (CBIBS), against contents of their Local IBSS Beacon Schedule (LIBS). CRAM stations that detect difference between CBIBS and LIBS will update their LIBS content by applying an Ordered Set Union operation. A station that detects that CBIBS content is missing MAC addresses, will inform the station that generated the beacon message of these missing entries. This document shall cover the IBSS synchronization process in more detail. The following equation provides a formal description the process that will be applied by every CRAM station upon receiving a beacon message in order to maintain a common IBS schedule.

$$l_n = U l_b U l_n \qquad \text{Equation 2}$$

Where $l_b$ represents the set of all the received CBIBS by the $n^{th}$ station during current SBTT and $l_n$ represents the $n^{th}$ station's LIBS The following equation describes the information that will be sent to the station that generated the last beacon by a station that identified one or more missing and active elements in a received CBIBS.

$$l_d = l_n - l_c = \{<s, i>: s \in l_n \text{ and } s \notin l_c \text{ and } i \text{ is the index of } s \text{ in } l_n\} \qquad \text{Equation 3}$$

Where $l_c$ is the beacon most recently received by the $n^{th}$ station and $l_d$ is ordered set of missing MAC address of active station and its index in the LIBS. The contents of this ordered set will be sent to station that generated the last beacon message. Stations that receive $l_d$ shall update its LIBS by adding the missing MAC addresses at the specified index for each element in $l_d$. The following equation provides a formal description of this process $$l_n = l_n U l_d \qquad \text{Equation 4}$$

Note that since LIBS is an ordered set, the set union operation must take into account the order of stations. Whenever there is a conflict in the order of elements between LIBS and CBIBS, D²QMAC resolves the conflict by sorting the conflicting elements within the schedule in ascending order using reverse MAC address comparison function. The reverse MAC address compares MAC address value by reversing the order of the octets. This approach reduces the magnitude of vendor specific bits in MAC address. As such, MAC address with lower least significant octet value will be placed before MAC address with higher least significant octet value; and if these octets hold the same value then comparison is performed on next least significant octets. MAC addresses are guaranteed to be universally unique by IEEE Registration Authority that assigns organizations and companies a unique block of addresses, 24 bits Organization Unique identifier (OUI) or 12 bit Individual Address Block (IAB). Each organization producing the MAC devices then uses these blocks to assign each device universally unique MAC address.

3.1.2 Contention Free Periods Allocation Schedule (CFPS)

D²QMAC CRAM stations share the responsibility of allocating Contention Free Periods (CFPs) to any MSs that request to reserve these periods. All stations performing CRAM function must use a common IBSS Contention Free Periods allocation Schedule (CFPS) to ensure that two CRAM stations will not assign CFPs with overlapping time periods. The common CFPS that will be shared across all CRAM stations consists of a set of Contention Free Period (CFP) triple, 3-tuple. Each CFP triple is represented by 10 octets and consists of <6 octets MAC Address, 2 octets period duration, 2 octets period offset from SBTT>. The CFPS is used to maintain a CF triple for each CF period that have been reserved and remain in use within the IBSS boundary. The 3-tuple entries in the CFPS will be placed in ascending order based on the SBTT-offset value in each triple. The following is a formal description of the contents of CFPS elements and rules that apply to each element.

Let the triple $cfp_i = <S_j, d_i, o_i>$
where $cfp_i$ is the CFP at index i in the CFPS,
and $S_j$ is the MAC address of IBSS station j that was assigned $cfp_i$
and $d_i$ is the time duration of $cfp_i$ in TUs
and $o_i$ is the time offset between the SBTT and the start of $cfp_i$ in slot-times.

$$CFPS = \{cfp_i : cfp_i = <S_j, d_i, o_i>, (o_i + d_i) < o_j \text{ for all } i < j\} \qquad \text{Equation 5}$$

The MAC Address in the CF triple is the MAC address of the station that reserved the CFP. The period duration value in the CF triple is the number of Time Units (TU) allocated for the CFP. The period offset value is the number of TU between the start of the SBTT interval and start of the CFP period. The common CFPS provides CRAM stations with a current mapping of allocated communication bandwidth. Each D²QMAC CRAM station is required to include in the beacon message the contents of its Local image of the CFPS (LCFPS). All IBSS MSs that receive beacon message are required to use the Current Beacon's CFPS (CBCFPS) information to determine when each station can use its CFP, when it can contend for channel access using CSMA/CA scheme, and when it must defer the channel during CFPs reserved by other stations. Ideally, the contents of LCFPS should match the received CBCFBS. Unfortunately this can be guaranteed only in D²QMAC pre-provisioned mode; where CFPS content are static and manually provisioned in all CRAM stations prior to activating the network. In this mode, a fixed set of CFPs are permanently assigned to specific MSs. In D²QMAC on-demand mode, MS are required to reserve CFP from CRAM station and CRAM stations utilize D²QMAC protocol and decentralized algorithm to assign CFP to the requesting MS and synchronize their local image of the new CFPS. D²QMAC utilizes various decentralized algorithms and protocol messages to efficiently disseminate any change in CFPS to the maximum number of stations within IBSS coverage area. However, it is possible that CFPS changes may not reach all stations in timely fashion due to errors, mobility, or obstacles. D²QMAC algorithms will help all MS to eventually converge on a common CFPS. In the mean time, D²QMAC uses decentralized algorithm to allow any MS to gracefully cope with differences between its LCFPS and the received CBCFPS. The following equations provide formal description of the process that each MS must apply to determine when and how it can access the IBSS common channel based on the received CFBS received in beacon frames during the current SBTT interval (CBCFPSS) and its LCFBS.

Let $$R_j = \{CBCFPS_i\}$$

Where $R_j$ is the set of CBCFBS received by IBSS MS j whose MAC address=$S_j$ and $CBCFPS_i$ is CFBS for $i^{th}$ beacon message received by MS j within the current SBTT interval Let $B_j$ denotes MS $S_j$ Contention Free Periods Schedule (CFPS) included in the currently transmitted scheduled beacon; As such, if during the current SBTT interval MS $S_j$ transmitted a scheduled beacon, then $B_j$ equals $LCFBS_j$; and if MS $S_j$ was not scheduled to transmit beacon message during current SBTT interval, then $B_j$ equals $\phi$.

Let $D_j$ denotes the IBSS aggregate CRAM list of designated CFPs as perceived by $S_j$ MS during the current IBSS Superframe interval, where $$D_j = U R_j U LCFPS_j \qquad \text{Equation 6}$$

And let $A_j$ represent the current consensus regarding IBSS CFPs list among the CRAM stations as perceived by MS $S_j$ during the current IBSS Superframe interval, where $$A_j = \left(\bigcap R_j \cap LCFPS_j\right)$$
if $B_j = \phi$ or $R_j \neq \phi$ $A_j = B_j,$ if $B_j \neq \phi$ and $R_j = \phi$ Equation 7

Then in D²QMAC, a MS $S_j$ is allowed to perform contention free access during any period $CFP_k$ in the set $CF_j$ that contains all CFP where MS Sj have Contention free access permission during the current SBTT interval. The following formula provides formal description of set $CF_j$ $CF_j = \{CFP_k: CFP_k \in A_j, S_j$ equals first element in $CFP_k$ triple$\}$  Equation 8

MS $S_j$ should not transmit during all contention free periods $CFP_n$ in the set $P_j$ that contains all CFP where MS $S_j$ that does not have Contention free access permission in the current SBTT interval. The following formula provides formal description of set $P_j$ $P_j = \{CFP_n: CFP_n \in D_j, S_j$ not equal first element in $CFP_n$ triple$\}$  Equation 9

Further any MS $S_j$ may use CSMA/CA approach to contend to transmit during any contention periods $CP_k$ in the set $CP_j$ that contains all CPs for use by MS $S_j$ that does not overlap with any element in $D_j$. The following is formal description of the set $CP_j$ $CP_j = \{CP_k: CP_k$ does not overlap with any $CFP_n \in D_j\}$  Equation 10

In addition, MS $S_j$ must use CSMA/CA access method to transmit during any $CFP_c$ the set $CA_j$ where $CA_j = \{CFP_c: CFP_c \in LCFPS_j, CFP_c \notin A_j$ and $S_j$ equals first element in $CFP_c$ triple$\}$  Equation 11

These decentralized algorithms when applied at every node will significantly reduce the probability of collisions during contention free periods even when LCFPS at some IBSS MS does not match the current common CFPS. Further, when D²QMAC on-demand mode is used, these algorithms are used to synchronize the contents of CFPS and IBS across all CRAM stations. Keep in mind that in D²QMAC pre-provisioned mode the local image of CFPS and IBS are manually configured and don't change.

3.2 D²QMAC Configuration Parameters

This section lists all new MAC configuration parameters introduced with D²QMAC, these parameters will be used in addition to all other parameters required for basic CSMA/CA operation such as parameters listed in IEEE 802.11 standard specification. Participation in CRAM function and establishing a new IBSS after power-up requires presetting default values for these parameters in the station software. Once an IBSS is established the values of these parameters will be included in beacon messages and joining station must use to IBSS values of these parameters to set the parameters values in that station.

| Parameter Name | Description |
| --- | --- |
| CFPS2SBTTratio | Maximum allowed ratio of aggregate durations of CFPs in the CFPS to the duration of SBTT interval. |
| maximumCRAMsize | The Maximum number of entries allowed in the IBS, size of CRAM list. This is the maximum number of MS allowed to participate in IBSS CRAM function. |
| MaxCfpsSize | The maximum number of triples allowed in the CFPS. This defines the maximum number of CFP that can be allocated to MS within an IBSS. |
| maximumSBTTduration | The maximum time period that could be set for SBTT interval in TUs. |
| minimumChannelScanDwellTime | The required minimum time to pass without reception of any beacon message before a MS scanning a channel may declare that channel is not used by an existing D²QMAC IBSS. The period must be set to a value greater than maximumCRAMsize times maximumSBTTduration. |
| CIS | Contention Inter-frame Space period duration. |
| Min-CRAM-CW | Minimum contention window slot-times used to randomly select a back-off period prior to transmitting a contended beacon or IBSS-SYNC-UPDATE message. This value shall be between 32 and 255. |
| BeaconPeriodDuration | Minimum time required to transmit the largest beacon message. Scheduled Beacon period = BIS + BeaconPeriodDuration; contended beacon period = BIS + Min-CRAM-CW × Slot-time + BeaconPeriodDuration. |
| BIS | Beacon Inter-frame Space period duration. |
| CFIS | Contention free Inter-frame Space period duration. |

-continued

| Parameter Name | Description |
| --- | --- |
| CFP2CP-threshold | Ratio of Aggregate duration of CF periods to Aggregate duration of contention periods. |
| CfpMaxDuration | Maximum allowed duration of Contention Free Period. |
| CpMinDuration | Minimum allowed duration of Contention Access Period. This period must be greater than or equal the duration of scheduled beacon period plus the duration of contended beacon period. |
| maxIbssScheduledBeaconMissCnt | The necessary number of consecutive SBTT intervals with missing scheduled beacon frame before a CRAM station is allowed to declare an IBSS leave or IBSS split condition and attempt to start a new IBSS. |
| maxCRAMScheduledBeaconMissCnt | The necessary number of consecutive misses of scheduled beacon frames from a specific CRAM station before CRAM station operating in IBSS on-demand mode shall declare that CRAM absent and removes the CRAM station entry from the local IBS. |
| maxScheduledIIMSmissCnt | Maximum number of allowed consecutive misses of scheduled beacon frames from IIMS before declaring IBSS-border-event; this event causes CRAM station to suspend its role in CRAM management function and force it to stop sending scheduled or contended beacon frames for the IBSS. |
| maxCFPIdleCnt | The required number of consecutive Superframe periods before considering an allocated CFP idle which will permit CRAM stations to reclaim that CFP. This is a threshold for CRAM stations to assume that a MS holding the CFP is powered-down, lost due to failure, isolated or away from the IBSS due to mobility. |
| minMissedDominantBeacons | The required minimum number of consecutive IBSS intervals elapsed without receiving non IIMSS beacon frames from any dominant IBSS before a border station that was able to receive non IIMS beacon frames from non-dominant IBSS is permitted to exit its border state in order to participate in its original non-dominant IBSS. |
| SBTT | The Scheduled beacon Transmit Time defines the duration of the fixed periodic interval between the start of two consecutive IBSS scheduled beacon frames. SBTT is the duration of $D^2QMAC$ Superframe structure. |
| PDGP | Propagation delay Guard period is the delay difference between in message arrival in one receiver collocated with message sender and a second receiver for the same message located at maximum possible distance for receiving the sender. |
| $\Delta T$ | Slot time is the minimum possible period required for station located at maximum distance allowed to receive a frame from a sender to switch its transceiver from transmit to receive mode, account for propagation delay and perform Clear Channel Assessment (CCA) to determine if the channel is idle or busy; Slot-Time = RXTX-Turn-Around-Time + MAC-HW-Processing-Time + Air-Propagation-Time + CCA-Time. |

4. Channel Access

Nodes participating in a D²QMAC IBSS must adhere to specific time frame structure and channel access rules. As we have explained in previous sections, D²QMAC IBSS Superframe Structure (ISS) is defined by the SBTT duration and delimited by scheduled beacon periods. We also explained that beacon frames will contain CFPS and IBS reflecting the local copy of these shared data as perceived by the station that generated the beacon; further, we showed how each station will use this beacon information along with its local version of the IBS and CFPS to determine when it is allowed to access the channel and how it should access the channel when allowed. While these measures are sufficient to avoid collisions when the IBS or the CFPS on one or more IBSS stations arc not synchronized with the current IBS and CFPS shared by the rest of the IBSS stations; these mechanisms should prevent collisions during scheduled beacon period and Contention Free periods provided that all IBSS stations are guaranteed to receive every beacon frame generated within the IBSS. Unfortunately, in mobile ad hoc networks, wireless communication between stations is not symmetric; a scheduled beacon message transmitted by one station may not be received by one or more hidden stations within the same IBSS. Further more, even when D²QMAC is used in pre-provisioned mode and all stations are properly provisioned with identical IBS and CFBS, due to mobility, it is feasible for a set of MS to encounter another IBSS within its communication range and stations at both IBSS may experience inter-IBSS interference and collisions during a CFP when there conflict in CFP in the CFPS of these IBSSs. In order to mitigate this risk, D²QMAC uses additional channel access methods to allow IBSS MSs to I-detect potential out-of-sync and IBSS overlap conditions, 2-minimize the impact of these conditions, and 3-facilitate recovery from these conditions.

Figure 3:
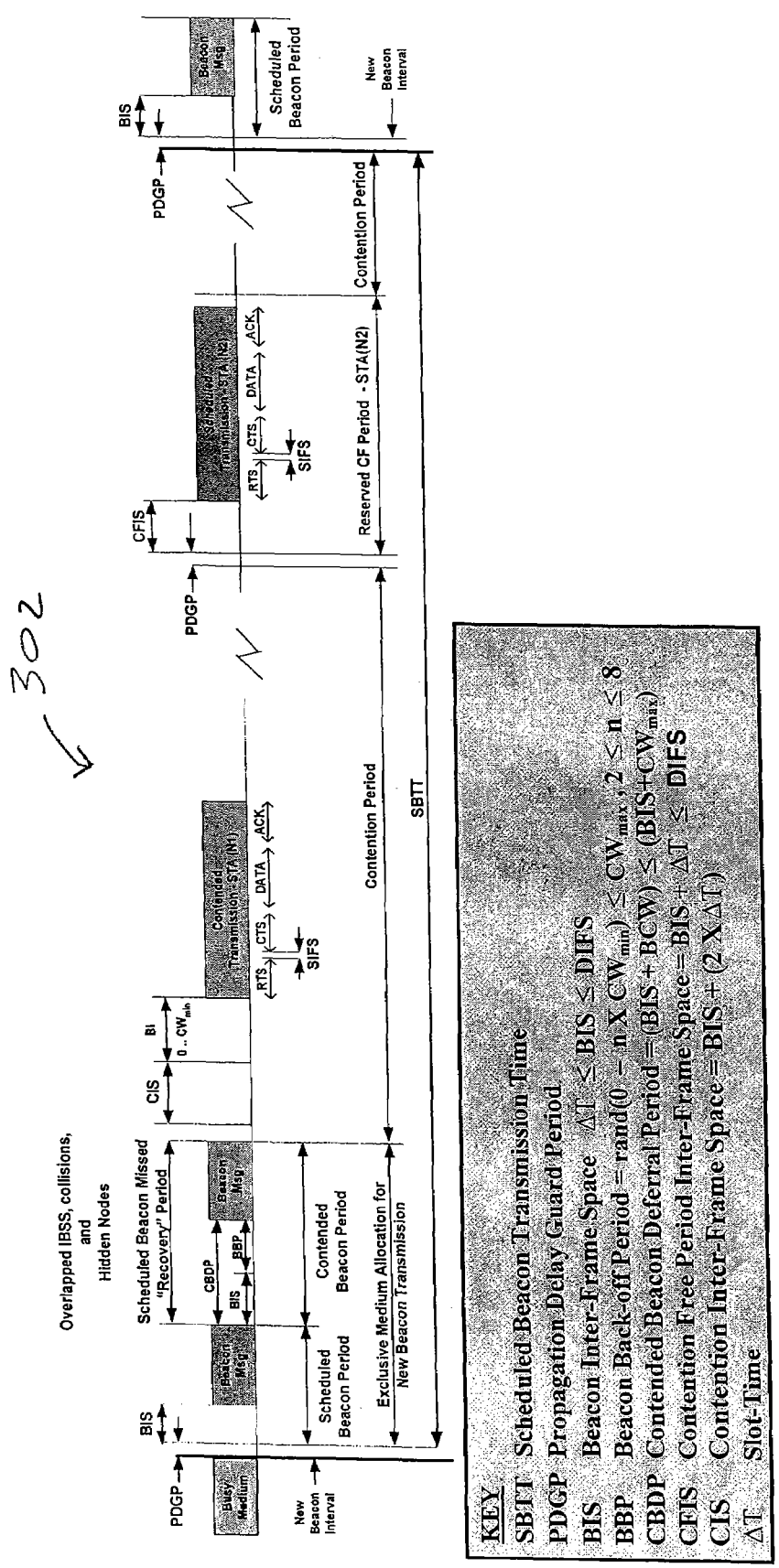
FIG. 3 is an illustration of a Superframe with timing details.

D²QMAC Superframe Structure allocates a dedicated period to transmit an IBSS Scheduled Beacon management frame. This period is dedicated to the CRAM station currently scheduled for beacon transmission according to the common IBS. Typically, one Beacon messages is transmitted during this period. D²QMAC Superframe structure allocates a second dedicated period, the contended beacon recovery period, immediately following the scheduled beacon period. Both of these periods are allocated exclusively for transmission of IBSS beacon messages. FIG. 3 is an illustration of a Superframe 302 wherein there are depicted the aforementioned periods following the SBTT interval and other timing details that stations must adhere to before accessing the channel. The following key defines the symbols and acronyms depicted in FIG. 3:

KEY
SBTT Scheduled Beacon Transmission Time
PDGP Propagation Delay Guard Period
BIS Beacon Inter-Frame Space $\Delta T \leq BIS \leq DIFS$
BBP Beacon Back-off Period=rand$(0 - n \times CW_{min}) \leq CW_{max}$, $2 \leq n \leq 8$
CBDP Contended Beacon Deferral Period=$(BIS+BCW) \leq (BIS+CW_{mqx})$
CFIS Contention Free Period Inter-Frame Space=$BIS+\Delta T \leq DIFS$
CIS Contention Inter-Frame Space=$BIS+(2\times\Delta T)$
$\Delta T$ Slot-Time In D²QMAC, any station sending data must terminate its transmission before arrival of SBTT interval. Further, all station shall not respond to Request-To-Send (RTS) control frame with Clear-To-Send (CTS) frame, if the NAV value indicates that the channel will not be relinquished before beginning of next Superframe, SBTT interval. This will ensure that the shared medium is available for the station scheduled to transmit the next beacon.

4.1 Inter-Frame Spaces Periods

D²QMAC assumes that station transceivers will use only one channel for transmit and receive; further, the hardware wireless transceiver will need to switch between transmit and receive modes when sending messages or monitoring the channel to receive messages. This design along with common CSMA/CA contention access methods similar to IEEE 802.11 CSMA/CA method imposes two strict timing constraints: The Short-inter-Frame Space (SIFS) period and the Slot-Time ($\Delta T$). Slot time is the minimum interval for collision avoidance, which is the minimum time delay from one station to trigger its MAC hardware to transmit a message until the MAC hardware at furthest receiver is able to detect the arrival of the first symbol for that message. Slot-Time must exceed the maximum propagation delay between two stations using the underlying physical channel maximum transmit power and the modulation scheme that results in highest SNR at furthest receiver. The SIFS is minimum time for MS transceiver operating in receive mode to transition to transmit mode upon arrival of last symbol of the message currently being received. IEEE 802.11 standard provides specification details for typical CSMA.CA access method and describes in detail how slot-time and Inter-Frame Space (IFS) duration are used. In addition, IEEE 802.11 specification covers how the DCF Inter-fame Space (DIFS) duration referenced in FIG. 3 is used prior to transmission using contention access method.

In D²QMAC, different inter-frame space periods are used to defer access to the channel prior to transmission. Beacon Inter-frame Space (BIS) period is used before transmission of a beacon frame, Contention Free Inter-frame Space (CFIS) period is used before transmission of a contention free message, and Contention Inter-frame Space (CIS) period is used before transmission of a contention message. Since BIS is the shortest deferral period, a station transmitting a beacon frame will always gain access to the idle medium before any other station attempting to send a contention message or a contention free message. These strict timing rules along with Superframe structure are designed to eliminate collision probability between scheduled beacon messages and any contention or contention free message transmission attempt by any station that for any reason may not share the common SBTT time reference. Similarly, the shorter CFIS period protects contention free messages from potential collisions from attempt to send contention message on the idle channel by out-of-sync station that may not share the common IBS and CFIS for the IBSS; more these measures should reduce collisions from stations within inter-IBSS interference range but outside inter-IBSS beacon reception range. The following sections cover D²QMAC access periods and define how these deferral periods are used prior to accessing the medium to send beacon frames, contention free messages and contention messages.

4.2 D²QMAC Access Periods

This section covers all D²QMAC access periods used within its Superframe structure. Each section describes when a station is permitted to access these periods, the access rules that a station must follow when using each period type. The following sections define the Channel Access Control (CAC) function rules that must be implemented by mobile stations supporting D²QMAC.

4.2.1 Scheduled Beacon Period Access

IBSS CRAM stations maintain a periodic Superframe structure by transmitting a beacon frame every SBTT interval. Unlike IEEE802.11, In D²QMAC there is no predefined beacons transmit times that include time 0 given a common 64-bit timer and TBTT period defined by the station that sent the very first beacon; instead in D²QMAC, each beacon is sent at fixed SBTT interval relative to the most recently received scheduled beacon. At SBTT interval, the station currently scheduled to transmit the beacon according to the last received beacon and based on the contents of its local schedule must await a fixed deferral period, the Beacon Interframe Space period (BIS), where the medium should remain idle, then the station shall be allowed to transmit the scheduled beacon frame. The station may use its Clear Channel Assessment capability to verify that the channel is idle prior to starting the beacon transmission. However, a station scheduled to transmit a beacon must transmit that message within the scheduled beacon period. Any station currently sending data on the medium must plan to relinquish the channel at or before the IBSS SBTT interval. The Scheduled Beacon period is allocated exclusively for the station currently scheduled to transmit the beacon message. If this station moves away or lost, then the channel will remain idle for the duration of the scheduled beacon period. The scheduled beacon period must be sufficient to wait for BIS duration and transmit the longest possible beacon frame. If the scheduled station was not able to send its scheduled beacon within the scheduled beacon start time because the medium was busy, that station must compete to send a contended beacon once the medium is idle. Propagation Delay Guard Period (PDGP) is used to handle different perception of SBTT stat time among CRAM stations in order to accommodate variable propagation delay resulting from having multiple mobile stations originating beacon messages and time varying distance between the IBSS station that originates a beacon and receivers of this beacon; since CRAM stations are positioned at different location with the IBSS geospatial boundary, the position of CRAM station scheduled to send a beacon will vary from one SBTT interval to the next. Stations may observe that medium is busy when it should be idle for scheduled beacon interval, stations should expect the medium to become idle within the PDGP duration; This scheme insures that beacon delay jitter perceived by any station will not exceed the 2× maximum channel propagation delay between any two stations within an IBSS maximum coverage.

4.2.2 Contended Beacon Period Access

A contended Beacon Period is dedicated also for transmitting a beacon message. This period immediately follows the scheduled beacon period in the D²QMAC Superframe structure. The contended beacon period is necessary in order to ensure that at least one beacon frame is received by all stations within the IBSS every SBTT interval. A scheduled beacon message transmitted by one MS may not be received by all stations in the IBSS due to several reasons; for example, stations out side the range of the sending station, beacon collisions due to more than one station attempt to send a beacon message at the SBTT interval; this may be a result of station local copy of IBS is out of sync or due to coverage overlap between more than one IBSS that use the same channel and have their IBSS intervals setup with exact alignment.

After SBTT interval starts and upon end of its Scheduled beacon period, all CRAM stations that did not receive the scheduled beacon frame that should have been sent successfully must compete to send a beacon frame for their IBSS, these CRAM stations will use special CSMA/CA access method when competing to send the contended beacon. CRAM station that missed the scheduled beacon will compute a Contended Beacon Deferral Period (CBDP) that the channel must remain idle before the station can transmit the IBSS contended beacon. This CBDP consists of BIS deferral period and a random Beacon Back-off Period (BBP). The BBP is determined locally using a random function to provide the number of slot-times that determine how long after BIS period elapse each station must back-off while the channel is idle before allowed to access the channel. A Beacon Back-off Period (BBP) will initialized by a random slot-time count value between 0 and Contention Window maximum (2×CWmin=14) or Size of IBS which ever is higher. All stations competing to transmit a beacon frame must monitor the medium activity and suspend their attempts to send a beacon upon reception of a contended beacon frame from any MS in their IBSS. Stations that don't receive a beacon frame will wait for BIS period to elapse and will continue to decrement their beacon back-off period timer while the channel is idle until these stations are able to send or receive a beacon frame. As such, within an IBSS geospatial area, there shall be at most one scheduled beacon transmission attempt and possibly one or more contended beacon transmissions.

4.2.3 Contention Period Access

Stations in D²QMAC will use CSMA/CA access technique similar to IEEE 802.11 DCF access method to contend for transmitting messages during any period that is not designated as scheduled beacon period, contended beacon period, nor contention free period.

In order to send a contention message, a station is required to verify that the medium is idle for a Contention Inter-frame Space (CIS) deferral period followed by a random contention back-off period, Contention window (CW). The CIS deferral period duration is the duration of BIS plus two slot-times, CIS=BIS+(2×ΔT). The random Contention Back-off Period (CBP) value specifies the number of slot-times that a station must wait after BIS elapses while the channel is idle. The CBP will be initialized by a random value between 0 and Contention Window (CW), CW size is 7, CWmin, when a message is first scheduled for transmission using contention access. CBP value will not be initialized unless the message is sent and the station determines that the same message must be retransmitted because either the CTS frame was not received after the CTS frame was sent or because an ACK frame with not received after Data Frame was sent. In the second contention transmission attempt, the CBP should be initialized to a random value between 0 and CW size that is double the previous CW size, size of CWmin. This process will be repeated if the message needs to be retransmitted until CW size is 255, CWmax. D²QMAC may use the same CSMA/CA technique for IEEE 802.11 during contention periods, or any other CSMA/CA random and fair access technique capable of avoiding starvation for all classes of traffic that contended for shared medium during any contention period within the Superframe structure.

All stations attempting to send a message during any contention period must verify that the total time required to defer access, plus maximum potential time required to back-off, plus the Network Allocation Vector (NAV) time to send all messages in an exchange during a contention period will be completed before arrival of Contention Free Period or the beginning of the IBSS Scheduled Beacon period demarking the start of the SBTT interval. This restriction applies also when transmitting a burst of message fragments, see IEEE 802.11 specification for message fragmentation and burst transmission mode details.

During Contention periods, stations are allowed to use Data/ACK exchange sequence or RTS/CTS/Data/ACK exchange sequence. As specified in IEEE802.11 specification, the size of the message and the value of the IEEE 802.11 dot11RTSThreshold configuration parameter will determine if CTS/RTS should be used.

4.2.4 Contention Free Period Access

A Contention Free Period (CFP) is designated time duration within the $D^2QMAC$ Superframe structure reserved for exclusive use of a specific IBSS station. During each SBTT period, a station is allowed to use its reserved CFP when the period is listed in its local copy of the CFPS and also in every CBCFPS received in a beacon message within the current SBTT interval. As formally described in CFj={CFPk: CFP-k∈Aj, Sj equals first element in CFPktriple} Equation 8; the contents of CBCFPS transmitted in every beacon message during an SBTT period provide IBSS stations permission to access their reserved CFPs during that SBTT interval. Upon arrival of SBTT interval, each station allowed to use its CFP must wait for the CFP time offset to elapse between the start of SBTT period and beginning of its CFP, at that time the station should have received all beacon messages for that SBTT period. At that point, the station must defer access for a Contention Free Inter-frame Space (CFIS) period then the station may start transmitting Contention Free data frame and wait for Ack frame.

Stations using CFP are not required to use CTS before sending data frame even when sending data frame that exceeds the IEEE 802.11 dot11RTSThreshotd configuration parameter. However, stations are allowed to use CTS/RTS before sending a message to ensure that the destination and all hidden nodes from the sending station are aware of CFP utilization.

A station may use its CFP to solicit traffic from other stations by sending unsolicited directed CTS to a specific IBSS station to poll it for information. A station that receives a directed CTS MAC frame during a CFP from the station that reserved the CFP will be allowed to respond by a data frame after SIFS period or an ACK frame if it has no data to send. A station during its CFP may also send a broadcast CTS and all stations that have messages pending for that station will be allowed to start a contention access procedure to start sending data to that station.

A station that reserved a CFP should use contention access during contention periods when attempting retransmission of unacknowledged data transmitted during the CFP; the station may use contention free access only when retransmission attempt NAV indicates that full exchange could be completed within the same CFP.

As described in Pj={CFPn: CFPn∈Dj, Sj not equal first element in CFPn triple} Equation 9, any MS that receives Beacon messages within a SBTT period that results in denying contention free access to one or more CFP reserved by that MS may wait for the start of the CFP within that SBTT period and then use contention access method described in the previous section to send its data. In this situation, it is recommended for the MS to use RTS/CTS frames before sending the data.

In $D^2QMAC$ on-demand mode, any reserved CFP that remains idle for the entire duration of the CFP in MAXIMUM-inactive-CF-Periods consecutive Superframe periods will be reclaimed and considered contention period. The Period is considered active if any message is received from, or sent to the station during the reserved period; or if energy is detected by the physical layer during any time within the CFP.

5. D2QMAC Frames

This section covers the format of all MAC frames that have been added or modified to support $D^2QMAC$ wireless LANs. $D^2QMAC$ introduced new management frames specifically to decentralized common channel resource control, allocation and management. These frames are used to disseminate common channel allocation schedules across all MS participating in IBSS CRAM function. The Beacon frame format accommodates new information elements to allow CRAM station to periodically share its current copy of common resource allocation schedules. CF-RSV-REQ and CF-RSV-RESP frames allow stations to perform channel resource allocation and disseminate updates to shared resource schedules. The IBSS-SYNC-UPDATE frame is used by CRAM station to resolve differences, out-of-sync, between stations with respect to the IBS and the CFPS. IBSS-JOIN-REQ and IBSS-JOIN-RESP frames enable stations to be able to participate in IBSS beacon transmission and CRAM function. The IBSS-Borders-Exposed-CFPS frame is sent by borders stations to disseminate to potential receivers at other IBSSs when their CFPs occur and when they are exposed to CFP traffic, Soliciting-CRAM-Stations is used by a station attempting to establish a new IBSS and CRAM-solicit-response frame is used to prevent a station residing within an existing IBSS from unnecessary creation of new IBSS. The RELEASE-CFP-REQ and the RELEASE=CFP-RESPONSE frames allow stations to explicitly release CFP previously allocated to them using the CF-RSV-REQ and CF-RSV-RESP.

FIGS. 4-7 are illustrations of the common frame structure of these management frames.

Figure 4:
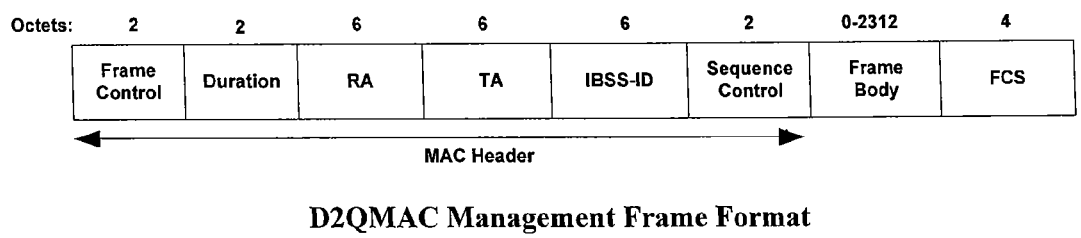
FIG. 4 is an example D2QMAC Management Frame Format.

FIG. 4 is an example D2QMAC Management Frame Format.

Figure 5:
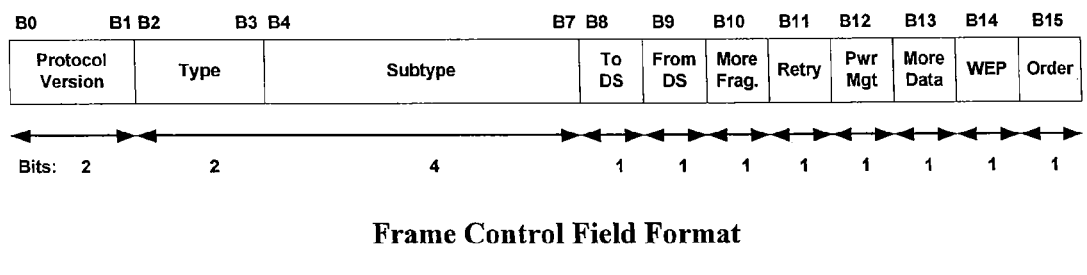
FIG. 5 is an example Frame Control Field Format.

FIG. 5 is an example Frame Control Field Format.

Figure 6:
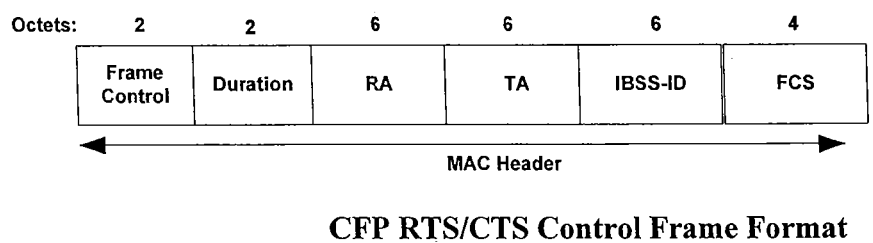
FIG. 6 is an example CFP RTS/CTS Control Frame Format.

FIG. 6 is an example CFP RTS/CTS Control Frame Format.

Figure 7:
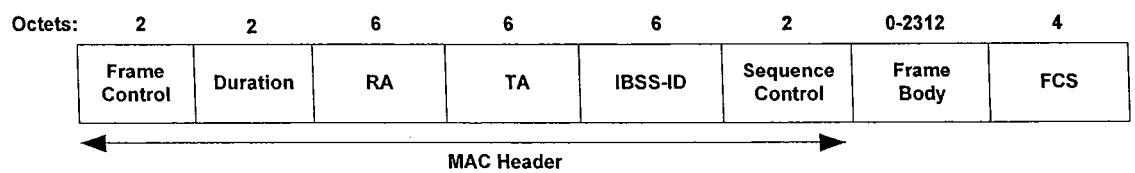
FIG. 7 is an example CFP RTS/CTS Control Frame Format.

FIG. 7 is an example CFP RTS/CTS Control Frame Format.

All $D^2QMAC$, Management frames must be transmitted using basic rate and highest power to maximize the likelihood that these messages will be received by the maximum number of IBSS receivers.

In addition, $D^2QMAC$ introduces modified CTS/RTS frame formats for use during CFP. CTS and RTS may be used during a CFP to avoid immature reclaim of the CFP by CRAM stations. Use of RTS/RTS control frames is recommended prior to sending DATA frame in a CFP. Using Basic rate and highest power when sending CFP RTS/CTS frames expands the geospatial coverage of signals transmitted in CFPS which minimizes the probability of inappropriate designation of that the CFP as inactive by CRAM stations hidden from the station that reserved the CFP.

5.1 Beacon Frame

This management frame, Beacon frame, will have frame body contents consisting of the order list of fields described in the following table.

TABLE 1

| | | D²QMAC Beacon Frame Body Contents |
|---|---|---|
| Order | Information | Notes |
| 1 | Time Stamp | Time Stamp representing current value of TSFTIMER. It used for Synchronization Function employed at each node. This value is not utilized in D²QMAC, but it is included only for IEEE 802.11 backward compatibility purpose. This field is fixed size (8 octets). The format of this field is defined in IEEE 802.11 standard, section 7.3.1.10. |
| 2 | Beacon Interval (SBTT) | Interval in TUs defines the frequency of transmitting beacon messages in this IBSS, where TU is A measurement of time equal to 1024 μs. This field is fixed size (2 octets). As such, the maximum possible Beacon Interval is (64K * 1024) micro seconds = ~64 s. The format of this field is defined in IEEE 802.11 standard, section 7.3.1.3. This field represents D²QMAC SBTT interval. |
| 3 | Capability Information | Field defining the capability of the station that generated the beacon, this field is fixed size (2 octets). The content and format of this field is defined in IEEE 802.11 standard, section 7.3.1.4. |
| 4 | IBSS-ID | Service Set Identity (SSID) element. Provides unique identity of the IBSS. This field will consist of element ID octet = 0, length octet = 0-32, and up to 32 information octets, see section 7.3.2.1 in IEEE 802.11 standard. This element represents D²QMAC BSSID and its length will always be set to 6 and its value is based on the IBSS initiator MAC address. |
| 5 | IBSS Supported Rates | List of data rates supported by the IBSS initiator. This list defines all rates in the basic rate set as well as optional rates. This field will consist of element ID octet = 1, length octet = 1-8, and up to 8 information octets, see section 7.3.2.2 in IEEE 802.11 standard. |
| 6 | FH or DS Parameter Set | Field defining either frequency Hopping or Direct Sequence Parameter Set information Element. FH parameter set will be used by stations using frequency hopping Physical layer. DS parameter set will be used by stations Direct Sequence spread spectrum physical layer. This field will consist of element ID octet = 2 or 3, length octet, and information octets, see section 7.3.2 in IEEE 802.11 standard. |
| 7 | IBSS Parameter Set | The IBSS Parameter Set information element contains the set of parameters necessary to support an IBSS, ATIM value as specified in IEEE 802.11 standard. This information element consist of element ID octet = 6; followed by length octet = 2, and 2 information octets to hold ATIM window length value in TUs. This field is not used in D²QMAC but included in beacon message format only for IEEE 802.11 backward compatibility purpose. |
| 8 | Beacon Schedule | Ordered list of D²QMAC IBSS CRAM MS members, first element in this list is the IBSS initiator, IIMS. A beacon message Information Element (IE) defining the IBSS CRAM members and the order of these MSs in generating Scheduled Beacon frames at the SBTT. This information element format consists of element ID octet = 255; followed by IBSS Station Count octet; followed by IBSS Station count * 6 (Size of MAC address octets); The first MAC address in the Beacon Schedule will be the MAC address of the node that established the IBSS, IIMS. |
| 9 | Beacon Schedule Index | Index value reflecting the current position in the beacon schedule table of the station that should transmit the next scheduled beacon frame. Its value will always be between 0 and Size of beacon schedule minus 1. This field is |

TABLE 1-continued

D²QMAC Beacon Frame Body Contents

| Order | Information | Notes |
|---|---|---|
| | | incremented by every station every schedule beacon transmit interval SBTT, then divided by the size of the beacon schedule, and the remainder of the division is used as its new value. This element is required in any D²QMAC contended beacon message; the information in this element can be inferred in scheduled beacon message because the beacon source station could be used to find the index in the beacon schedule and next entry in the beacon scheduled should be the station to send next scheduled beacon. This information element will have its ID octet set to 253, size octet set to 1, and value octet set to index of station that should transmit the next scheduled beacon. |
| 10 | CF periods Schedule | Field Defining the Contention free periods allocated to specific member stations in the IBSS. This information element will consist of element ID = 252; followed by CF periods count Octet; followed by CF periods Count * (2 octets for Period Offset in TU durations + 2 octets for CF Period Duration (CNAV) field + 6 (Size of MAC Address in octets) = 10) |
| 11 | CF Parameters | This information element provides configuration and policy information that govern assignment of CF periods in an IBSS. This information element will consist of element ID = 250, length octet set to 2 providing the number of the configurable default values. The octets in the value contains any configurable parameters that influence IBSS operation, such as the maximum ratio ($R_{th}$) of CF periods duration as percentage of SBTT, the maximum number of CF periods allowed in the IBSS CF schedule. The values will represent Default or configured values of these attributes. See section 3.2 for list of possible CF parameters |
| 12 | Contention-periods | This information element defines offsets and duration of one or more Contention windows; new nodes could use any of these windows to transmit IBSS join-request management frame to the station that transmitted the beacon message. This element is used when the CF Periods schedule in the beacon message is not complete, does not cover all reserved contention-free periods. It is also used by nodes that don't wish to maintain copies of the CF periods schedule. This field could be used to assist these nodes in marking channel as busy out side these periods and use random contention access mechanism during these windows. The element ID is set to 248, length octet is 2, and information field is 4 octets tuples for each contention period, first element is 2 octets set to the period offset within SBTT in TUs, the second element is 2 octets for that value of the period's duration in TUs. |
| 13 | SBTT-Contended-Offset | This Information element defines that time offset between the IBSS Superframe start and the start of contended beacon frame. This information element value should be set to zero if the transmitted frame is scheduled beacon. The element ID is set to 246, length |

TABLE 1-continued

D²QMAC Beacon Frame Body Contents

| Order | Information | Notes |
|---|---|---|
| | | octet is 2, and information field is 2 octets for time offset between the start of SBTT and beginning of contended beacon. This information element is useful for IBSS border stations required to maintain B-CFPS for safe inter-IBSS communication; in particular when border stations receives contended beacons before it is able to receive scheduled beacons from adjacent IBSS. |

5.2 CF-RSV-REQ Frame

CF-RSV-REQ is a channel resource management frame utilized by IBSS MSs when D²QMAC is configured to operate in on-demand mode. All channel resources management frames introduced in D²QMAC are added to the list of management frames defined in IEEE 802.11 specification. The format of all channel resource management frames is consistent with the format of IEEE 802.11 management frames.

This frame is used by stations that need to reserve a CF period. It is sent to the station that transmitted the schedule beacon frame during current SBTT interval. This frame should not be sent to a station that generated a contended beacon message. The CF-RSV-REQ resource management frame will have in its MAC header control field the type bits set to "01", 2; the subtype bits will be set to "0100", 7. The CF-RSV-REQ frame will include CF period information element indicating the CF duration that station desires to be allocated to it for exclusive transmission every beacon interval.

The following table describes the information elements in CF-RSV-REQ frame body.

5.3 CF-RSV-RESP Frame

CF-RSV-RESP is a channel resource management frame; this frame will be generated in response to receiving a CF-RSV-REQ frame within the same SBTT interval and will be sent only by a station that sent a scheduled beacon frame during that SBTT. IBSS CRAM stations that generated a contended beacon shall not generate CF-RSV-RESP frame; even due to any anomaly, if any of these stations received a CF-RSV-REQ frame, then it should be ignore it.

The CF-RSV-RESP resource management frame will have in its MAC header control field the type bits set to "01", 2; the subtype bits will be set to "0100", 7. The CF-RSV-RESP frame will include a result information element reflecting the outcome of the CFP request; the response frame will include the CFP timing information element if the result value is success.

TABLE 2

CF-RSV-REQ Frame body contents

| Order | IE Name | Information Element Description |
|---|---|---|
| 01 | Duration | This mandatory Information Element in CF-RSV-REQ frame specifies the duration that a station needs to be allocated to be able to initiate contention free message exchange with any other node(s) within the IBSS coverage. The element Id octet is set to 0x01, the length octet is set to 4, and the value is 4 octets that could be set to the desired duration in Time unit (TU). |
| 02 | Local-Back-off-Interval | This Conditional Information Element in CF-RSV-REQ frame specifies a random number of TUs (0-7 slot times) that should be added to the offset value generated by the station that was the source of the last beacon frame. This value aims to mitigate the potential of overlap/collisions caused by duplicate allocation of same CF offset by two different reservations as result of partial sync condition within the IBSS CRAM stations. The element ID octet will be set to 0x02, the length octet will be set to 0x01 and the value will be one octet set to value between 0 and 7. |
| 03 | Desired-Offset | This is an optional Information Element (IE) that a requesting station may use to dictate the start time of CF period from the IBSS Scheduled Beacon Transmit Time (SBTT). The element ID octet will be set 0x03, the length octet will be set to 02, and the value will be two octets set the desired offset in TU. |

TABLE 3

CF-RSV-RESP Frame body contents

| Order | IE Name | Information Element Description |
|---|---|---|
| 01 | Result | This mandatory Information Element in CF-RSV-REQ frame specifies the duration that a station needs to be allocated to be able to initiate contention free message exchange with any other node(s) within the IBSS coverage. The element Id octet is set to 0x01, the length octet is set to 1, followed by value octet. See Table 4 for possible values of this information element. |
| 02 | CFP timing | Information element identifying the time offset between the start of the IBSS SBTT interval and the start of the management frame. The information element ID is set to 02, the length octet is set to 2, and the value will consists of 2 octets for offset in TUs. |

TABLE 4

CF-RSV-RESP Frame Result Field Codes

| Result Value | Definition |
|---|---|
| 0 | Accept |
| 1 | Reject, Exceeded IBSS Beacon Schedule Max Size |
| 2 | Reject, No sufficient IBSS CFP resources. |

5.4 IBSS-SYNC-UPDATE Frame

This $D^2QMAC$ channel resource management frame is sent a beacon frame by a CRAM station on reception of that beacon frame and discovering that CBCFPS and/or CBIBS are in the received not synchronized with the CRAM station local CFPS and/or its local IBS. This message could also be sent in response to detecting a CF-RSV-RESP frame indicating addition of new CF period that will have any part of its duration overlapping with an active CF period. In this instance, this frame will be sent to the station that sent the CF-RSV-RESP.

IBSS-SYNC-UPDATE frame may have as many Missing-Beacon-Station or Missing-CFP Information Elements (IE) as necessary to update the IBS or CFP schedules of a CRAM station that generated a beacon message or CF-RSV-RESP frame.

Station will use Contention access method to send IBSS-SYNC-UPDATE frame; since it is likely that several CRAM stations that receive beacon frame or CFP-RESV-RESP will be able to simultaneously identify missing entries in the beacon's ISB or CFP when the station that sent the beacon was out of sync with rest of the IBSS CRAM stations; in this event, all these stations will simultaneously attempt to send IBSS-SYNC-FRAME; in order to minimize the possibility of collisions, these station must randomly pick a back-off period between 0 and (2×CWmin=14) or size of IBS time slots which ever is higher.

5.5 IBSS-JOIN-REQ Frame

This $D^2QMAC$ management frame is used by a station to request participation in the CRAM function for an established IBSS. This request should not be sent unless the station was able to receive the scheduled beacon from the IBSS initiator station, IIMS.

The header for this MAC management frame will have destination address (Address 1) set to the value of the MAC address of the station that originated the scheduled beacon frame received within the current SBTT interval, the source address (Address 2) is the MAC address of the station currently attempting to join the IBSS, (Address 3) of the message will contain the IBSS-ID. There is no frame body data for this management frame. The IBSS-JOIN-REQ frame should be transmitted using CSMA/CA contention access process during any of the contention periods within the current SBTT interval.

5.6 IBSS-JOIN-RESP Frame

This $D^2QMAC$ management frame is transmitted only by a station that sent a scheduled beacon frame to respond to the station that sent it an IBSS-JOIN-REQ frame. As such the IBSS-JOIN-RESP will have destination address (Address 1) field in the header set to the MAC address of the station that originated the IBSS-JOIN-REQ frame, the source address (Address 2) will be the address of the station that transmitted the scheduled beacon during current SBTT period, (Address 3) of the message will contain the IBSS-ID. The message

TABLE 5

IBSS-SYNC-UPDATE Information Elements

| Order | IE Name | Information Element Description |
|---|---|---|
| N/A | Missing-Beacon-Station | This Information Element in IBSS-SYNC-UPDATE frame identifies a missing Scheduled station in the IBS. The information element will have its element ID octet set to 0x01, followed by length octet set to 7, then 7 octets value with first octet set to index of missing station followed by six octets set the MAC address of the missing station. There will be a Missing beacon information element for each station that was missing in the beacon schedule. |
| N/A | Missing CFP | This Information Element identifies each CFP period that was missing from CBCFPS. This information element ID octet will be set to 0x02, followed by a length octet set to 10, then ten octets value of CFP triple; first two octets set to CFP duration in TUs, the second two octets set to CFP duration, the last six octets set to MAC address of the station that reserved this CFP. There will be a Missing CFP information element for each CFP that was missing the received beacon's CFPS. | body will contain a result Information element reflecting the decision of the station that generated the scheduled beacon for the current IBSS with regard to accepting or rejecting the request for joining the IBSS CRAM. IBSS-JOIN-RESP will not be generated by a station that transmitted a contended beacon. The following table depicts all possible values for result information element.

TABLE 6

Result Field Codes

| Result Value | Definition |
|---|---|
| 0 | Accept |
| 1 | Reject, Exceeded IBSS Beacon Schedule Max Size |
| 2 | Reject, Authentication policy |

5.7 IBSS-Borders-Exposed-CFPS Frame

This $D^2QMAC$ management frame is transmitted only by a CRAM station operating in Borders state. This frame must be sent during contention period. It aims to ensure that border stations are able to communicate the timing of the CFPs to other stations that might be at edge of a different IBSS. Receivers of this message will be able to use its contents to determine when the sender station is exposed to other CFP traffic originated from within its IBSS and other adjacent IBSSs; the frame reveals also the timing of CFP allocated to this border station. This management frame is beneficial in situations where the sender border station is not able to receive the beacons from another IBSS and some stations are within the reception range of this message but are outside the range of receiving beacon messages from the sender station IBSS; often, those stations that are able to receive the transmitted IBSS-Borders-Exposed-CFPS frames are also border stations operating in a different IBSS. This management frame is transmitted using broadcast address using maximum power and lowest rate, basic rate, to ensure best SNR for potential receivers. Border stations that are able to receive beacon messages from more than one IBSS may send this message but are not required to send this message. The following table describes the information elements used in this management frame.

| Order | IE Name | Information Element Description |
|---|---|---|
| 01 | B-CFPS | This Information Element in IBSS-Borders-Exposed-CFPS frame specifies the all CFP assigned to CRAM Border station and the CF periods assigned to other MS stations within the border station IBSS or within other IBSS adjacent to the Border station. This information element consists of a sequence of 10 octets CFP triples reflecting the entries of the B-CFPS local to the IBSS border station that transmitted this frame. Note that the in each triple, the offset is duration from start of the SBTT for the border station that transmitted this frame, the duration of some CFP entry may reflect combined duration of overlapping CFPs, and MAC address will be set to all ones when CFP entry reflects combination of overlapping CF periods from more than one IBSS. The element Id octet is set to 0x01, followed by CF periods count Octet; followed by CF periods Count * (2 octets for Period Offset in TUs + 2 octets for CF Period Duration (CNAV) field + 6 (Size of MAC Address in octets) = 10) |
| 02 | Start-SBTT-offset | Information element identifying the timing offset between the start of this frame and start of the SBTT interval where this frame was transmitted. |

5.8 Soliciting-CRAM-Stations Frame

This $D^2QMAC$ management frame is transmitted during contention period by Stations operating in Joined or borders state when they experience IBSS leave or split condition and attempt to establish a new IBSS as a result.

5.9 CRAM-solicit-response Frame

This $D^2QMAC$ management frame is transmitted by CRAM stations operating in Joined or Established State in response to receiving Soliciting-CRAM-Stations to prevent improper creation of new IBSS. The following table describes the information elements in CRAM-solicit-response frame body.

| Order | IE Name | Information Element Description |
|---|---|---|
| 1 | Beacon Schedule | Ordered list of $D^2QMAC$ IBSS CRAM MS members, first element in this list is the IBSS initiator, IIMS. A beacon message Information Element (IE) defining the IBSS CRAM members and the order of these MSs in generating |

| Order | IE Name | Information Element Description |
|---|---|---|
| | | Scheduled Beacon frames at the SBTT. This information element format consists of element ID octet = 0x01; followed by IBSS Station Count octet; followed by IBSS Station count * 6 (Size of MAC address octets); The first MAC address in the Beacon Schedule will be the MAC address of the node that established the IBSS, IIMS. |
| 2 | Beacon Schedule Index | Index value reflecting the current position in the beacon schedule table of the station scheduled to transmit the next scheduled beacon frame. Its value will always be between 0 and Size of beacon schedule minus 1. This field is incremented by every station every schedule beacon transmit interval SBTT, then divided by the size of the beacon schedule, and the remainder of the division is used as its new value. This information element will have its ID octet set to 0x02, size octet set to 1, and value octet set to index of station the should transmit the next scheduled beacon. |
| 3 | CF periods Schedule | Field Defining the Contention free periods allocated to specific member stations in the IBSS. This information element will consist of element ID = 0x03; followed by CF periods count Octet; followed by CF periods Count * (2 octets for Period Offset in slot-time durations + 2 octets for CF Period Duration (CNAV) field + 6 (Size of MAC Address in octets = 10) |

5.10 RELEASE-CFP-REQ Frame

This $D^2QMAC$ management frame is transmitted by any IBSS station to indicate that it is releasing a specific CFP that was previously allocated to that station. This management frame must be transmitted to the station that transmitted the scheduled beacon during the current SBTT period. This management frame will contain two information elements. The CFP offset and duration, the frame header will include the sender MAC address to allow the receiving station to identify the station that was assigned the CFP. The CFP offset, period and sender MAC address are sufficient to identify CFP entry in the IBSS CFPS. This frame is sent by a station that detects in scheduled beacon message that CFP allocated to it is listed but the station has no intention or need to use this CFP in the foreseeable future. The following table describes the infomiation elements in RELEASE-CFP-REQ frame body.

| Order | IE Name | Information Element Description |
|---|---|---|
| 01 | Offset | This mandatory information element in RELEASE-CFP-REQ frame specifies the offset of the CFP from the start of SBTT. The element Id octet is set 0x01, the length octet is set to 2, and the value will consists of 2 octets for new CFP offset in TU. |
| 02 | Duration | This mandatory Information Element in RELEASE-CFP-REQ frame specifies the duration that a station needs to be allocated to be able to initiate contention free message exchange with any other node(s) within the IBSS coverage. The element Id octet is set to 0x02, the length octet is set to 4, and the value is 4 octets that could be set to the desired duration in Time unit (TU). |

5.11 RELEASE-CFP-RESPONSE

This management frame is sent by the station that transmitted the scheduled beacon during current SBTT interval in response to RELEASE-CFP-REQ frame. The management frame destination will be the MAC address of the station that sent the RELEASE-CFP-REQ frame. The following table describes the information elements in RELEASE-CFP-RESPONSE frame body.

| Order | IE Name | Information Element Description |
|---|---|---|
| 01 | Offset | This mandatory information element in RELEASE-CFP-REQ frame specifies the offset of the CFP from the start of SBTT. The element Id octet is set 0x01, the length octet is set to 2, and the value will consists of 2 octets for new CFP offset in TU. |
| 02 | Duration | This mandatory Information Element in RELEASE-CFP-REQ frame specifies the duration that a station needs to be allocated to be able to initiate contention free message exchange with any other node(s) within the IBSS coverage. The element Id octet is set to 0x02, the length octet is set to 4, and the value is 4 octets that could be set to the desired duration in Time unit (TU). |

6. Decentralized Channel Resource Management $D^2QMAC$ distributes the cost of common channel resource management and access control across a finite list of IBSS MSs. This result in load sharing the energy consumed for processing and communication associated with supporting contention free reservation and access control for contention free periods which enables prolonged collaborative team missions without requiring any of the mobile stations to be capable of storing additional energy. $D^2QMAC$ does not require that all IBSS MSs to participate in common channel resource management function; however, higher number of participants improves the system robustness, resiliency and results in shared energy consumption across larger number of stations for IBSS management overhead.

Stations participating in $D^2QMAC$ common channel resource allocation and contention free access control functions are called IBSS Channel Resource Allocation Management (CRAM) Stations. IBSS CRAM stations are required to maintain a common copy of two lists: 1) IBSS Beacon Schedule (IBS) and 2) Contention Free Periods Schedule (CFPS). The IBS lists all the CRAM stations and CFPS lists each CFP currently allocated to an IBSS MS.

IEEE 802.11 standard ad hoc DCF and many CSMA/CA specifications do not include built in mechanisms that restrict the boundaries of the wireless LAN, IBSS. For example, all stations in IEEE 802.11 IBSS compete to send beacon message around the Target Beacon Transmit Time (TBTT), in fact several beacon instances could be transmitted by hidden terminals within an IBSS, and in IEEE 802.11 IBSS split and join events are transparent to IBSS member stations. D²QMAC allows stations to automatically form an ad hoc IBSS network, but it includes mechanisms to allow these stations detect and dynamically adapt to changes to network topology as new MSs are introduced, leave, join an IBSS, and when the IBSS splits and merges.

D²QMAC on-demand mode allows MS to reserve CFP when the station has prolonged need for deterministic communication service with specific quantitative QoS characteristics such as bit rate, delay, and delay jitter bounds. D²QMAC IBSS MSs should able to detect and gracefully respond to network split and merge events that occur due to stations mobility. In order to able to perform these CRAM functions and respond to these events without use of centralized scheme, all IBSS CRAM stations must maintain a synchronized copy of IBS and CFPS schedules. This is a daunting task given that IBSS CRAM stations team membership is highly dynamic due to mobility, and given that connectivity between these CRAM MSs is intermittent due to time varying fading channels, obstacles, and range.

To be able to contain the complexity of this synchronization task, it is imperative to define reasonable geospatial boundaries for D²QMAC IBSS where synchronization of IBS and CFPS must be maintained. Selection of very small IBSS where all members can communicate directly will simplify dissemination of updates to IBS and CFPS across all CRAM stations, however such an IBSS will suffer from highly dynamic team members as assumption for full and direct communication between all members is very restrictive and any station mobility will likely cause leave or split condition for one IBSS and join or merge condition for another IBSS. On the other hand, as we allow increasing number of hops between IBSS CRAM stations, the overhead cost required to disseminate changes across the IBSS will rise and will increase the potential for IBS and CFPS changes to be outdated in transit.

6.1 IBSS Boundaries

D²QMAC defines the boundary of an IBSS to be all active CRAM stations that are first neighbors of that station that initiated this IBSS, one hop away from IIMS. As such, two hops are the maximum distance allowed between any two active CRAM stations in a D²QMAC IBSS. This D²QMAC IBSS boundary decision enables rapid and efficient dissemination of IBS and CFPS updates across the active CRAM stations in an IBSS, and without imposing fairly long duration before permitting new updates to CFPS or IBS to take place. Therefore the maximum communication range of the station that initiated the IBSS defines the IBSS CRAM boundaries, maximum communication range is defined by maximum distance that any IBSS CRAM station will be able to receive transmitted beacons from the IBSS initiator station. This IBSS network topology allows the IBSS initiator station, and all other active CRAM station within close proximity, to observe all events occurring at any region within their IBSS that impact the state of the shared IBS and CFPS schedules. As such, within an IBSS, the mobility of any MS and mobility of the MS that initiated that IBSS and the topological characteristic of the terrain where these stations reside will dictate when a MS is inside or outside the IBSS boundary.

The list of all IBSS active CRAM stations are called IBSS Scheduled Beacon Stations (IBS), This list must be an included set in the set of all IBSS member stations (set I) and can be formally described as an ordered set l, where $$l=\{s:s\in IBSS, \text{ and } s \text{ is a MS actively participating in IBSS CRAM function}\}$$

A common copy of l must be maintained by every station s that elects to participate in IBSS CRAM function. This ordered list l will have as its first entry the station ($s_0$) that initiated the IBSS, $s_0$ will be followed by the stations that joined the IBSS and elected to actively participate in its CRAM function in order of arrival. IBSS Scheduled beacon transmission is based on the stations order in the ordered set l.

As such, in D²QMAC IBSS CRAM active membership is governed by the following rules:

$$IBSS \begin{cases} \text{Let } I \text{ be the set of all stations in } IBSS \\ \text{Let } l \text{ be the ordered set of all stations actively} \\ \quad \text{participating in } IBSS\ CRAM \text{ function} \\ \text{Then } l \subseteq I, \text{ if } l \text{ is proper subset of } I, \text{ then} \\ \quad \text{not all } IBSS\ MSs \text{ are active } CRAM\ MSs \\ \text{Let } S_i \in l, \text{ represent the } i^{th} \text{ station in } l \\ \text{And } s_0 \in l, \text{ is the first element in } l \text{ represent,} \\ \quad \text{always be the } IBSS \text{ initiator } MS \\ \text{Let } d_{i-j} \text{ Represent the number of hobs between} \\ \quad MSs\ i \text{ and } j \text{ that are element of } l \\ \text{Then } S_i \in l \text{ iff } d_{0-i} = 1 \end{cases}$$

6.1.1 IBSS Initiator Station

In D²QMAC, a station can not establish an IBSS unless it is willing to participate in CRAM function. The station that establishes an IBSS is called the IBSS Initiator Mobile Station (IIMS). Unlike the IEEE 802.11 and other CSMA/CA standards, in D²QMAC a new IBSS must be formed and assigned a universally unique IBSS-ID, this requirement applies when MS is powered-up and no other station within its range has established an IBSS, also a new IBSS is formed as a result of IBSS split and one or more of the stations moves away from its IBSS or the IIMS moves away from them. As described earlier, the universally unique IBSS-ID is derived from the IIMS MAC address by setting the individual/group bit of the IIMS MAC address to 0 and the Universal/local bit to 1.

6.2 IBSS Resource Allocation and Management Function

Stations participating in IBSS Channel Resource Allocation Management (CRAM) function are responsible for controlling access to the shared channel resources by granting stations the right to access contention free period and identifying available contention periods within each SBTT period. As discussed earlier, in D²QMAC the station that generates an IBSS beacon frame exerts significant influence on how the common channel can be accessed within the SBTT period where it sent a beacon. Depending on IBSS topology, it is possible within a D²QMAC IBSS coverage area to observe one or more beacons; there should be one and only one scheduled beacon transmitted during the scheduled beacon period, and possibly zero, one or more beacons transmitted within the contended beacon period. One or more contended beacons will be sent within an SBTT interval if there were one or more hidden nodes from the CRAM station that sent the scheduled beacon for that SBTT; furthermore, it is possible that more than one contended beacon frame to be sent at the start of contended beacon period when two or more nodes that are hidden from each other are also hidden from the station that sent the scheduled beacon during that SBTT period. In general, however, there should be only one beacon transmitted within the IBSS during the SBTT period where the IIMS is the station that transmitted the scheduled beacon because all CRAM station should be first neighbors of IIMS and should receive its beacon frames; as such, when IIMS sends a scheduled beacon the contended beacon period should remain idle. $D^2QMAC$ employs the contended beacons technique to ensure that at every SBTT interval at least one beacon frame can be received by all stations residing within the IBSS geospatial coverage. The CFPS information element in beacon frames contents influence access permission to the CFPs; while the IBS and the beacon-schedule-index information elements in beacon frames identify the current IBSS CRAM membership list and the CRAM station required to send the next scheduled beacon.

CRAM stations duties includes the definition of IBSS boundary and CRAM team members management activities which include the detection of CRAM station leave event that occur as result of station moves away from IBSS, station taken out of service voluntary or involuntarily, or obstruction appearance between this station. and the rest of the IBSS CRAM stations. Station leave event may result in establishment of a new IBSS. CRAM stations must be able to detect IBSS network split event; this will cause establishment of new IBSS when this event is detected. CRAM membership list is maintained in the shared IBS. CRAM stations must detect IBSS networks merge event and gracefully dissolve one IBSS into the dominant IBSS.

In on-demand $D^2QMAC$ mode, IBSS CRAM stations are required to support CRAM join request from new stations volunteering to participate in the IBSS CRAM function. IBSS CRAM stations keep track of CRAM membership using a common IBS list. CRAM station that transmitted the Scheduled beacon within current SBTT interval is the only station empowered for the current SBTT period to accept or deny join request into the CRAM list. This responsibility is delegated in round robin fashion, as IBSS scheduled beacon will be transmitted according to order of the CRAM stations within the shared IBS list. CRAM stations are responsible for disseminating updates and maintaining synchronization of the IBS across all members of IBSS CRAM function.

In addition, in on-demand $D^2QMAC$ mode, IBSS CRAM stations are responsible for applying admission control policies to accept or deny any CFP reservation request issued by any station within the IBSS coverage area. In particular, the CRAM station that transmitted the currently scheduled beacon. is the only station authorized to admit or deny any additional CFP. This authority is rotated as stations in the IBS take turn in sending the scheduled beacon every SBTT period. CRAM stations keep track of allocated CFP periods using a common CFPS list. Finally, CRAM stations are responsible for reclaiming CFP that are not utilized and designate its period as contention period.

6.2.1 Participation in IBSS Resource Allocation Function $D^2QMAC$ employs a distributed Finite State Machine (FSM) to perform dynamic team management task. This FSM must be implemented by all stations that wish to participate in $D^2QMAC$ CRAM function. Upon power up, this CRAM dynamic team management FSM is responsible for channel scanning and either participation in existing IBSS or initiation of new IBSS. In addition, the FSM is responsible for processing join request, as well as detection and processing of IBSS leave, split, and merge events.

Figure 8:
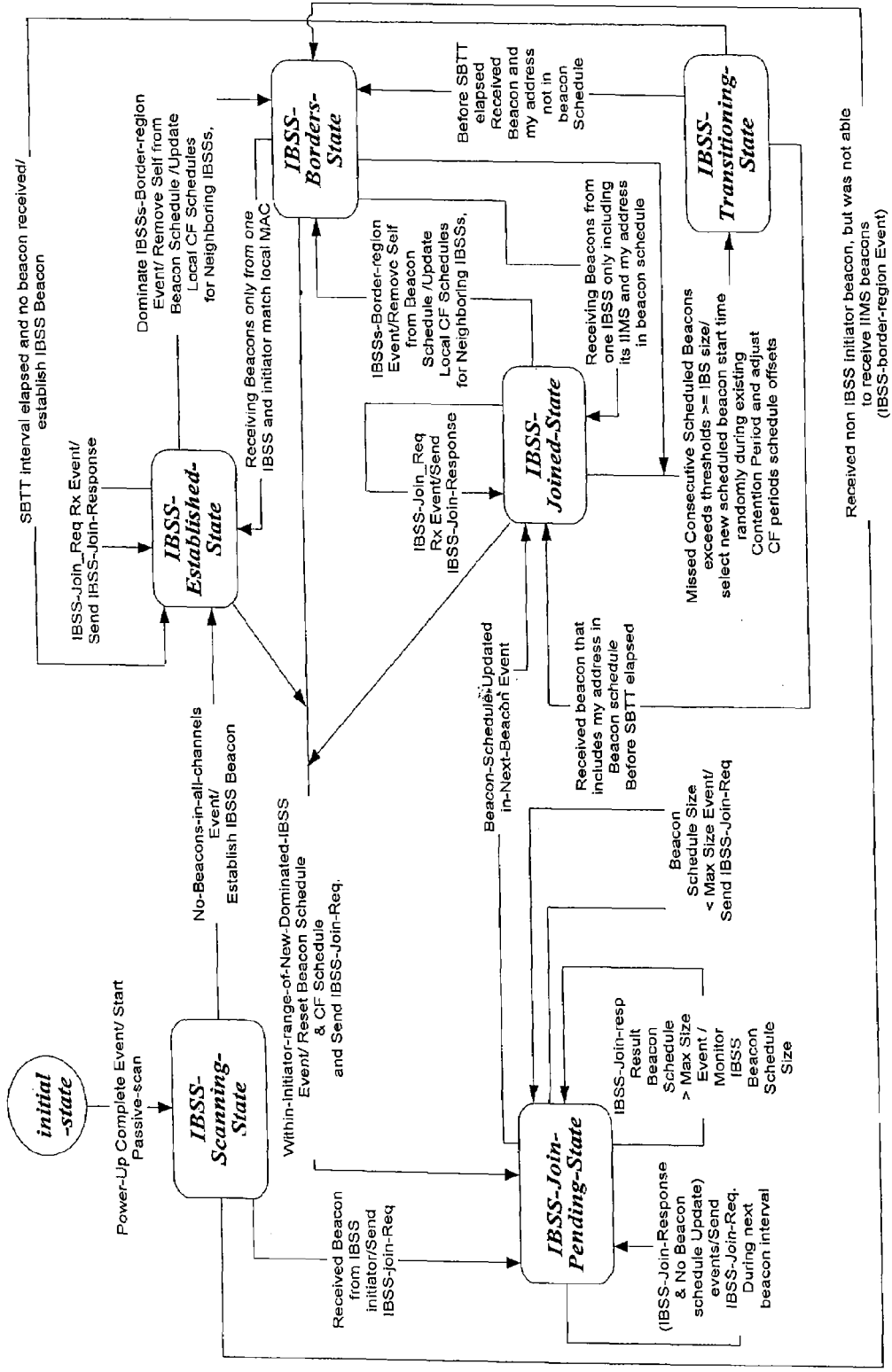
FIG. 8 is an example state machine, wherein the states, actions, and transitions of the finite state machine are depicted.

The $D^2QMAC$ CRAM dynamic team management FSM consists of six states; IBSS-scanning, IBSS-established, IBSS-join-pending, IBSS-joined, IBSS-transitioning, and IBSS-borders. The next figure depicts the states, actions, and transitions of this finite state machine. An example FSM according to the present invention is depicted in FIG. 8, wherein the states, actions, and transitions of this finite state machine are depicted.

Upon MS power up, the MS enters the Scanning state where the station monitors a channel for duration equals to its configured minimumChannelScanDwellTime parameter. If the MS station does not detect any IBSS beacon message during this period, the MS should scan the next channel in its configured list of channels. If the station does not find any IBSS beacons in any of the channels, then a no-beacon-in-all-channels event is declared and the MS is required to establish an IBSS by sending a scheduled beacon and changing its state to the Established state. However, if the MS detects a beacon from a $D^2QMAC$ IBSS, then the MS should join this IBSS.

FIG. 1 Finite State Machine $D^2QMAC$ CRAM Function Dynamic Team Management

Figure 9:
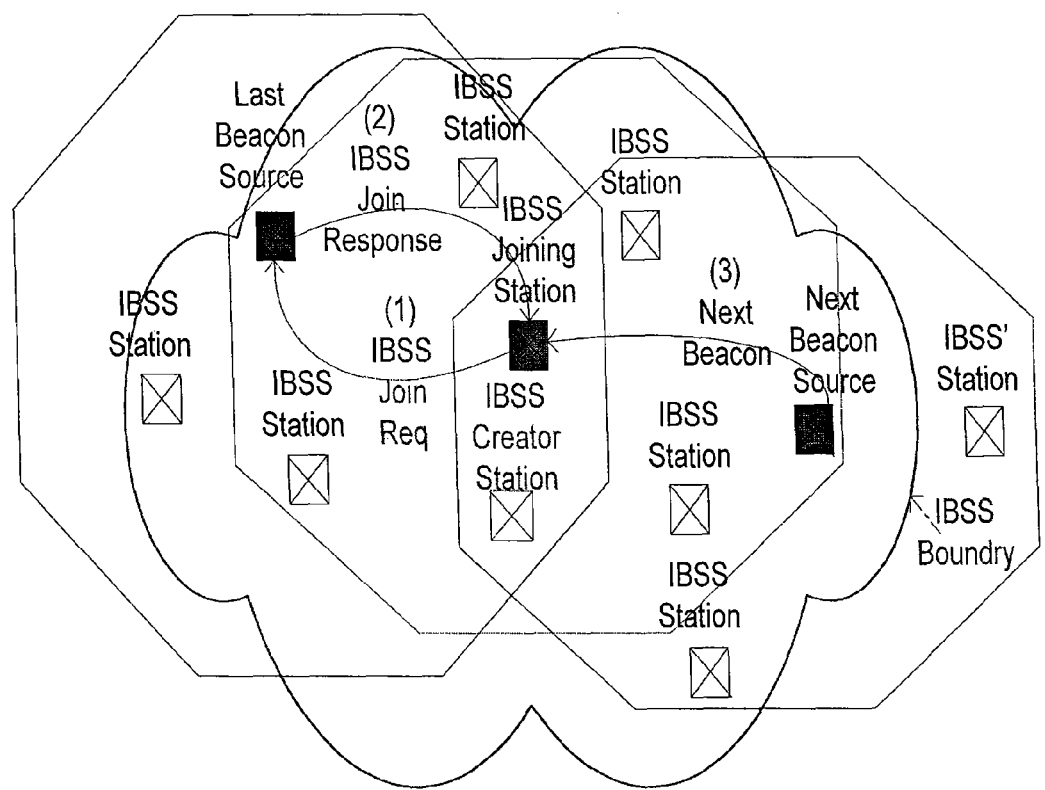
FIG. 9 is an illustration of an example three nodes IBSS join exchange sequence in a typical deployment scenario.

A station joins an IBSS by sending IBSS-JOIN-REQ frame to the station that transmitted the scheduled beacon during the current SBTT interval. A station should not attempt to participate in IBSS CRAM function unless it is direct neighbor of the IBSS initiator station, IIMS. As such, a station should not send IBSS-JOIN-REQ frame unless it was able to receive a beacon message transmitted by the IIMS. Upon transmitting the IBSS-JOIN-REQ frame, the MS station will set its state to Join-Pending State. The IBSS-JOIN-REQ frame shall be transmitted using contention access method during any contention period within the current SBTT interval. As such, the station sending the IBSS-JOIN-REQ frame does not need to have local copy of CFPS, instead it could use only the content CFPS received in beacon frames it was able to receive during the current SBTT interval to be able to identify the contention periods during the current SBTT interval. Upon arrival of the IBSS-JOIN-REQ frame at CRAM station that transmitted the scheduled beacon during current SBTT, then this station will examine the size of beacon-schedule table to determine if a new node could be added to the existing table, Local configuration of the IBSS may include policy limiting the maximum permitted size of Beacon schedule. If the configured policy does not prevent the station from joining the IBSS, then the station that sent the scheduled beacon must send an IBSS-Join-Response management frame with result field set to Accept to the joining station. IBSS-Join-response frame with result set to Accept should be sent to the joining station even if the joining station was already listed in the IBSS Beacon Schedule. The joining station shall remain in Join-Pending state, and will wait for next scheduled beacon. If during the next scheduled beacon frame contains an IBS element with the join station listed as an entry in that schedule, the joining station considers its attempt to join the IBSS CRAM function successful and transitions to the Joined state. $D^2QMAC$ uses this three nodes exchange to extend the geospatial coverage of messages in join activity to allow the maximum number of stations participating in CRAM function to receive indication of IBSS Beacon Schedule (IBS) changes; expanding the geospatial coverage of notification of IBS changes reduces the probability of out-of-sync condition in IBS among IBSS CRAM stations. Stations that receive one or more of the three messages exchanged during CRAM join process should be able to update their beacon schedule locally to remain in sync with IBSS global beacon schedule. CRAM station are aware of changes in IBSS Beacon Schedule (IBS) either by receiving the IBSS-JOIN-REQ frame sent by the joining station to the station that originated the current scheduled beacon, by receiving IBSS-Join-response management frame from the station that originated the current scheduled beacon, or through the contents of IBS in the beacon frame originated by the station that was scheduled to send the next beacon. FIG. 9 is an illustration of an example three nodes IBSS join exchange sequence in a typical deployment scenario. FIG. 9 illustrates the geospatial coverage for IBSS join exchange in this station deployment scenario and shows the number of stations that will be able to update its local beacon schedule upon receiving one of the three management frames involved in the join exchanged.

If the available resources or configured policy does not allow the requesting node to join the IBSS, then response message will include results field set to value other than accept, the value will define the rejection reason. Policy limiting the maximum size of IBSS CRAM stations and authentication failures are two examples of reasons for rejecting IBSS join request. All CRAM stations that received the IBSS-JOIN-REQ frame will evaluate the request locally and should be able to reach the same conclusion as the CRAM station that transmitted the scheduled beacon in the current SBTT which should prevent them from updating their local IBS even when they not in range to receive the IBSS-JOIN-RESP rejecting the request.

A joining station upon transmitting an IBSS-JOIN-REQ frame may not be able to receive IBSS-join-response, however this station may consider its join attempt successful upon receiving a scheduled beacon frame in the next SBTT interval with IBS information element reflecting an updated that includes the joining station; this should cause the joining station to continue the join process by transitioning to Joined state. As such, it is not necessary to retransmit IBSS-JOIN-REQ multiple times during a single SBTT period, the joining station should not assume loss of IBSS-JOIN-REQ frame; instead for efficient use of bandwidth, it is recommended that the joining station wait for the next scheduled beacon message and retry to join the IBSS if the subsequent beacon frames do not have the joining station listed in the IBS information element in the received beacon frames. Note that during each SBTT period the CRAM station that sent the scheduled beacon is the only station authorized to update the shared IBS; limiting changes of shared IBS to single station prevents any potential of simultaneous and incompatible changes in the IBS contents within the IBSS performed by two or more hidden CRAM stations that may generate contended beacons. Furthermore, a joining station is not required to re-attempt to join an IBSS, if it receives an IBSS-Join-Response frame with Accept result, and the next scheduled beacon frame did not arrive at the joining station at its period in next SBTT, however the joining station was able to receive a contended beacon instead during the next SBTT confirming the reservation process by listing the new station MAC address in the IBS, then the station should transition to Joined state. In addition, the joining station does not need to wait for next beacon when the beacon schedule, IBS, information element in the beacon frame body consists of one station only, the IIMS. In this case, the IBS size increases to two stations when IBSS-Join-Response frame with Accept result field is received at the joining node.

Similar to beacon frames, IBSS-Join-Req and IBSS-Join-Response frames must be sent using the basic Transmit rate and power that provides maximum range and highest SNR ratios for receivers in order to extend the coverage of these messages to maximum distance.

As a consequence of station mobility, distance between a CRAM station and the initiator of its IBSS may exceed one hop, that CRAM station will not be able to receive beacon frames from the IBSS initiator (IIMS), it may also seize to receive any beacon frames from all other IBSS CRAM stations. When a CRAM station does not receive the IBSS initiator scheduled beacon frames for maxScheduledIIMSmissCnt consecutive times, but continues to receive beacons from one or more other CRAM station in its IBSS, this condition should cause that station to declare border-region event which should cause it to abandon its role in managing the IBSS resources, CRAM function, by not sending beacon messages for the IBSS during scheduled or contended beacon periods and should transition from Joined into Borders state. A station in Scanning state that is able to receive Beacon frames from any IBSS CRAM station but is not able to receive the IIMS scheduled beacon frames for maxScheduledIIMSmissCnt consecutive SBTT intervals should declare border-region event and change its state from Scanning to Borders state.

Stations in Borders State are called IBSS border Stations. IBSS border stations should maintain local copy of IBS and CFPS based on received beacons from non IIMS stations in their IBSS. However, IBSS border stations should not transmit scheduled or contended beacon frames. MS Station in Joined state or IIMS in Established state shall transition to Borders state when they receive beacon messages from CRAM stations participating in a second dominant IBSS but don't receive the beacon frames of the IIMS for that dominate IBSS. These stations should declare border-region event because they have detected their presence in overlapping coverage region of their IBSS and another dominate IBSS. An IBSS border-station should remain in that state if it receives beacons from two IBSSs without being first neighbor of IIMS of overlapping dominant IBSS. A border station should abandon its Border state and transition to Joined or Established state if it has not received Beacon frames from any other Dominant IBSS for at least minMissedDominantBeacons Consecutive SBTT intervals while it is the IIMS station for its IBSS; or it is able receive Beacon frames from the dominant IIMS. A Dominant-Beacon-miss counter will be set to zero each time a dominant beacon is received and incremented each SBTT interval elapsed with receiving a beacon from a dominant IBSS.

When a station operating in Joined state does not receive consecutively at least maxIbssScheduledBeaconMissCnt beacon messages from its IBSS CRAM stations; and that station is currently scheduled to transmit the IBSS next scheduled beacon, or if that condition applies to a border-station; then that station has detected an IBSS leave or split event, and it should attempt to establish new IBSS by sending Soliciting-CRAM-Stations management frame during a contention period in its IBSS, the station should await a CRAM-solicit-response frame from any station currently actively participating in the IBSS CRAM function, stations operating in Joined or Established state. Once a response is successfully transmitted by one of the active CRAM stations; then all other CRAM stations that were able to receive that response frame and were contending to send a response should not send additional CRAM-Solicit-response frames. The response frame will include current image of IBSS beacon schedule and CF-periods schedule. If the response was not received within SBTT period, the station should transition from IBSS-joined state/or borders state to transitioning state. During this state transition; the station establishing new IBSS must select a new time to mark the start of Superframe used as common time reference for the new IBSS. This time reference should be selected to coincide within a randomly selected contention period within the SBTT interval of the previous IBSS, where the selected contention period duration must be long enough to allow transmission of scheduled beacon and a contended beacon. The new SBTT scheduled beacon start time selected randomly to mark the start of the new IBSS Superframe structure will be used by the CRAM station establishing the new IBSS to identify when it will transmit the scheduled beacon frame for the new IBSS. This CRAM station that will establish a new IBSS will use its own MAC address as basis for new IBSS-ID by setting the individual/group bit to zero and the universal/local bit to 1. This CRAM station should wait for this randomly selected time to pass in order to start sending the beacon for its new IBSS.

It is important to maintain long duration contention periods between the IBSS reserved CF periods; in particular, the decentralized CFP allocation algorithm used by $D^2QMAC$ CRAM station should ensure that duration of any contention period within an SBTT interval should not be shorter than the combined duration of scheduled beacon period and contended beacon period. Whenever CRAM stations assign CFP they should consider this constraint. When allocating new CFP, CRAM stations should identify the longest contention period in the IBSS time frame structure using the CFP offsets in the CFPS, and the CRAM station allocating a CFP should center the newly reserved CFP at the middle of that contention period, provided that the duration of the new contention periods before and after the newly allocated CFP remain longer than duration of both the scheduled beacon and the contended beacon periods.

As such, assuming that $O_i$ represents the time offset between the start of SBTT period and the start of the $i^{th}$ CFP in the IBSS CFPS, For any two consecutive CF periods, i & k, in the IBSS CFPS where i<k, the following condition must be satisfied $$O_j - O_k > T_i + T_{sb} + T_{cb}$$ Equation 12

Where $T_i$ is duration of $i^{th}$ CFP, $T_{sb}$ is duration for scheduled beacon period, and $T_{cb}$ is duration of contented beacon period.

When station in Transitioning state establishes a new IBSS, it will continue to use the elements in the IBS and the CFPS of its previous IBSS. However, the offset value for all the CF periods in the CFPS must be adjusted to new IBSS SBTT start time in order ensure that these periods still occur at the same periodic scheduled interval. The offset of these periods will be adjusted by computing new offset values based on the current timing of the start of the new IBSS Superframe. This is accomplished by computing timing offset between the start of the new IBSS Superframe that this IIMS has selected and the start of the original IBSS Superframe, then subtracting this computed timing offset value from the offset value of each CFP that was recorded in the CFPS of the original IBSS. Any negative CFP offset value will be adjusted by adding the SBTT interval to the negative offset in order determine its current offset relative to the start of the new Superframe for the new IBSS.

The following diagram depicts the transitioning of CF periods by the station establishing a new IBSS after leaving an established IBSS.

Figure 10:
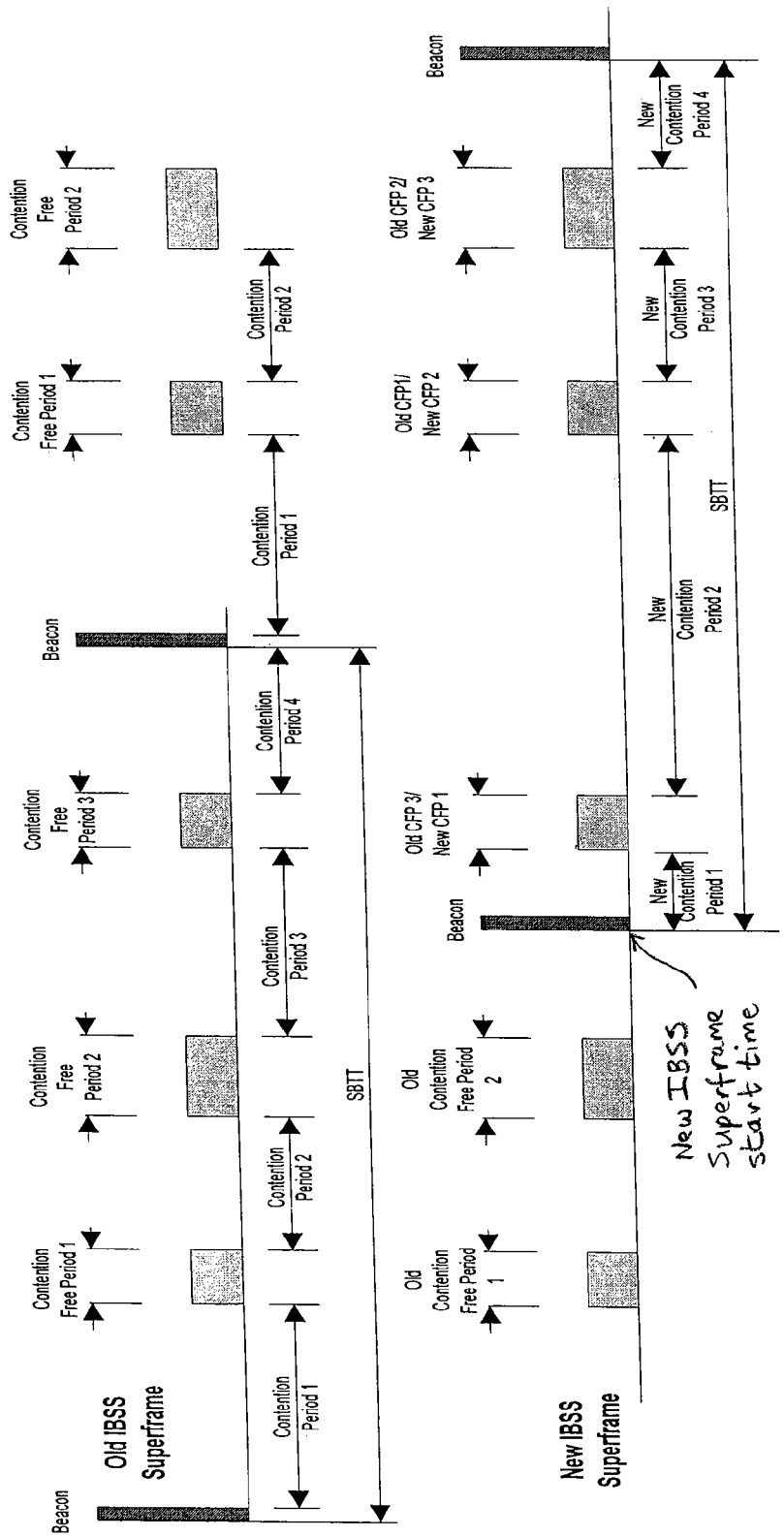
FIG. 10 is a diagram that depicts the transitioning of CF periods by a station establishing a new IBSS after leaving an established IBSS.

FIG. 10 is a diagram that depicts the transitioning of CF periods by the station establishing a new IBSS after leaving an established IBSS.

Maintaining CF periods timing minimizes disruption of CF traffic upon IBSS initiator absence, reduces the negative impact of transient IBSS split and merge events on traffic transmitted during CF periods, and it also minimizes the probability of scheduled beacons collisions when two IBSSs overlap.

Any station in transitioning state that receives beacon message from an IBSS, or CRAM-Solicit-response frame, must abandon its attempt to establish new IBSS and transition to borders state instead. Stations in borders state, IBSS border-stations, should join the IBSS once a beacon from initiator station for that IBSS is received. No join process exchange is required if the MAC address of the IBSS-border-station was already listed in the new IBSS-beacon schedule. The station simply changes its state to Joined state and starts sending beacon at its scheduled time in the new IBSS. If the station MAC address was not already in the new IBSS beacon schedule announced in the initiator beacon, the station should send IBSS-RSV-REQ management frame and transition its state from Borders state to Join-Pending state. The station should complete the join process until it successfully reaches the Joined state.

Now if an IBSS border-station was able to receive beacons from more than one IBSS during one SBTT interval, the station should remain in borders state and should not attempt to join any IBSS until it is able to identify its dominating IBSS. An IBSS is considered a dominating IBSS whenever a CRAM station is able receive beacon frames from the initiator of that IBSS and not able to receive beacons from IIMS of any other adjacent IBSS. However, if the CRAM station is first neighbor and able to receive beacons of more than one IIMS that established the overlapping IBSSs, and if scheduled beacons are received regularly from these IIMS CRAM stations, a CRAM station operating in borders state should join a dominating IBSS; and in this that is the IBSS with lower ratio of missed scheduled beacons to IBSS-beacon-schedule-size.

Also, any station in Joined, Borders, Join-Pending, Established, or Transitioning state that discovers that it is first neighbor of IIMS of another dominating IBSS then it should abandon its IBSS and join the other IBSS; even if that station was either first neighbor of IIMS of its IBSS (Joined State) or it is the initiator of its IBSS (Transitioning state). An IBSS is considered dominating IBSS for a CRAM station whenever any of the following conditions is met:

1—If the CRAM station current CFPS has no entries and the other IBSS have one or more CFP allocated.
2—If the CRAM station local CFPS a proper subset of the CFPS for the other IBSS.
3—If CRAM station Local CFPS is identical to the CFPS for another IBSS, but the other IBSS has more entries in its IBSS beacon schedule.
4—If the CRAM station local CFPS content does not match the CFPS for other IBSS but its local CFPS has fewer entries than the CFPS of the other IBSS.
5—If CRAM station CFPS has same number of entries as CFPS of the other IBSS but the IBSS beacon schedule for the other IBSS has more entries than the CRAM station's IBSS beacon schedule.
6—If non of the condition above are met, then if IBSSID for the CRAM station is found to be lower than IBSSID of adjacent IBSS using reverse-MAC compare method, where the Least Significant Octet (LSO) of IBSSID of the CRAM station current IBSSID is smaller than the IBSSID of the other IBSS, and if they are equal the second LSOs is used to compare, continue until all 6 octets are used. Note that IBSSID is global unique since IBSSID in $D^2QMAC$ equals the initiator MAC address which will guarantee that one IBSS will be dominant over other overlapping IBSSS.

This process allows D²QMAC stations to gracefully handle IBSS join and merge conditions.

As we explained earlier, D²QMAC also gracefully handles IBSS leave and IBSS split conditions; when the station that established an IBSS moves away from other stations participating in its IBSS, this IIMS station will not establish a new IBSS, instead all other stations that will miss the initiator scheduled beacons will transition to Borders state and will seize to send beacon messages upon detecting maxScheduledIIMSmissCnt consecutive missing beacon messages from the IBSS initiator station. The first station that transitions to Transitioning state shall become the IIMS for the new IBSS; this is the first IBSS station that detects at least maxIbssScheduledBeaconMissCnt consecutive missing scheduled beacon messages; this condition must occur because IBSS scheduled beacons will not be sent by all other stations that also transitioned to borders state in its IBSS when IIMS moves away. All other stations in Borders state should join the newly established IBSS and follow the new SBTT timing and adjust their local image of the IBSS beacon schedule and the CF periods schedule. These CRAM stations will join the new and dominant IBSS and will start transmitting beacons at the new scheduled time, these stations will find their MAC address already in that new IBSS beacon schedule. In addition, these stations will be able to continue sending their CF frames on their original scheduled CF periods without any jitter or delay because these CF periods should remain time aligned between previous and new IBSS.

6.2.2 CF Period Reservation Process

When operating in D²QMAC on-demand mode, any station within the coverage area of an established IBSS may reserve a contention-free period, CFP, using D²QMAC CFP reservation process. The reserving station must compute the Channel-Allocation-Vector (CAV), this is the time period that the station needs to reserve in order to be able to transmit acknowledged or unacknowledged contention free data frame in the reserved CFP. The reserving station in estimating the CAV duration should consider the full duration necessary to complete a nomial data exchange, i.e. include the time duration required to send CTS, RTS frames if they will ever be used before sending the data frame to any MS along with time required for ACK frame and also necessary Inter-Frame Space (IFS) durations required between RTS, CTS, DATA, and ACK frames. Once a CFP is reserved, the station should its CFP every SBTT interval to send data frames; it is not required to use CTS and RTS at every CFP, in fact a CFP may be used to send Multicast frame. In addition, it is not required to send frames to same destination station in all SBTT periods, nor it is required to send the same message length every SBTT period. As such reserved CFP should busy at start of its duration but becomes idle before the end of its duration; trailing end of CFP duration may be idle in some SBTT periods and could be utilized by other stations for contention traffic by stations that have received contention free frame and used its CAV in the frame header to identify when CFP exchange will terminate. Note that it is required in CAV calculation to assume that all frames transmitted during CFPs will be sent using the rate and power levels that provides the maximum range and highest SNR at receivers. This allows the duration period to be used to communicate at the same rate with any IBSS node irrespective of the distance between the source and destination nodes.

The CFP is an exclusive duration of time, Time Slot (TS), which occurs every beacon period, SBTT, at the same time offset from the start of the IBSS SBTT. CFP is allocated by IBSS CRAM station exclusively to the requesting station; once a CFP is allocated to a station, that station is the only station that can initiate any message exchange during that period.

CFP reservation should not be performed unless the reserving station expects to provide a consistent load of data with throughput, delay or delay jitter QoS constraints for extended time period, for example when a station supports multimedia applications that transmit constant traffic stream with very strict bandwidth and delay requirements. CF periods must be used in order to avoid D²QMAC automatic reclaim process enforced by the IBSS CRAM stations required to detect each time a channel is idle for the entire duration of a CFP, and if the condition occurs during the same CFP in consecutive SBTT intervals exceeding the "maxCFPIdleCnt" value configured for the IBSS then this is considered by these IBSS CRAM stations as an indicator that the station that that was assigned the CFP migrated away or powered down.

CFP reservation process used in D²QMAC on-demand mode employs a three node exchange scheme to extend the geospatial coverage of the CFP reservation process. This approach strives to improve synchronization of CFPS across IBSS members by maximizing the number of IBSS stations that will be made aware of new CFP reservation request. CFP Reservation request frame should be sent only to station that transmitted the last scheduled beacon message in the current SBTT. CFP reservation request should not be sent to a CRAM station that sent contended beacon, and these CRAM stations shall not respond to the request if they receive it.

Figure 11:
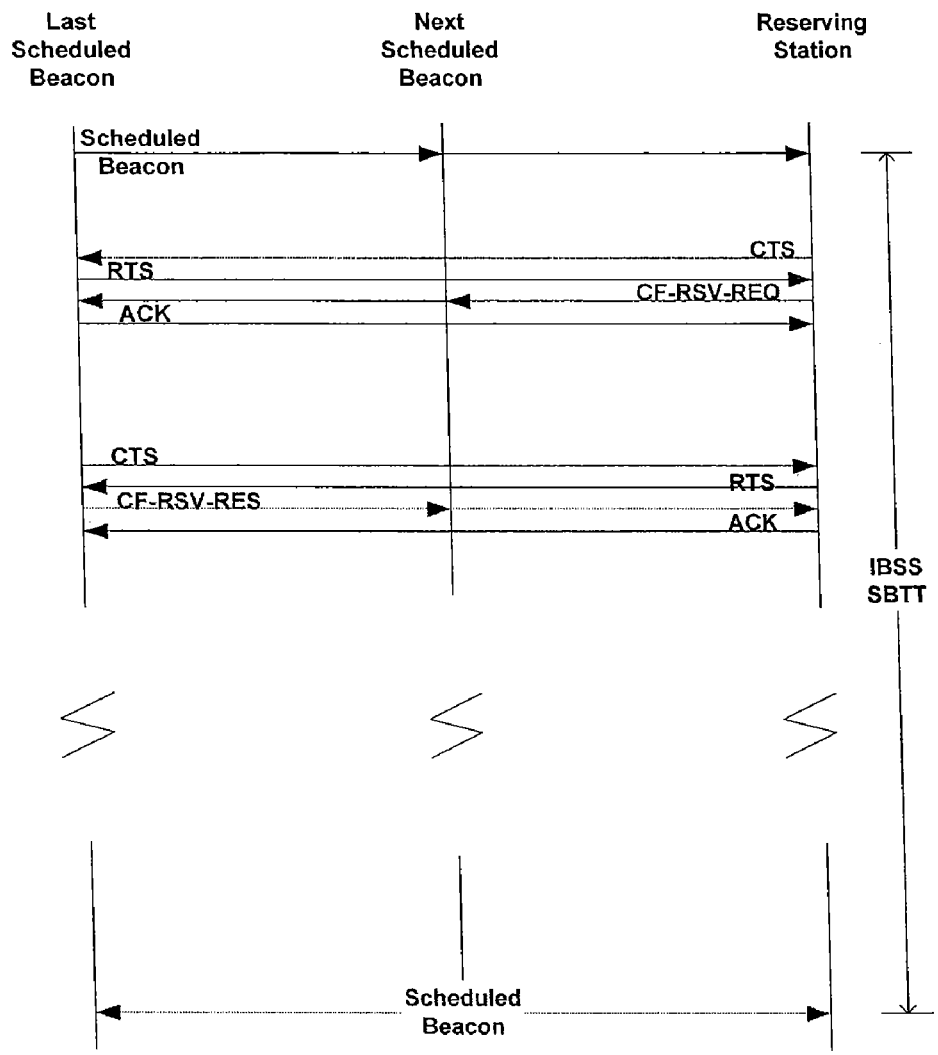
FIG. 11 is a ladder/sequence diagram that depicts a three node CFP reservation exchange in connection with FIG. 10.

FIG. 11 is a ladder/sequence diagram that depicts a three node CFP reservation exchange as described above.

A station initiates a CFP reservation request by sending CF-RSV-REQ frame to the station that transmitted the scheduled beacon in the current SBTT period. This management frame must be sent using basic rate and power level that provides maximum coverage and highest SNR at receivers. The station that sent the last scheduled beacon frame for the IBSS will examine this request frame and responds by sending a CF-RSV-RSP frame that will include the CFP duration, and CFP offset information elements in its body indicating successful CFP reservation when the IBSS configured policy and current state of IBSS CFPS permit granting the requesting station a CFP. CFP request may be rejected if the maximum number of IBSS CF periods in the schedule has already been allocated. The CF-RSV-REQ frame may be rejected, if the ratio of total duration of reserved periods ($P_{CF}$) to duration between scheduled beacon transmit period (SBTT) exceeds predetermined threshold (CFPS2SBTTratio=$R_{th}$), $R_{th} < P_{CF}$/SBTT. In addition, CF-RSV-REQ frame may be rejected, if the CF-RSV-REQ frame body includes an optional CF-desired-offset field that can't be fulfilled due to overlap with one of the currently allocated CFP in the CFPS. Also CF-RSV-REQ frame may be rejected, if the requested CFP duration exceeds the maximum allowed CFP duration; maximum allowed CFP is minimum time required to transfer max-MAC-frame size plus CTS, RTS, and ACK with three SIFS periods. And finally, as we explained earlier, CFP request may be rejected because a new CFP can not be placed within Contention period in the IBSS Superframe structure while maintaining each contention period durations long enough to accommodate schedule and contended periods should the IBSS needs to be split. Each IBSS will have its CFPS2SBTTratio ($R_{th}$) and Maximum size for CF Periods schedule announced in the "CF Parameters" information element in beacon frames.

Figure 12:
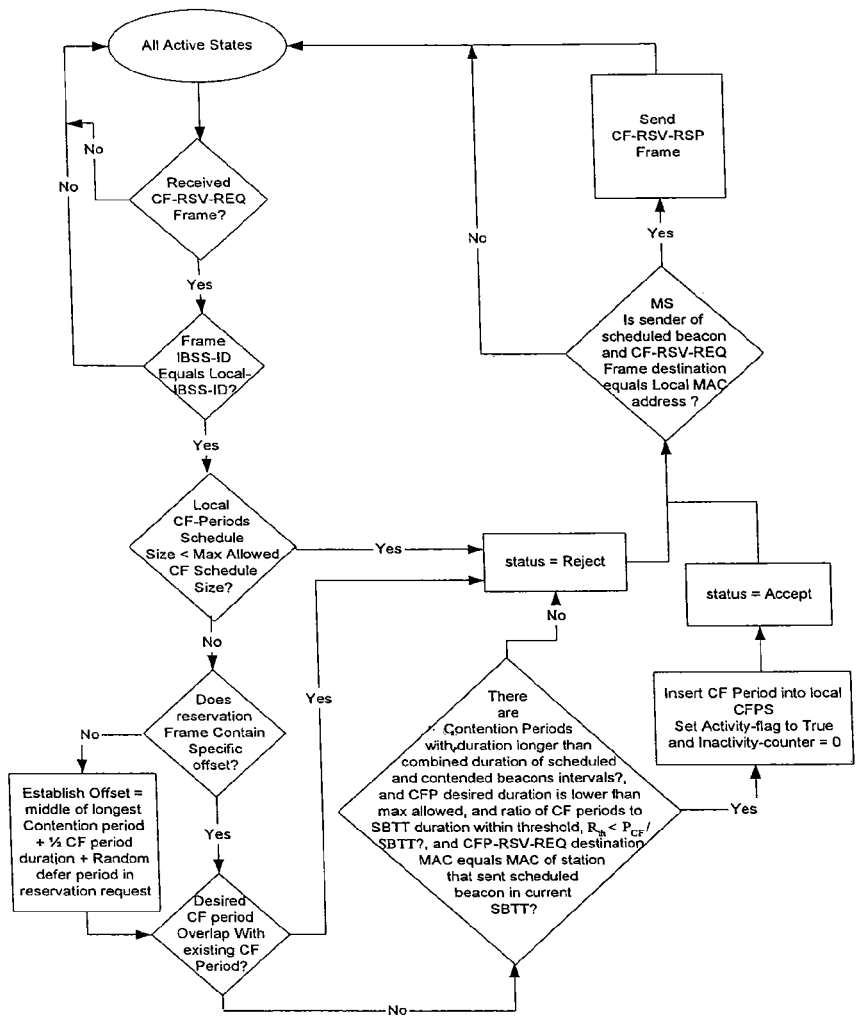
FIG. 12 is an example flow chart of processing a received CF-RSV-REQ management frame.

All IBSS stations that receive CF-RSV-REQ management frame should process it similar to the station that transmitted the schedule beacon as described in the flowchart of FIG. 12.

This will allow all IBSS stations to maintain synchronization of their local CFPS even when not all IBSS stations will be able to receive the response frame nor the next scheduled beacon frame.

Upon reception of CFP-RSVP-RESPONSE management frame by any IBSS MS that did not reserve that CFP, these MS should process the response management frame to maintain synchronization of their local CFPS. These MS should add new CFP to their local CFP as shown in the flowchart depicted in the flow chart of FIG. 13.

When a MS station operating in IBSS-Joined or IBSS-Established state detects that CFP was assigned to the MS that reserved it, but the CFP overlaps with one or more active CFP in the local CFPS, then the station should send IBSS-SYNC-UPDATE management frame listing overlapping CF periods as missing CFP. Section 77.1 describes $D^2QMAC$ use of IBSS-SYNC-UPDATE management frame as an out of synchronization recovery mechanism.

A reserving station that received a response with reservation confirmation reflected by the CFP allocation information in the response will not assume successful reservation and will not be able to use this reserved CFP until it receives next scheduled beacon with CFPS information element that includes this new CFP triple with matching duration, offset, and MAC address values. The station should assume successful reservation upon receiving a successful response, only when the shared IBS consists of two members, the reserving station and the station that transmitted scheduled beacon; in addition, the reservation will be considered successful, if no beacon message was transmitted in next scheduled beacon transmission time (SBTT), and the reserving station succeeds in winning the contention for sending the beacon. Also, receiving a contended beacon with CFPS that includes the CFP triple is sufficient to indicate successful reservation; on the other hand, when receiving next beacons, contended and scheduled, with CFPS information element that does not include the CFP requested should cause the reserving station to assume unsuccessful reservation attempt; this station may retry the CFP reservation attempt again with the new station that transmitted the scheduled beacon in the current SBTT. If a station retries and succeeds in reserving CFP but later discovers that beacon frame was sent with CFPS JE that includes double allocation for the request period, the reserving station should use only one the reserved periods, and the other period should remain idle and will eventually be reclaimed by the IBSS CRAM stations.

Border stations that receive beacon messages from more than one IBSS should track overlapping region of contention periods in both IBSS, the station should use these regions to send contended messages. Also, IBSS-border stations that have reserved CFP(s) but find that any of their CFP is overlapping with CF period in the other IBSS should abandon this CFP and reserve an alternative CFP that avoids overlap with any other CFP in any of the IBSS(s) within its reception range. It should send the CF-RSV-REQ frame and setting desired offset information element value for each IBSS to ensure that it reserves CFP with proper alignment with already reserved CFPS on these adjacent IBSSs. And if border station has a reserved CFP in its IBSS and there is no conflict in its CFP alignment with all CFP(s) in the CFPS of the adjacent IBSS, then the border-station may reserve a CFP with specific offset from the other IBSS such that the reserved CFP coincides, starts and ends, with its already reserved CFP and will be allocated within a contention period within the SBTT interval of the adjacent IBSS.

6.2.3 CF Period Reclaim Process $D^2QMAC$ on-demand mode supports two methods to allow CRAM stations to reclaim bandwidth associated with a CFP when it is no longer used or needed by the MS that reserved it; these are the explicit CFP release method and the implicit CFP release method.

The explicit CFP release method allows a MS to declare to all other the IBSS stations that it is no longer needs a CFP that was previously allocated to it as indicated in the CFPS information element in the scheduled beacon transmitted during the current SBTT interval. When a station decides that it is no longer needs a CFP that has been allocated to it, it should remove that CFP from its local copy of the CFPS; then it should send RELEASE-CFP-REQ frame to the station that transmitted a scheduled beacon message. This process can be initiated when that station receives a scheduled beacon message with CFPS information element that includes a CFP allocated to it but it does not have that period in its local copy of CFPS and it does not intend to use that CFP in the near future. When RELEASE-CFP-REQ frame is received by the station that transmitted the Scheduled beacon during the current SBTT, that station should examine its CFPS in order to locate that CFP, the station should remove the CFP from its local CFPS and it should respond to that station that reserved to period and send the release request by sending RELEASE-CFP-CONFIRM if the CFP for the requesting station was located and removed. All IBSS stations that receive RELEASE-CFP-REQ or RELEASE-CFP-CONFIRM frames should remove the CFP form their local CFPS if it exists.

The implicit CFP release method is performed by all CRAM stations by reclaiming any CFP in the shared CFPS when that CFP is not used for more than maxCFPIdleCnt consecutive SBTT periods. This method allows CRAM stations to reclaim CFP bandwidth when station that reserved the CFP has moved away, powered down or failed. The CRAM station that does not detect activity during entire duration of a CFP for more than maxCFPIdleCnt consecutive SBTT periods should remove the CFP from its local copy of CFPS at that start of SBTT and before transmitting the scheduled beacon for that SBTT. CRAM stations that receive scheduled beacon that is missing CFP and find that they have not detect any activity during this duration of this CFP since the CFP was added to their CFPS should remove this CFP; however, if a CRAM station have detected activity during this CFP, then that station should send IBSS-SYNC-UPDATE management frame to the station that sent the scheduled beacon to indicate to it that a CFP is missing from the CFPS. Next section will cover use of IBSS-SYNC-UPDATE management frame use to handle CFPS partial sync condition within $D^2QMAC$ IBSS.

7. Out-of-Sync Avoidance, Detection, and Mitigation Techniques

Maintaining common agreement on the current state of the IBS and CFPS across all IBSS stations is a prerequisite for decentralized coordinated contention free access control. $D^2QMAC$ employs various techniques to ensure that changes to IBS and CFPS are controlled and disseminated to maximum number of IBSS station in efficient and effective manner. $D^2QMAC$ limits changes in IBS and CFPS to single CRAM station during each SBTT interval to prevent incompatible concurrent changes by hidden stations within the IBSS; and $D^2QMAC$ leverages the periodic beacon messages to confirm and disseminate changes in IBS or CFPS which eliminates the need for additional management messages. The periodic beacon messages are exploited to implement a three messages exchange procedure used to reserve CFP and during IBSS join process. This reduces the consumed bandwidth necessary to propagate changes to maximum number of IBSS stations.

These measures are designed to ensure that all IBSS stations will be able to maintain common agreement on the current state of the IBS and CFPS for their IBSS. Unfortunately, in the real world maintaining common agreement on current state of IBS and CFPS across IBSS stations is unattainable goal because of temporal imprecision in wireless communication. In general, wireless links are prone to failure and transmission errors. The mobility of the nodes further exasperates the volatility of the communication links. While the three-nodes exchanges employed by $D^2QMAC$ will extend the dissemination region of messages that communicate changes in the shared state of the IBS & CFP; this technique does not guarantee that all IBSS stations will be able to receive any of the messages transmitted in a three-nodes exchange. For example, since it is permissible within an IBSS to have several CRAM stations that are not directly in range and required to participate in transmitting the IBSS scheduled beacon. These are considered hidden IBSS CRAM stations because they can't communicate directly. Any time one of these hidden CRAM stations sends a scheduled beacon, it may receive reservation or join request from any other IBSS station that was able to receive the scheduled beacon; however, this requesting IBSS station may also be hidden from one or more the other IBSS CRAM stations that were hidden from the CRAM station that sent the scheduled beacon during current SBTT; and as a result the first two messages in three-nodes exchange request updates the local image of IBSS schedule at the station that initiated the request and the station that transmitted the most recent scheduled beacon; then assuming that the next scheduled beacon is transmitted by a CRAM station that happen to be also within close proximity from both stations which implies that its beacon likely will not reach the other IBSS CRAM stations that were hidden from these three stations. As such, one or more hidden CRAM stations may not receive any of the messages in a three-nodes exchange. Now considering the wireless errors, and station mobility, this scenario could occur at any CRAM station. Subsequently, we conclude that mobility, errors, or hidden nodes phenomena common in wireless environment, may cause one or more stations to experience out-of-sync condition in its IBS or CFPS despite the three-nodes exchange scheme and other measures taken in $D^2QMAC$ to maintain synchronization of IBSS beacon schedule and IBSS CF periods schedule across the IBSS stations. More over, a station may elect to sleep for short duration to save energy could become out of sync if updates occur while this node is in sleep mode.

$D^2QMAC$ employ several scheme to rapidly recover and minimize the undesired side effects of IBSS out-of-sync condition. The beacon frames in $D^2QMAC$ must include current state of IBS and CFPS as perceived by the station that transmitted the beacon. A scheduled Beacon frame must be sent every SBTT interval and potentially several contended beacons may also be sent during each SBTT interval. These beacon frames allow all IBSS stations that receive them to continually compare their local image of the IBS and CFPS against the IBS and CFPS as perceived by the stations that sent the beacon message. IBSS CRAM stations that detect mismatch in the IBS and CFPS will update their local image or inform the station that generated that beacon frame to allow it to update its IBS or CFPS using IBSS-SYNC-UPDATE management frame; next sections describe this $D^2QMAC$ decentralized out of synchronization recovery process in more details.

7.1 IBSS-OUT-SYNC Management Frame $D^2QMC$ detects IBS and CFPS out-of-sync condition among IBSS stations using the periodic beacon messages; and it utilizes the IBSS-SYNC-UPDATE management frame to recover from out-of-sync among CRAM stations. The main goal of IBSS-SYNC-UPDATE management frame is to notify the CRAM station that transmitted a beacon frame in the current SBTT interval of missing data in IBS or CFPS. The IBSS-SYNC-UPDATE frame generate will list missing contention free periods in the CFPS and missing CRAM stations entries in the announced IBS in the received beacon frame. Other IBSS stations able to receive that IBSS-SYNC-UPDATE frame will process this frame in order update their local copy of IBS and CFPS when necessary.

7.1.1 CFPS Out-of-Sync Detection and Recovery

Upon receiving a beacon frame, each MS must compare its local copy of CFPS against the CFPS in the received beacon. If the received beacon's CFPS contains CF periods that are not present in its local CFPS, then the MS should bring its local CFPS up to date by adding all those missing CF periods to its local CFPS. However, CFP addition is allowed only for each CF period that is not in local CFPS and not overlapping with any CF period in the local CFPS. The following equation provides formal description of this process applied at every SBTT interval by all IBSS stations to update their local CFPS.

$$LCFPS_{new} = \{CFP: CFP \epsilon D_j, \text{ and } CFP \text{ does not overlap with any } CFP \epsilon D_j\} \quad \text{Equation 13}$$

Where $LCFPS_{new}$ denotes the local copy of CFPS at MS $S_j$; and $D_j$ denotes the IBSS aggregate list of designated CFPs as perceived by MS $S_j$ during the current IBSS Superframe interval as defined previously in $Dj = \cup Rj \cup LCFPS_j$ Equation 6.

The Activity-flag to false and the CFP attribute inactivity-Counter to zero for each CFP added by IBSS MS $S_j$ to its local CFPS attribute.

Figure 14:
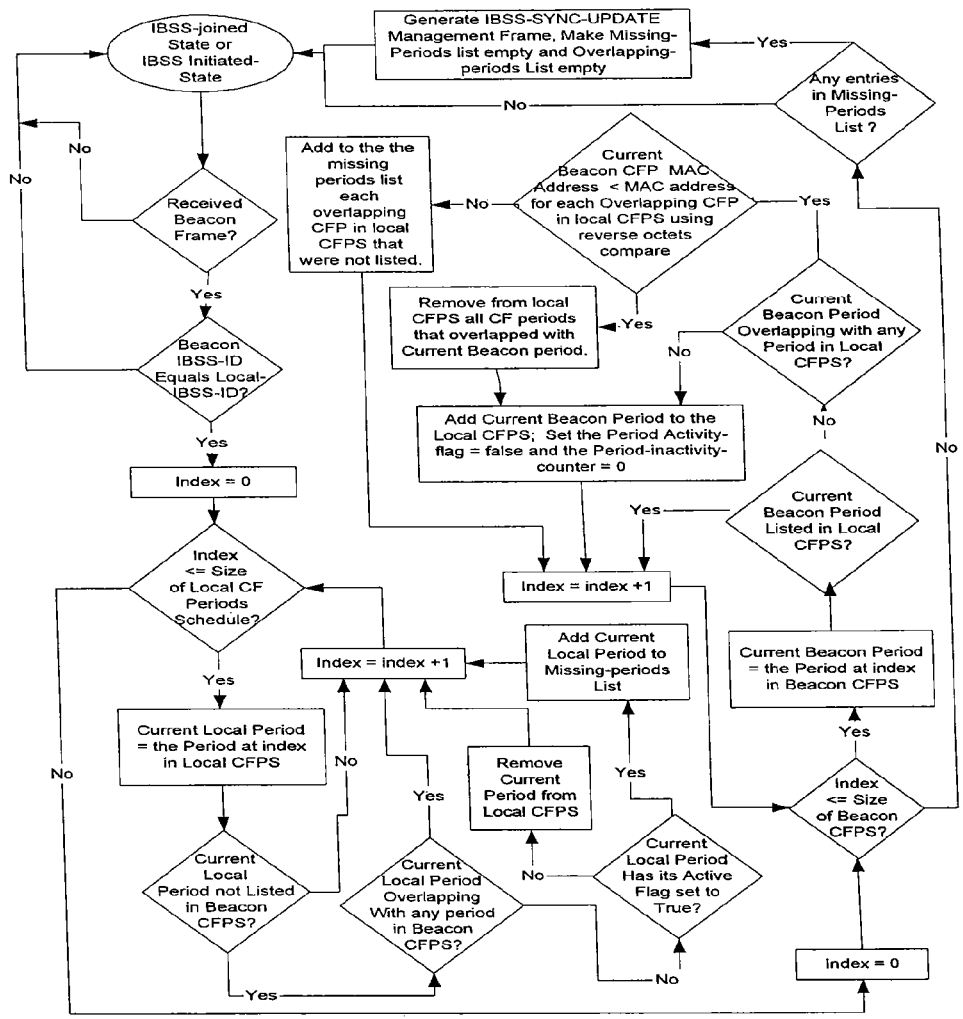
FIG. 14 is an example flowchart of a decentralized CFPS synchronization process that must be implemented by every IBSS CRAM station.

When a CRAM station receives a beacon frame from a CRAM station in its IBSS and detects that the beacon CFPS is missing one or more CFP entries that are present in MS $S_j$ $LCFPS_{new}$ and the attribute Activity-flag for that period is not false, then MS $S_j$ must transmit IBSS-SYNC-UPDATE management frame to the MS that transmitted the beacon. The IBSS-SYNC-UPDATE frame should identify all of these CFP that were missing in the received beacon. FIG. 14 is an exemplary flowchart of this decentralized CFPS synchronization process that must be implemented by every IBSS CRAM station.

If an IBSS MS receives a beacon frame and finds that (n) CFP in the beacon's CFPS overlaps with (m) CFP in the local CFPS, assuming that (n) and (m) are greater than one and m is greater than (n); then the MS should consider the all overlapping CF periods in its local CFPS as dominant CFPs and should treat them as missing CFPs for the station that generated the beacon during current SBTT interval, that should cause that CRAM station to issues an IBSS-SYNC-UPDATE frame that includes all these dominant CFPs that overlapped with the CFPs in the received beacon frame. However, if (n) was greater than (m), then the MS should consider the (n) CFPs received in the beacon as dominant CFPs. Consequently, the MS shall the replace the (m) CFPs in its local CFPS by the (n) dominant CFPs. Now, if (m) equal (n), the MS should identify the CFP with lowest MAC value by applying reverse MAC address comparison function on all the overlapping CFPs, and if the CFP with lowest MAC was already included in the MS local CFPS then the MS should consider the (m) CFPs in its local CFPS as dominant CFPs and should treat these CFPs as missing CFPs for the station that transmitted the beacon frame during current SBTT interval. Subsequently, this CRAM station shall transmit an IBSS-SYNC-UPDATE frame that includes (m) Missing-CF-Period IEs, one for each missing CFP. If the CFP with lowest MAC was not in the MS local CFPS, then the (n) overlapping CFPs in the received beacon are considered the dominant CFPs and should replace the (m) CFPs that overlapped with them in the LCFPS. Finally, if MS station detects that a CFP in the received beacon overlaps with one and only one CFP in its local CFPS; then this station must perform reverse compare operation of the MAC addresses, if the CFP in local CFPS is assigned to a station with smaller MAC address using reverse MAC octets compare, then station should consider the CFP in its local CFPS as dominant CFP; and should treat the CFP in its local CFPS as missing CFP that should be communicated to the station that issued the beacon frame during the current SBTT interval using the IBSS-SYNC-UPDATE frame. On the other hand, if the CFP within the CFPS in the received beacon is assigned to MS with smaller MAC address using reverse MAC address octets compare; then it should replace the CFP in the local CFPS. $D^2QMAC$ uses reverse AMC address comparison function to identify dominant CFPs, and dominate IBSS, in order to resolve out-of-sync conditions and to identify surviving IBSS during merge and join events.

In order to reduce management overhead, any IBSS MS that detects that one or more of its reserved CFPs are missing from last scheduled beacon, it must attempt to update the CRAM station that issued the scheduled beacon during current SBTT by issuing CFP-RSV-REQ frames during current SBTT contention periods; however, if the MS receives IBSS-SYNC-UPDATE management frame that includes its missing CFPs before it was able to send CFP reservation request, then the MS should not attempt to reserve its CFPs again.

7.1.2 IBS Out-of-Sync Detection and Recovery

Figure 15:
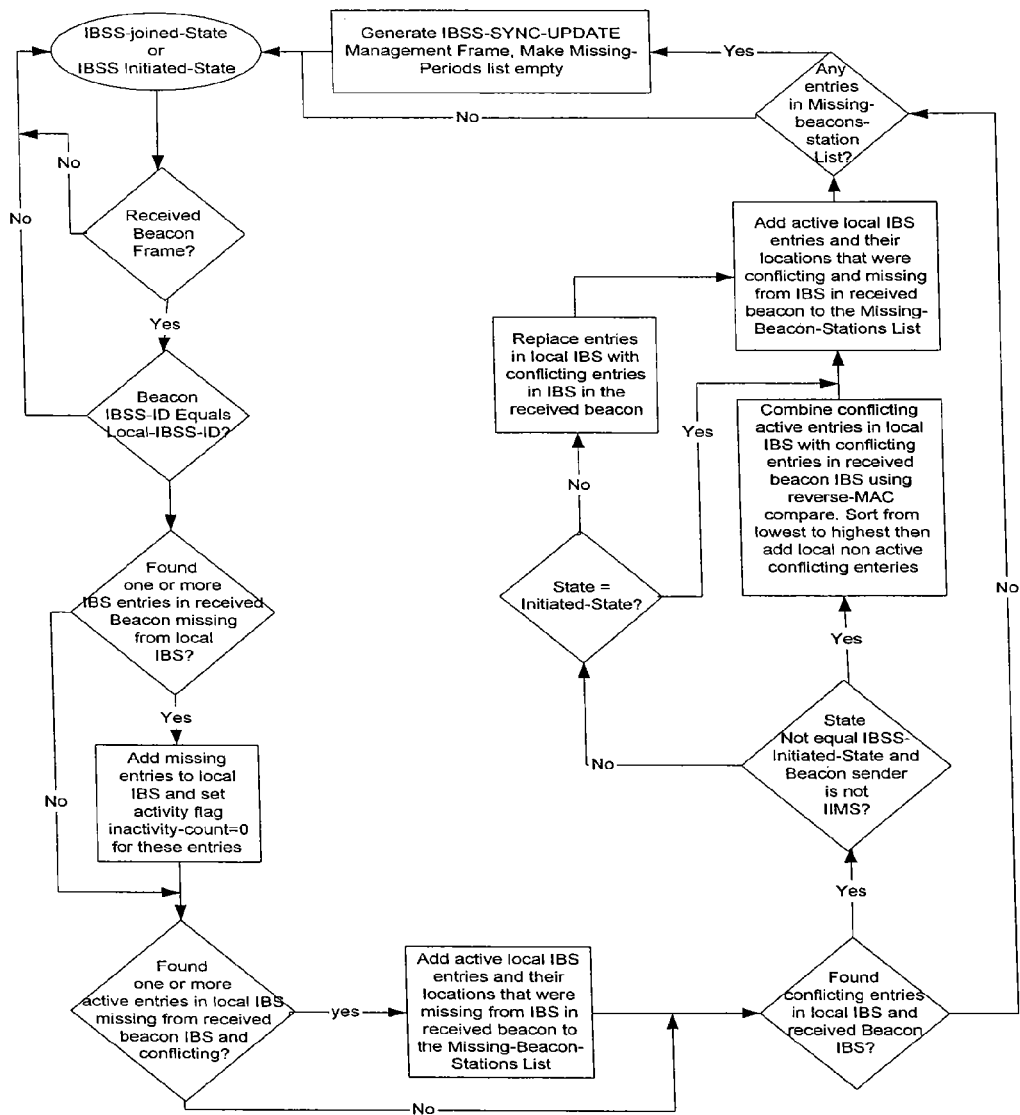
FIG. 15 is a flowchart of an example decentralized IBS synchronization process for beacon reception.

FIG. 15 is a flowchart of an example decentralized IBS synchronization process for beacon reception. Upon receiving beacon frame, CRAM stations must compare the contents of their local IBS against the contents of the IBS in the received beacon frame. If the received IBS contains one or more CRAM stations that were missing from the local IBS, then the CRAM station should insert these entries into its local IBS. When MS compares its local IBS against the received IBS, one or more CRAM stations are considered present in one IBS and missing from the other IBS if and only if these CRAM station entries are present in one IBS and not found in the other IBS; and if these CRAM station entries are located between two entries in one IBS and the same two entries are consecutive entries in the other IBS; or if those missing CRAM entries are located at the end of one IBS and not one of the entries in the other IBS. If the local IBS contains entries that are missing from the received IBS and those entries are for CRAM station that were active, then an IBSS-SYNC-UPDATE frame must be sent to the station that transmitted that beacon. The IBSS-SYNC-UPDATE frame must identify each active and missing CRAM station in the received IBS. A CRAM station is considered an active CRAM station if its beacon frame, its IBSS-join-request frame, or its IBSS-join-response frame was received. Each IBS CRAM entry will have an associated activity-flag that will be set when any of these frames are received. This flag will be clear when a CRAM entry is added to the IBS when a received IBS contains a CRAM entry that is missing from the receiving station local IBS.

When local and received IBS schedules under comparison contains different CRAM stations entries at the end of the schedule or between the same station entries at each IBS then a conflicting out-of-sync condition is detected. If the IIMS is not the station the generated the beacon frame nor the station that received the beacon frame, then $D^2QMAC$ requires that the CRAM station that detected the conflicting IBS out-sync-condition to combine all the entries with activity flag set found in local IBS and missing in the received IBS with conflicting CRAM entries found in the received IBS but missing from local IBS then sorts those conflicting entries using reverse MAC address comparison function. Then it should insert the sorted combination in the local IBS between the two common CRAM station entries where the conflicting out-of-sync is detected or at the end of IBS if the conflict was detected at end of IBS. Finally, the station should add after the sorted list all conflicting entries with activity flag clear found in local IBS and missing from received IBS. In addition, the CRAM station should include in IBSS-SYNC-UPDATE missing-beacon-station information element a list of all entries found in local IBS that have activity flag set and were missing and conflicting with contents of received IBS. The index of each missing-beacon-station will match the current index of that active CRAM station entry in the local IBS after the combine and sort operation is completed. Note that when a missing-beacon-station entry is added to a local IBS due to reception of IBSS-SYNC-UPDATE frame the activity flag for the inserted entry will be set. However, when a new entry is inserted in local IBS due to reception of beacon message then the inserted entry will have its activity flag cleared.

When IIMS is the station that transmitted the beacon message; then IIMS IBS contents shall override contents of any other CRAM station when conflicting IBS out-of-sync condition is detected. As such, no CRAM station will send to IIMS IBSS-SYNC-UPDATE frame with missing-beacon-station IEs unless these missing CRAM station are missing but not conflicting with other entries in IIMS IBS. When IIMS receives a beacon message with conflicting out-of-sync IBS entries relative to the IIMS local IBS, the IIMS will not change its IBS. As such, IIMS will not change its local IBS unless the received IBS contains a missing and non conflicting CRAM station entry.

Each CRAM station must detect when any other CRAM station in its IBSS is no longer present in the IBSS coverage in order to remove it from the IBS, the IBSS CRAM team list. Each CRAM station must monitor how often other CRAM station scheduled beacon message is not transmitted using inactivity-count attribute; and if the scheduled beacon frame was not received from a CRAM station for more than max-CRAMScheduledBeaconMissCnt consecutive extended Superframes then this CRAM station is considered absent from the IBSS coverage and shall be removed from the local IBS of the station that detected this condition.

7.2 Inter-IBSS Communication and Interference $D^2QMAC$ design incorporates techniques to minimize inter-IBSS induced collisions and interference; and supports MAC layer services to facilitate efficient inter-IBSS contention-free communication.

As we have described in section 6.2.1, a Border IBSS station is either a CRAM station that is two hops from IIMS or a CRAM station that is within one hop from the IIMS of its IBSS and currently receiving Beacon frames from another dominant IBSS but not the IIMS of the dominant IBSS.

CRAM Border stations will not transmit scheduled nor contended Beacon frames until they are able to transition to Joined or established state. At every SBTT interval, IBSS MS use the CFPS received in Beacon frames and the contents of their local CFPS to be able to identify when they are permitted to transmit contention-free traffic and when they are exposed to contention-free traffic, blocked from transmission.

Beacon frames received by IBSS Border stations from their IBSS CRAM stations make them aware of when they will be exposed to contention-traffic originating from within their IBSS; and if Border stations receive Beacon frames from CRAM stations of another IBSS, then these Border station will also be able to determine when they are exposed to contention-free traffic originated from that IBSS. IBSS Border stations are required to maintain locally a Border Contention Free Periods Schedule (B-CFPS) by combining Contention-free periods from its IBSS with Contention Free Periods from the adjacent IBSSs. The start of the SBTT interval for the Border Station IBSS must be used as the time reference in computing the offset duration of each CFP entry in the B-CFPS. Moreover, when border station determines that CFP from one IBSS overlaps with another CFP in adjacent IBSS, the border station must combine these overlapping CF periods into one contiguous CFP entry in its local B-CFPS. As such, Border stations maintain a local B-CFPS by combining entries from their local CFPS and other CFPS received in beacon frames from one or more adjacent IBSS. The offset of CF periods from other IBSS is computed by calculating the offset between the start of their IBSS SBTT interval and the start of the received beacon message; note that any contended beacon contains information element that provides the offset between the start of the contended beacon frame and the start of the IBSS SBTT interval for that contended beacon. The B-SBTT allows Border stations to know when they should not transmit, blocked, in order to prevent interference with any contention free traffic transmitted by MS within their IBSS or at other adjacent IBSS. Also, the contents of the B-CFPS are useful for other MS that may need to communicate with a border station because it reveals when the border station is exposed to other traffic from any adjacent IBSS.

IBSS Border stations share their local B-CFPS with all MS within their range by contending to broadcast IBSS-Borders-Exposed-CFPS management frame during any contention period between any two consecutive CFP entries in their B-CFPS. The use of IBSS-Borders-Exposed-CFPS management frame is necessary because it is possible to have MS within range of IBSS border stations but since border stations are not allowed to send beacon frames, these MS adjacent to them will not be able to know when these Border stations will transmit contention free traffic nor when these border station are exposed to contention free traffic. To reduce management traffic overhead, once an IBSS-Borders-exposed-CFPS frame is received by any MS operating in Borders state within the same IBSS, then these border stations should not attempt to send a second IBSS-Borders-exposed-CFPS frame for MaxInterBordersExposedInterval which is a configurable count reflecting an integral multiple of SBTT period. Since all border stations compete to send IBSS-Borders-Exposed-CFPS frame, eventually, all border stations should be able to share their local B-CFPS with neighboring MS. Any MS that was able to receive IBSS-Borders-Exposed-CFPS frame from a border station should not send contention free traffic to that border station unless it is sent during a CFP allocated to the sender station as reflected in that border station B-CFPS; attempting to transmit during other periods may cause collisions and will not be acknowledged by the Border station because the Border station is blocked from transmitting. Further, a MS should not send contention traffic to border station except during contention periods as defined by offsets between start and end of CFP entries in the B-CFPS local to that Border station.

Border Station may yield the remaining duration of its reserved contention free period by sending unsolicited CTS frame to a specific station to poll it for any data ready to be sent to that border station. Alternatively, the border station may broadcast CTS to trigger any MS with pending traffic for the border station to immediately start contending to send data by selecting a random back-off period.

Border station should update their local B-CFPS every SBTT interval as they receive Beacon frames from their IBSS and other adjacent IBSSs. CRAM station operating in Border state should use their local B-CFPS instead of their local CFPS in order to identify when and how it should access the shared channel to transmit contention or contention free frames.

7.3 Control on Placement of Reserved CFP

When operating in $D^2QMAC$ on-demand mode, any CRAM station may potentially experience out-of-sync condition in its local CFPS; $D^2QMAC$ supports mechanism to allow a MS station to reserve a CFP with a specific time offset relative to the start of the SBTT interval. This enables a MS to update the contents of CFPS for CRAM station that sent a scheduled beacon message during current SBTT interval. $D^2QMAC$ CFP-RSV-REQ frame includes Desired-Offset optional Information Element (IE) to allow any MS station when attempting to reserve a CFP to be able to dictate the offset of that period relative to the start of the SBTT interval. When a MS that reserved a CFP does not find one of its reserved CF-periods listed in the CFPS in a received scheduled beacon frame, and if the fill duration of that CFP is not overlapping with any CFP listed in the received CFPS, then that MS issues CFP-RSV-REQ to reserve that CFP again from the station that transmitted the last scheduled beacon frame, the CFP-RSV-REQ frame must include desired-offset (IE) to ensure that the assigned CFP will be at the same offset previously allocated by another CRAM station. That process should be used when a station receives CFP-RSV-RESP frame but subsequent beacon frames do not include the reserved period, or whenever any CRAM station with an out-of-sync CFPS sends a scheduled beacon frame with missing CFP that a MS station had successfully completed a three-node exchange to reserve it.

In addition, $D^2QMAC$ support for reserving a CFP with explicit offset allows a Border station receiving scheduled beacon frames from more than one IBSS to be able to reserve an CFP from the second IBSS and use the desired-offset IE and duration IE in the CFP-RSV-REQ frame in order to time align the start of the newly reserved CFP from the second IBSS with a reserved CFP in its current IBSS. This allows border stations to protect traffic transmitted during CFP from interference from all stations in adjacent IBSSs. This is important because border stations do not send beacon messages and one or more MS in an adjacent IBSSs may not be able to receive beacon messages from its IBSS CRAM stations to be aware when it has an allocated CFP. When reserving a CFP from both IBSSs, the border stations should be able use that CFP to communicate with any MS within their range irrespective of which IBSS that MS is operating in.

In addition, when MS station needs to reserve a CFP without a need to request specific offset for the reserved CFP, $D^2QMAC$ requires the reserving MS to include a Random time offset in the Local-Back-off-Interval IE within the CFP-RSV-REQ frame. This random period minimize the potential for undetectable traffic collisions when two different MS stations within an IBSS reserve CF periods from two different hidden CRAM stations where the CFPS changes from the first reservation is not fully propagated across the IBSS; this delay in CFPS update propagation may be result of communication errors, or MS mobility that cause temporary isolation of a subset of IBSS station. When subsequent reservations occur from CRAM stations scheduled to transmit beacons during temporary CFPS out-of-sync state will cause two overlapping CF periods to be allocated to two different MS within the same IBSS. When MS stations use their allocated period to transmit contention free traffic, this will cause collisions. The random back-off-interval computed locally using random function [R(0–CWmin)] causes the reserving station to dictate a random number of slot-times to be added to the offset for the assigned CFP computed by $D^2QMAC$ decentralized algorithm used uniformly in all CRAM stations. The summation of the random number of slots computed locally by the reserving MS to the optimal offset computed by CRAM station that sent the beacon should minimize the potential for the consecutive reservations to have the exact same offset from the start of SBTT. Thus, when a MS with smaller offset starts transmitting, the MS with longer offset will be able to detect the channel is busy and will not transmit its message in order to avoid collisions; instead this MS will wait for contention period to send its traffic; this MS will continue to use contention period to send its traffic until CFPS information is propagated across the IBSS and CFPS synchronization process resolves the conflict in these overlapping CF periods. As such, $D^2QMAC$ employs several techniques to synchronize CFPS and to avoid collisions during CFP even when transient CFPS out-of-sync condition occurs within an IBSS.

7.4 D2QMAC Decentralized Channel Access Control $D^2QMAC$ employs decentralized Channel Access Control (CAC) algorithms to minimize collision potential during contention free periods when CFPS state is out-of-sync among one or more IBSS. During each SBTT interval, these CAC algorithms are employed locally by each IBSS MS to determine if that MS is permitted or denied the right to transmit contention free during any CFP. These CAC use the contents of the CFPS received during the SBTT along with contents of their local CFPS in order to determine when each IBSS MS is granted the right to transmit or is required to listen during each CFP. CFj={CFPk: CFPk ∈Aj, Sj equals first element in CFPk triple} Equation 8 shows clearly how the contents of received CFPS in beacon messages during an SBTT interval will directly influence and control access to the shared channel with respect to CFP allocation, offset and duration. Since out of synchronization of contents of CFPS in IBSS stations may cause collisions for contention free traffic; $D^2QMC$ prevents potential of collisions whenever out-sync condition in CFPS occurs by allowing the CRAM stations that transmitted beacon frames to have clear influence and authority in controlling transmission during CFP for the SBTT interval that these CRAM stations sent beacon frames. Moreover, these decentralized CAC algorithm enable any MS that reside in overlapping coverage area to be able to avoid collisions with CF traffic originating from any MS within any of the IBSSs. The contents of MS station local CFPS also influence MS access to CFP along with received CFPS in beacon schedule. MS that receive more than one Beacon frame, scheduled beacon and contended beacon, and possible beacons from other IBSS, should use the intersection of its local. CFPS, and contents of several received CFPS in beacon frames as current CF periods access schedule for the current SBTT interval. The station that does not find its CFP in the intersection of CF-Periods schedule, and this CFP was not in conflict, i.e. it is not overlapping with one or more CFP reserved by other MS within its IBSS or another IBSS; then this MS is authorized to use the shared medium using contention access at the CFP duration if the station determines that the channel is idle after the CF deferral period elapses after the offset of that CFP. While this station is required to contend for the medium, this station contention transmission will have lower probability of collision because this MS should have precedence over all other stations because it is required to defer access for a shorter duration and is not required to add any back-off duration for contention window. When, more than one CFP have overlap; the station with shorter offset should be able to transmit first. However, if the overlapping CFPs have the exact offset value, then $D^2QMAC$ uses reverse MAC address comparison function to determine MS with dominant CFP that will be authorized to use the CFP during current SBTT. As such, $D^2QMAC$ decentralized CAC algorithms enable graceful mitigation of out-sync condition in CFPS between IBSS MSs until all these stations regain CFPS synchronization.

$D^2QMAC$ decentralized Channel Access Control (CAC) algorithms allow IBSS CRAM stations to mitigate out-of-sync condition in the IBS. During each SBTT interval, the station that transmits beacon message has final authority with respect to which CRAM stations should transmit the next scheduled beacon; irrespective of the current contents of the local IBS in each CRAM station that received the beacon message. However, CRAM Stations must use reverse MAC address comparison function to resolve conflict regarding which CRAM station should send the next scheduled beacon frame for the IBSS whenever within single SBTT interval more than one beacon message is received with conflicting IBS contents impacting the next scheduled beacon MAC address. If these received beacon frames with conflicting IBS contents indicating more than one CRAM station to transmit next beacon frame, then the station with smaller MAC address using reverse MAC address comparison function should transmit the scheduled beacon and other stations with bigger MAC address should not send the scheduled beacon frame even if their local IBS indicates that they should send it. However, when IIMS is one of the stations that transmitted a beacon frame during current SBTT interval then IIMS IBS content will be used by all CRAM stations that received it to determine which CRAM station should send the next scheduled beacon for the IBSS. More over, when no beacon frames are received in a SBTT interval, then CRAM stations should use their local IBS to determine if they should send scheduled beacon frame at SBTT interval. Note that even if more than one CRAM station did assume that they are scheduled to send the next scheduled beacon and these stations attempt to transmit at the same time, other CRAM stations will not be able to receive any scheduled beacon but will be able to recover from this condition by contending to send contended beacon message.

7.5 Prioritized Deferral Periods

CAC employs different interframe space durations for Beacon transmission, CFP transmission, and contention transmission in order to avoid collisions in the shared channel even when for any reason one or more stations operating in geospatial region were not able to receive beacon messages and their local perception with respect to common shared channel allocation in regard to the timing of the start of the SBTT interval, and contents of their CFPS is different from another set of stations operating on the same geospatial region with a different IBSS SBTT start timing and CFPS assignments. $D^2QMAC$ ensures that proper precedence is given to a CRAM station attempting to send beacon frame by assigning shorter beacon interframe space duration than CFP interframe space duration and Contention interframe duration. This will ensure that when medium is idle, the station that needs to send a beacon frame will be able to send this frame before other stations attempting to send CFP or contention frames. Beacon frame transmission will help other stations to resolve the undesired out-of-sync conditions among all stations sharing the common channel. Also, even in out-of-sync situation, if a station attempts to send a CFP frame assuming the all stations will be blocked, and if one or more stations attempt to contend to send frames on the idle channel because these stations were not able to receive CFPS in beacon frame to inform them that the channel is allocated for CFP transmission. The station sending a CFP frame should be able to starting sending its CFP frame and force the other stations contending to send a frame to suspend their attempt and await the channel to become idle; because the station sending CFP frame is required to wait for the shorter CFP interframe space interval before sending its CFP frame and the other stations contending to send contention frames are required to await and sense that the channel will remain idle for the longer contention interframe space duration. As such, delay intolerant CFP traffic shall not be impacted by contention traffic even when stations operating in a common channel and within same geospatial area have significant different prospective with respect to time reference and allocation of contention free periods.

8. Wireless Terminal

Figure 16:
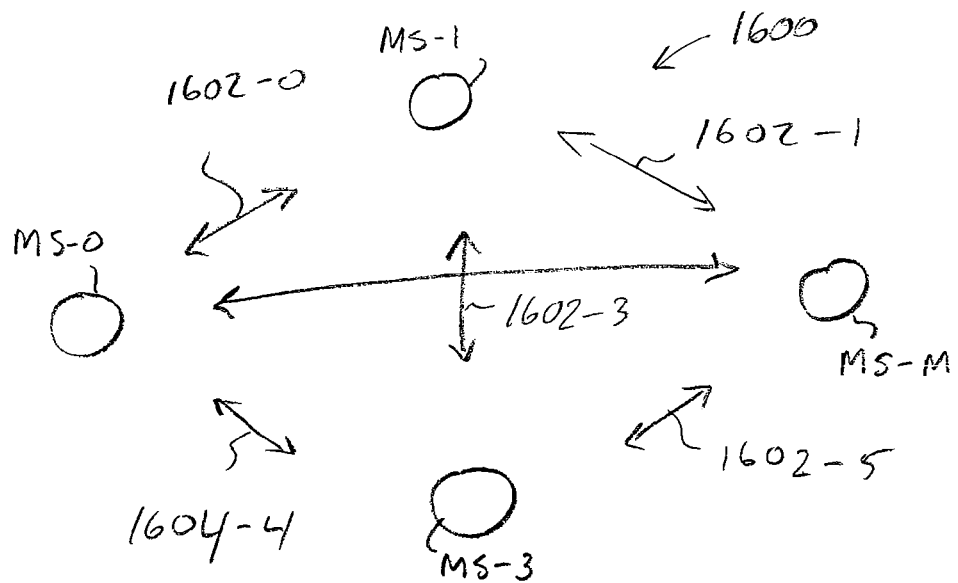
FIG. 16 is an illustration of an example IBSS including wireless mobile stations, also referenced in FIG. 1.

FIG. 16 is an illustration of an example IBSS 1600 including wireless mobile stations MS-0 through MS-3, also referenced in FIG. 1, and MS-M (generally referred to individually or collectively as a wireless mobile station MS-N or wireless mobile stations MS-N). Although the wireless stations need not be mobile, the methods of the present invention advantageously support mobile wireless stations. Each wireless mobile station MS-N includes a wireless transceiver configured to wirelessly transceive respective exemplary communication signals 1602-N, and thereby communicate with each of the other mobile stations in IBSS 1600, over a common wireless communication channel. The communication channel may be a spread spectrum communication channel or other type of channel as is know in the art. Wireless mobile stations MS-N in IBSS 1600 inter-communicate to establish a common time reference, i.e., Superframe SF1 depicted in FIG. 1 and the IESS depicted in FIG. 2, where MS-N in FIG. 2 corresponds to MS-N in 16. In FIG. 16, a subset of the wireless mobile stations in IBSS 1600, namely, wireless mobile stations MS-0 through MS-3, are CRAM stations, which take turns in transmitting beacon messages B1-B3 and thereby manage the access communication channel. Wireless mobile station MS-M is a non-CRAM wireless mobile station.

Figure 17:
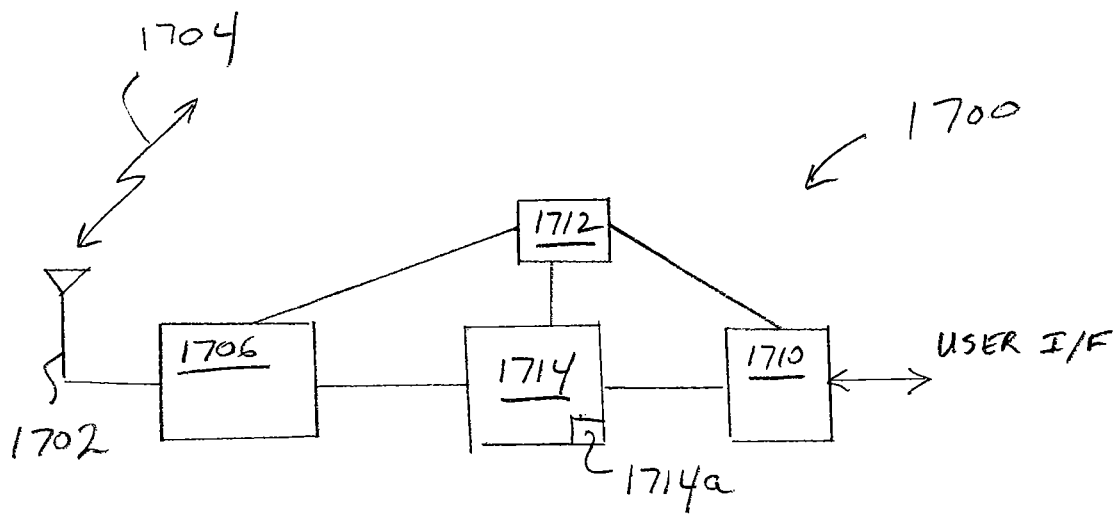
FIG. 17 is an illustration of an example wireless station that can participate in an IBSS as either a CRAM or non-CRAM wireless station.

FIG. 17 is an illustration of an example wireless station (WS) 1700 (also referred to as a wireless communication station or wireless communication device) that can participate in an IBSS as either a CRAM or non-CRAM wireless station. WS 1700 may be mobile (i.e., a wireless mobile station), portable or fixed in position, and may be a handheld unit. WS 1700 includes an antenna 1702 for transmitting and receiving (i.e., transceiving) communication signals 1704 shared with other wireless stations. WS 1700 also includes a transceiver 1706 coupled with antenna 1704, a user interface 1710 for interfacing WS 1700 to external input/output signals, including user signals, a power manager 1712 for providing and controlling power to WS 1700, and a controller 1714 for controlling the transceiver.

Antenna 1704 provides a received communication signal (from 1704) to transceiver 1706, which demodulates and decodes the received communication signal, and passes the decoded signal, i.e., information, to controller 1714. Controller 1714 process the information. Controller 1714 provides information to be transmitted to transceiver 1706, which, in turn, encodes and modulates the information to be transmitted, and passes the resulting encoded, modulated signal to antenna 1702, which transmits the signal (as 1704).

User interface 1702 includes a data interface for transceiving data, and may also include a display and keypad for access by a user.

Power manager 1712, electrically coupled to all of the other units 1706, 1710 and 1714, includes a battery or other power source for powering WS 1700, and control circuitry configured to power-on and power-down WS 1700 responsive to user input and/or actuation and timing signals from controller 1714, e.g., to transition WS 1700 from awake and listening states to a sleep or power-save state responsive to commands from the controller.

Controller 1714 includes computer components, including a controller, memory, timing circuits, such as a timer 1714a, and so on, as is known in the art, which cooperate with each other to control WS 1700, and cause WS 1700 to operate, in accordance with the methods, processes and protocols described above. For example, controller 1714 executes computer software that, when executed, implements the various methods described above. The memory associated with controller 1714 stores data structures as necessary, such as local copies of a Beacon Schedule and IBS. WS 1700 derives a time reference indicating a start time of a Superframe (e.g., start time 102 depicted in FIG. 1) from a received beacon message, which, as mentioned above, marks the start of the Superframe. Based on this time reference, timer 1714a derives, e.g., counts, any required time duration, time offset, time period, dwell time, interval, etc., mentioned above, as necessary to implement the methods, processes and protocols described above. In an embodiment, the aforementioned timing function may be shared between controller 1714 and transceiver 170. After having read the present description in its entirety, one of ordinary skill in the relevant arts would appreciate how WS 1700 could implement the methods described above.

9. Summary Method Flow Charts

Figure 18:
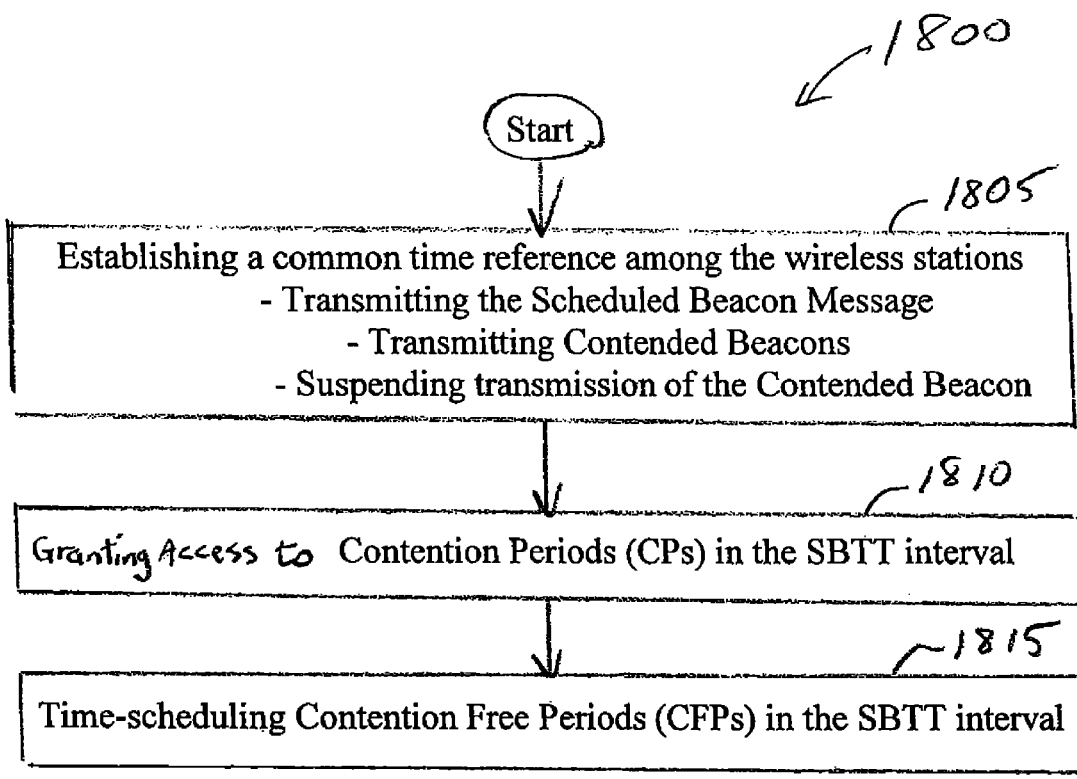
FIG. 18 is a flow chart of an example method of a high-level network process summarizing establishing a common time reference for accessing a common channel and time-scheduling access to the channel.

FIG. 18 is a flow chart of an example method 1800 of a high-level network process summarizing establishing a common time reference in an IBSS for accessing a common wireless channel and time-scheduling access to the channel.

In a first step 1805, CRAM wireless stations (WSs) (also referred to as CRAM stations) of the IBSS transmit wirelessly to each other to establish and then maintain a common time reference, e.g., a Superframe as described above, through which the WSs share access the common wireless channel. The CRAM WSs take turns, one after the other in round-robin fashion, transmitting Scheduled Beacon Messages according to the IBS. The CRAM WSs may take turns transmitting in immediately adjacent successive SBTT intervals, e.g., a first CRAM WS transmits in a first SBTT interval, then a second CRAM WS transmits in the next, immediately adjacent (successive) SBTT interval, and so on through the IBS. Alternatively, each CRAM wireless station. (WS) may transmit a Beacon. Message for several immediately adjacent successive SBTT intervals, e.g., a first CRAM WS transmits for two immediately adjacent successive intervals, then a second CRAM WS transmits for the next two immediately adjacent successive intervals, and so on through the IBS.

The CRAM WSs perform step 1805 without assigning a dedicated "central" WS that is solely responsible for transmitting the Scheduled Beacon Message and thereby "in-charge" of managing access to the shared common channel. That is, in the present invention, this role is shared equally over time among CRAM stations in a round-robin fashion.

Further in step 1805, the CRAM WSs transmit Contended Beacon Messages in each SBTT interval as necessary, in accordance with the requirements discussed above. Also, each WS attempting to transmit a Contended Beacon Message suspends transmission of same if that CRAM WS first detects/receives a Contended Beacon Message from another CRAM, so that only one Contended Beacon Message is actually transmitted in a given Contended Beacon Period. Each of the Scheduled Beacon Message and the Contended Beacon Message include the IBS (also referred to as the Beacon Schedule) and the CFPS. The Scheduled Beacon Message and the Contended Beacon Message are each a Beacon Message that contains a copy of the IBS and CFPS for a current (or a "given" SBTT interval).

In a next step 1810, once the common time reference has been established, the WSs may contend for transmission time during CPs. WSs requesting contended access to the common channel may be granted access to the channel, i.e., access to CPs, through the back-and-forth messaging described above in detail, e.g., in Section 4.1.3.

In a next step 1815, once the common time reference has been established, the CRAM WSs time-schedule Contention Free Periods (CFPS) to requesting WSs. Time-scheduling includes granting access to, i.e., allocating, CFPs to the WSs.

Only the CRAM WS that is scheduled to transmit the Beacon Message in a current SBTT interval can schedule the CPs and CFPs for that SBTT interval.

Method 1800 is repeated over time.

Figure 19:
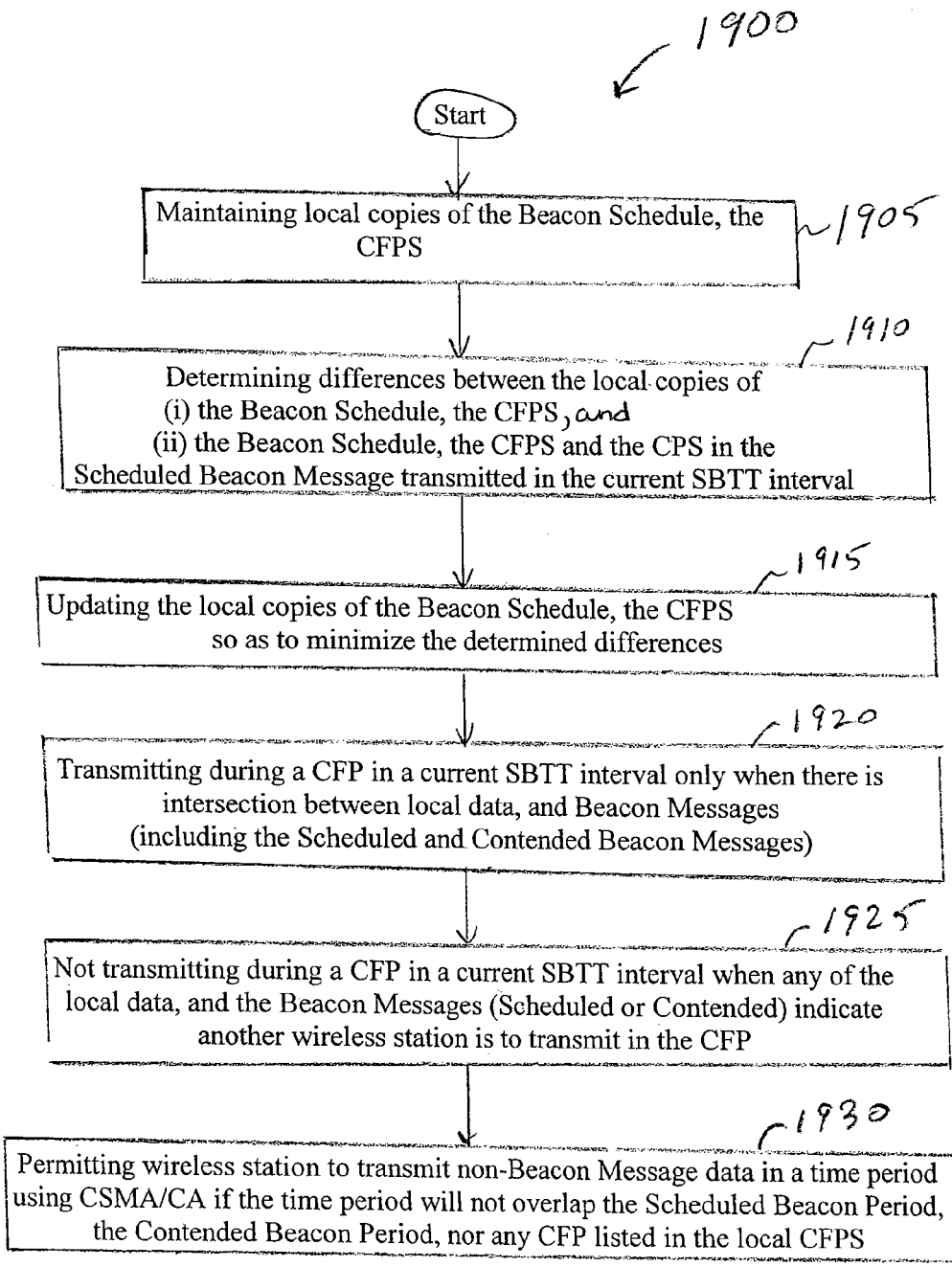
FIG. 19 is a flow chart of an example method summarizing processes performed by a wireless station in an IBSS.

FIG. 19 is a flow chart of an example method 1900 summarizing processes performed by a wireless station in an IBSS.

In a first step 1905, each WS maintains in its memory local copies of an IBS and a Contention Free Period Schedule (CFPS) (also referred to as CBCFPS).

In a next step 1910, each WS determines differences between the local copies maintained in step 1905 and their corresponding entries in the Scheduled or Contended Beacon Message for the current SBTT interval.

In a next step 1915, each WS updates the local copies maintained in step 1905 based on the determined differences from step 1910, so as to minimize differences between the local copies and their corresponding entries in the Scheduled or Contended Beacon Messages of the current SBTT interval, and so that the local copies track or are synchronized to the Scheduled or Contended Beacon Messages.

In a next step 1920, each WS is only permitted to transmit data (i.e., non-Beacon Message data), and does transmit the data, in a Contention Free Period when all of the local information (schedules) and the Beacon Messages (whether Scheduled or Contended) indicate in agreement that that WS can transmit data (i.e., is scheduled to transmit), i.e., when there is an intersection between all of these schedules. In step 1920, each WS performs this intersection check to determine if it is allowed to transmit.

In a next step 1925, each WS is not permitted to transmit non-Beacon Message data in a CFP if any of the local information (schedules) and Beacon Messages (whether Scheduled or Contended) indicate another WS is scheduled to transmit, i.e., when a union of all of these schedules indicates another WS is scheduled to transmit. In step 1925, each WS performs the union to determine if it is not permitted to transmit.

In a next step 1930, each WS is permitted to transmit non-Beacon Message data in a time period using CSMA/CA if the time period does not overlap the Scheduled Beacon Period, the Contended Beacon Period, nor any CFP listed in the local CFPS.

Method 1900 is repeated over time.

In an embodiment, all of the steps of method 1900 are performed by each WS every SBTT interval.

The steps of method 1900 may be performed in different orders or concurrently and certain steps may be omitted. For example, steps 1920-1930 may be performed concurrently with steps 1905-1915.

Figure 20:
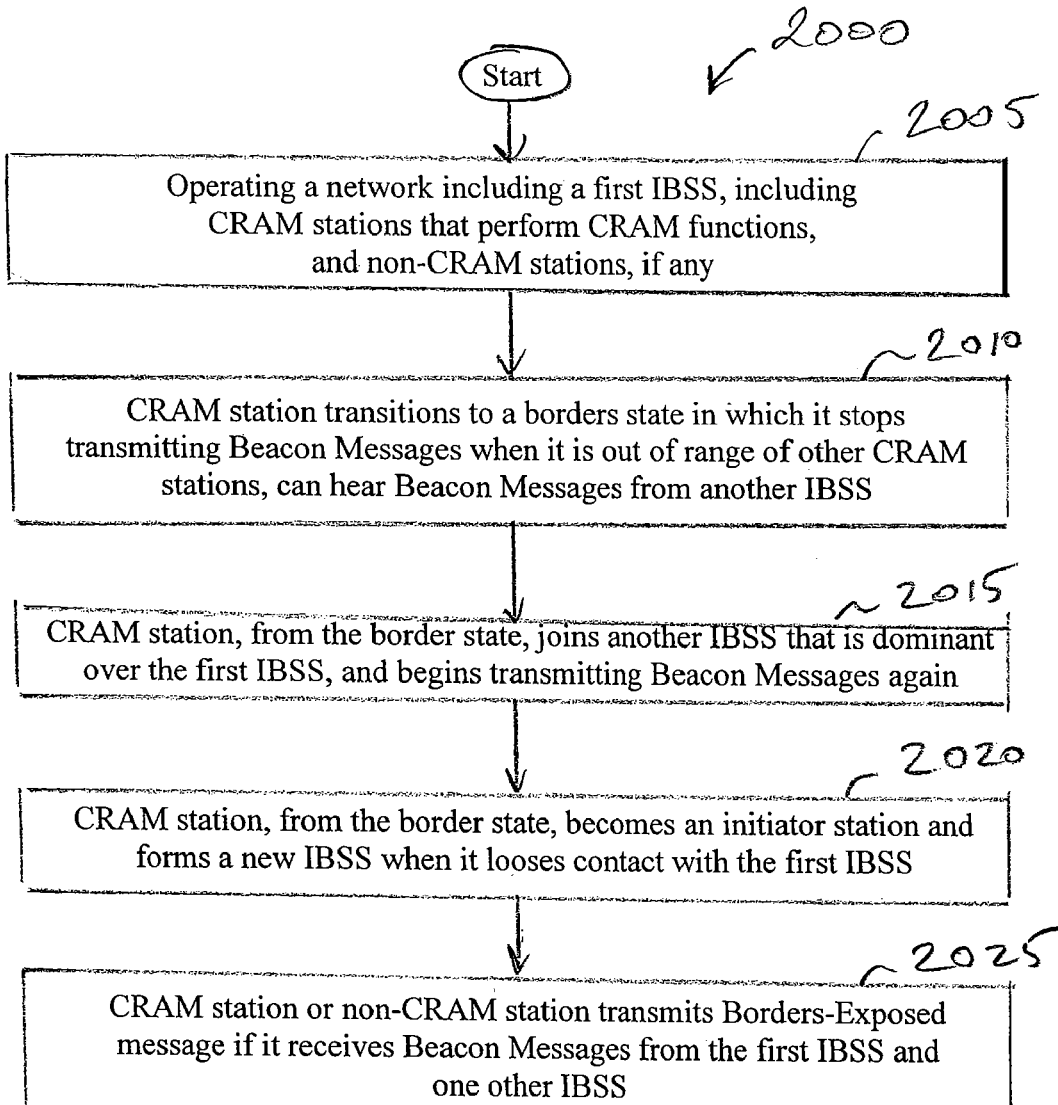
FIG. 20 is a flow chart of an example method summarizing a process of operating a network including one or more IBSSs.

FIG. 20 is a flow chart of an example method 2000 summarizing a process of operating a network including one or more IBSS. Each IBSS includes WSs operating as one or more CRAM stations that perform CRAM functions and possibly one or more non-CRAM stations (step 2005). Each CRAM station, in order to collaborate as a CRAM station in the IBSS, must be no more than a first predetermined number of hops (preferably no more than one hop) away from the IWS and no more than a second predetermined number of hops (preferably no more than two of hops) away from at least one of the other CRAM stations.

As used herein, two WSs are considered first hop neighbors, or a single hop apart, if both stations are able to transmit and receive messages to each other directly over the wireless link, without requiring any intervening WS. For example, a CRAM station is one hop from the IBSS Initiator (IMS or IWS) when that CRAM station is able to directly receive a Beacon Message from the Initiator WS and the Initiator WS is able to directly receive a Beacon Message from that CRAM station. Two WS are considered second hop neighbors, or two hops apart, when (i) these two stations are not able to directly receive messages transmitted from the other, and (ii) there is a third WS that is able to directly receive messages transmitted from these two WSs. For example, a CRAM station that is one hop from an IBSS initiator station may not be able to directly receive Beacon Messages transmitted by another CRAM station that is also one hop from the initiator station, however, the IBSS initiator should be able to directly receive the Beacon Messages transmitted by either WS and both of these CRAM station are able to directly receive beacon messages transmitted by the initiator IBSS.

In a next step 2010, a CRAM station transitions to a border state in which it stops transmitting Beacon Messages when it is more than the first predetermined number of hops away from the IWS for the first IBSS for a predetermined number of SBTT intervals, or receives Beacon Messages from a second IBSS, of which the CRAM wireless station is not a member, that is a dominant over the first IBSS.

In a next step 2015, the CRAM station operating in the border state joins another IBSS that is dominant over the first IBSS, and begins transmitting Beacon Messages again.

In an alternative next step 2020, the CRAM station, from the border state, becomes an initiator station and forms a new IBSS when it looses contact with the first IBSS.

In an alternative next step 2025, either a CRAM station or a non-CRAM station transmits Borders-Exposed message if it receives Beacon Messages from the first IBSS and one other IBSS.

10. Feature Sets

The following is a list of enumerated exemplary feature sets or groups of the present invention. Each number, e.g., "1,"

"2," and so on, means "feature set 1," "feature set 2," and so on. The feature sets represent, in part, summaries of groups of features, elements or steps in the present invention.

1—A decentralized system of protocols and algorithms for wireless Medium Access Control (MAC) to improve Carrier Sense multiple Access/Collision Avoidance (CSMA/CA) MAC in order to provide deterministic communications Quality of Service to Mobile Subscribers (MS) in Ad-hoc wireless local area network using a common channel without reliance on any infrastructure access point equipment is disclosed. This system will allow wireless mobile ad hoc networks to provide efficient and effective support for fixed rate delay intolerant synchronous communication as well as asynchronous best effort communication bursts over a common wireless channel. The disclosed system comprise the steps of:

Mobile stations establish an Independent Basic Service Set (IBSS) over a geographical region where many mobile stations will collaborate to share a common wireless channel. The geospatial boundaries of the IBSS are time-varying and dependant on mobility of stations and their surrounding environment where mobile stations can join or leave an established IBSS as they move in or out of its current geospatial boundary. One IBSS may split into separate Independent Basic Service Sets and Independent Basic Service Sets may merge into one basic service set.

Establishing a common time reference for the mobile stations operating within an IBS and sharing a common channel using a periodic Superframe structure occurring at regular and fixed Scheduled Beacon Transmit Time (SBTT) interval where a dedicated fixed time period at the start of this SBTT interval is dedicated to transmit a scheduled beacon frame followed immediately by a dedicated fixed time period to transmit a contended beacon frame, followed by a number of contention and contention free periods for use by mobile stations for communication over the shared channel.

Forming and managing a team of a finite set of mobile stations, the Channel Resource Allocation Management (CRAM) stations, consisting of the Mobile station that established the IBSS along with a limited set of additional stations that joined its IBSS and selected, or statically assigned in pre-provisioned mode, to participate and play an equal role in managing and assigning the resources of the shared channel such that the channel capacity can be partitioned into noncontiguous set of contention free periods and a noncontiguous set of contention periods; each of said contention free period is reserved for exclusive use of a specific mobile station. Contention Free period allocation can be pre-assigned manually in pre-provisioned mode or reserved by mobile stations for prolonged use in the on-demand mode.

CRAM stations maintain locally a common copy of an IBSS Beacon Schedule (IBS) listing the identity of mobile stations comprising the finite set of CRAM stations and the order in which each of these stations is expected to transmit a beacon frame at the scheduled beacon period during each SBTT interval.

IBSS mobile stations maintain locally a common Contention Free Periods (CFPs) schedule consisting of the sequence of unique triple for each CFP allocated to a specific mobile station for CF communication. Where each triple identify the contention free period duration, the identity of the mobile station that the CFP is assigned to, and the time offset between the start of the IBSS SBTT interval and the start of the CFP.

Ensuring that IBSS mobile stations will not receive more than one beacon frame during the scheduled beacon period from its IBSS CRAM stations; and allowing mobile stations to receive additional beacon frames after the scheduled beacon period elapses. All Beacon frames received will include a copy of the contents of the IBS and CFPS maintained locally by the CRAM station that transmitted that beacon frame instance. All mobile stations at the start of each SBTT interval execute a number of decentralized Channel Access Control (CAC) algorithms to control when the station is allowed or blocked from transmission using contention or contention free access method; the behaviors of these decentralized CAC algorithms are dependant on the contents of CFPS received on beacon messages during the same SBTT interval. In addition, decentralized CRAM control algorithms executing at the start of each SBTT interval at every CRAM station controls which station is required to transmit the beacon message on upcoming scheduled beacon period during the next SBTT interval; these decentralized CRAM control algorithms are dependant on the contents of all the IBS received in each beacon message within the current SBTT interval.

2—Feature set 1, wherein the common channel resources will be managed and allocated by finite set of mobile stations, the CRAM stations, that will play an equal role in controlling and assigning channel resources. The CRAM station team membership is tracked using a common IBSS Beacon Schedule (IBS) that lists the IBSS MSs that will collaborate in generating IBSS scheduled beacons and records the specific order in which these CRAM stations will transmit the scheduled beacon frame and take turns in handling the duties of allocating channel resources every SBTT interval in order to load share energy consumed in managing the IBSS. Each IBS entry will have MAC address of MS belonging to the IBSS CRAM team, and the first MAC address entry in IBS identify IBSS Initiator MS (IIMS). This schedule identifies each station and the order in which each station will take turn in transmitting the scheduled IBSS beacon message.

3—Feature set 1, wherein maintaining an ordered set of mobile stations scheduled to generate beacon messages in specific order each SBTT interval during scheduled beacon period; then including in each beacon frame the current allocation of contention free period and contention periods as welt as the ordered set of stations scheduled to transmit beacon messages.

4—Feature set 1, wherein the scheduled Beacon frame is used to demark start of Superframe structure for use by IBSS mobile station as common time reference for Periodic Contention Free Period.

5—Feature set 1, wherein the Schedule Beacon Transmit Time (SBTT) interval duration is used to set exact timing offset for transmission the next IBSS scheduled beacon frame; and including the value of this SBTT period as mandatory information element in the beacon frame such that new mobile stations joining the IBSS must use the same SBTT value received in IBSS beacon frames to be able to identify the time period between the start of two consecutive scheduled beacon periods.

6—Feature set 1, wherein allocation of fixed duration time period dedicated for contention free transmission of scheduled beacon frame at the start of the Superframe structure followed immediately by a fixed duration period dedicated for contended transmission of beacon frame by CRAM stations that did not receive a beacon frame during the previous period; and using the remaining time in the Superframe structure to allocate Contention free periods separated by contention periods in accordance to all timing constraints depicted in FIG. 3.

7—Feature set 1, wherein Beacon Inter-frame Space (BIS) interval must be shorter than Contention Free Inter-frame Space (CFIS) interval and Contention Inter-frame Space interval is used to ensure that stations attempting to access the medium to send beacon messages will have precedence over any station attempting to send contention free or contention message even when these stations are operating in different IBSS and are located such that they are within interference range but outside reception range; FIG. 3 provides specification details of BIS duration.

8—Feature set 1, wherein Contention Free Inter-frame Space (CFIS) interval must be shorter than Contention Inter-frame Space(CIS) interval is used to ensure that stations attempting to access the medium to send contention message will have precedence over any station attempting to send contention message even when these stations are operating in different IBSS and are located such that they are within interference range but outside reception range; FIG. 3 provides specification for CFIS and CIS durations in detail.

9—Feature set 1, wherein a Propagation Delay Guard Period (PDGP) is used prior to BIS at the start of scheduled beacon period to accommodate time-varying propagation delay between senders and receivers of scheduled beacon frame. Rapid variance in propagation delay of transmitted beacon messages is induced by rapid changes in distance between the sender of scheduled beacon and each receiver as stations scheduled to send beacon messages changes from SBTT interval to the next. IBSS stations should relinquish the channel before start of scheduled beacon period; however due to different perception with regard to start of SBTT interval, the medium may be appear busy for the PDGP duration at some receivers. A CRAM station attempting to send scheduled beacon frame after SBTT interval elapsed since the start of the pervious SBTT period should expect the medium to become idle any time within the PDGP and should consider BIS period started any time during the PDGP once the medium idle condition is sensed.

10—Feature set 1, wherein Contended Beacon Deferral Period (CBDF) is used before a CRAM station that was not able to receive any beacon frame in the current SBTT period is allowed to send a beacon frame during the contended beacon period. CRAM stations that was not able to receive beacon frame after elapse of scheduled beacon period contend to send a beacon frame for the IBSS by ensuring that the channel is idle for BIS period plus a random Beacon Back-off Period (BBP) determined by selecting a random number of slot-times in a range between 0 and the higher value of 14 or number of entries in IBS. CRAM stations must wait for BIS period to elapse and should decrement the BBP for each slot-time period elapses while the channel is idle until the BBP count becomes zero at one of the CRAM stations and that stations sends a beacon frame. All CRAM station attempting to send a contended beacon frame detect that medium is not idle; these stations suspend their BBP count down and resume the contended beacon transmit process when the medium becomes idle until they are able to send or receive beacon frame. This method along with method in feature set 9 ensure that within an IBSS geospatial coverage there should be one attempt to send scheduled beacon frame and possibly one or more transmitted contended beacon frames within a single SBTT period.

11—Feature set 1, wherein IEEE 802.11 CSMA/CA fair contention access MAC, or any fair CSMA/CA MAC, is used to transmit frames during contention period such that Contention Back-off Period is longer than the Contention Free Back-off period to ensure that contention free access will always have precedence over contention access.

12—Feature set 1, wherein data exchange during contention period must use Request-to-Send (RTS) and Clear-to-Send (CTS) prior to sending Data frames that exceed preprogrammed threshold length to reduce collision cost and mitigate potential interference from hidden nodes as defined in IEEE 802.11 specifications, or any other CSMA/CA technique.

13—Feature set 1, wherein station transceiver may be designed to utilize one shared channel in half-duplex mode, where a sequence of MAC frames exchange between two stations must include Short Inter-Frame Space SIFS long enough to allow transceiver to switch between transmit and receive modes as depicted in FIG. 3, and similar to the SIFS technique described in IEEE 802.11 standard specifications.

14—Feature set 1, where all MAC management frames used to synchronize IBS and CFPS will include a control field, duration field, Receiver address, transmitter address, an IBSS-ID field, sequence field, information field and Frame check sequence field that will included a CRC32 value for the frame as depicted in FIG. 4 and FIG. 5. Stations will employ a duration field in header of all MAC frames as method to communicate to all stations that share the channel and able to receive the MAC frame how long the medium will be busy, this is similar to Network Allocation Vector field (NAV) technique used in IEEE 802.11.

15—Feature set 1, wherein the header for Request-to-Send (RTS) and Clear-to-Send (CTS) frames when used in Contention Free Period (CFP) shall include receiver MAC address field as well as transmitter MAC address field in addition to control, IBSS-ID, and frame check sequence fields as depicted in FIG. 6.

16—Feature set 1, wherein channel access for initiating transmission during a reserved Contention Free Period (CFP) listed in all CFPS received in beacon frames in the current SBTT, and listed in the local CFPS of the station that reserved the CFP requires that station to await for the CFP time offset to elapse after start of the current SBTT interval; then await for CFIS deferral period to pass while the channel remains idle, and then send the MAC frame without use of any Random Back-off period.

17—Feature set 16-, wherein stations sending data during CFP are not required to use CTS/RTS prior to sending a data frame even when the transmitted frame size exceeds the preconfigured CSMA/CA threshold value that require use of CTS/RTS when data frames is sent in contention period.

18—Feature set 16-, wherein during any SBTT interval a station may use any CFP listed in its local CFPS and listed in every CFPS received in beacon frame during the same SBTT interval to solicit another station for any pending data by sending RTS frame to that station immediately after elapse of the CFIS for that CFP; the NAV in the CTS frame will reflect the remaining duration of the CFP; and if the CTS destination station had data pending for transmission to the soliciting station, then it should respond with a data frame that could be transmitted within the remaining time in the CFP while allowing time for the original station to respond with an ACK frame.

19—Feature set 16-, wherein during any SBTT interval a station may use any CFP listed in its local CFPS and listed in every CFPS received in beacon frame during the same SBTT interval to solicit all IBSS stations that may have messages pending to send to the soliciting station by broadcasting CTS frame immediately after elapse of CFIS for that CFP; stations that have data pending for that station should consider the remaining time in that CFP as an idle contention time period and stations with data pending for the stations that reserved the CFP should compete to send any pending data frames for that station using the CSMAICA access method.

20—Feature set 16-, wherein stations should not use CFP to attempt to retransmit a data frame to a destination when the frame was transmitted in that CFP and the ACK frame was not received unless the station is able to resend the frame and receive ACK before the end of that CFP. Stations may utilize CSMA/CA access method during current SBTT interval when attempting to send a data frame that it failed to send during CFP in the same SBTT.

21—Feature set 16-, wherein a station is required to send frames during its contention free periods to prevent CRAM stations from reclaiming the CFP if MAXIMUM-inactive-CF-Periods consecutive SBTT intervals elapse without sensing energy or receiving any frame that was transmitted from or received by the station that was allocated that CFP.

22—Feature set 1, wherein the MAC address of station that initiated the IBSS, IIMS, is used to establish globally unique IBSS Identifier (IBSSID) by setting the individual/group bit of the IIMS MAC address to 0 and the Universal/local bit to 1. Including the IBSSID value as mandatory information element in every beacon frame to allow MS stations to detect when they move from communication range of one IBSS coverage area into the geospatial coverage region of another IBSS.

23—Feature set 1, wherein an IBSS extended Superframe structure consisting of consecutive Superframe periods where a beacon frame transmitted by the IIMS during scheduled beacon period demarks the start of Extended Superframe Structure.

24—Feature set 1, wherein a power constraint station may use the Extended Superframe structure and MAC addresses of station scheduled to transmit beacon to demark and identify inter-beacon (SBTT) interval that a station operating in power save mode will switch from sleeping to listening mode. The station is required to broadcast this information from time to time to allow stations within its vicinity to be aware when it will be awake.

25—Feature set 1, wherein CRAM stations employ a decentralized CFP allocation algorithm designed to avoid placement of contiguous contention free periods within an IBSS Superframe time structure to reduce the probability of collisions within contention period following a set of contiguous contention free periods in the IBSS Superframe time structure, increasing the time were the channel access is blocked for many channel will increase the probability of having more than one station with pending traffic ready for contention when the channel is idle.

26—Feature set 1, wherein CRAM stations employ a decentralized CFP allocation algorithm designed enforce a maximum allowed duration of CFP and maximum ratio between aggregate CFPs durations relative to aggregate CPs durations within the IBSS Superframe structure to reduce collision potential during CPs as a result of maintaining sufficient bandwidth for contention traffic as well as minimizing the duration of periods where all contention traffic is blocked. The Maximum duration of CFP and Maximum ratio of aggregate CFPs durations to aggregate CPs durations are configured parameters.

27—Feature set 1, wherein CRAM stations can be programmed to support pre-provisioned static mode of $D^2QMAC$ IBSS operation where same contents of the IBS is manually configured in each CRAM station to provide a fixed and permanent list of MSs responsible for generating scheduled beacon frames for each IBSS.

28—Feature set 1, wherein CRAM stations can be programmed to support of dynamic management of IBSS Beacon Schedule (IBS) content, where IBSS content is setup on-demand as MS stations join and leave an IBSS. This dynamic IBS management approach offers more flexibility and is supported when $D^2QMAC$ IBSS is configured to operate in on-demand mode.

29—Feature set 1, wherein beacon frame body will include information element as described in Table 1 D2QMAC Beacon Frame Body Contents where some information element are not used in $D^2QMAC$ system but maintained in beacon frames for backward compatibility with IEEE 802.11 standard.

30—Feature set 29-, wherein IBSS Beacon Schedule (IBS) is mandatory information element in beacon frame in order to disseminate to all CRAM mobile stations within range the local contents of IBS as perceived by the station that transmitted the beacon frame.

31—Feature set 29-, wherein the index of the station scheduled to send next beacon frame is included in a mandatory Information element in any beacon frame transmitted using contented beacon access method in order to allow CRAM stations that receive this frame to be able to know the identity of the CRAM station that should send the next scheduled beacon for the IBSS.

32—Feature set 1, wherein a common Contention Free Periods Schedule (CFPS) is used to track reserved CFPs by maintaining an ordered set of 3-tuples consisting of MAC address, CFP duration, and CFP offset from SBTT interval as defined in equation 5. Using the CFPS to store these triples that represent allocated contention free periods as sorted list based on the CFP offset value for each entry.

33—Feature set 29-, wherein CFPS is used as mandatory information element in beacon frames to disseminate currant allocation of contention free periods within the current Superframe interval as perceived by the station that transmitted the beacon frame.

34—Feature set 29-, wherein the offset of beacon frame from start of SBTT should be included in every beacon frame to allow any station the receives contended beacons to be able to identify the timing of any CFP in the CFPS for the IBSS even when the station is not able to receive scheduled beacon frames from that IBSS.

35—The method of 1, where mobile stations are required to utilize decentralized medium access control algorithms designed to minimize collisions during CFP even when contents of CFPS are not synchronized among all IBSS mobile stations. These decentralized algorithms will execute at every mobile station at every SBTT interval; and shall utilize the contents of the local CFPS and the contents of each CFPS received within beacon frames during the current Superframe period in order to determine the access right and the access method allowed during every CFP and CP in the current SBTT interval.

36—Feature set 35-, wherein a station is allowed to use contention free access method only during its CF periods that have entry in the station local CFPS as well as in every CFPS received in beacon frame during the same SBTT interval, as formally described in $CFj=\{CFPk: CFPk \in Aj, Sj$ equals first element in CFPk triple$\}$ Equation 8.

37—Feature set 35-, wherein a station must relinquish the shared channel and should not attempt to use contention or contention free access to initiate any frame transmit at start of any CF period assigned to any other station when the other station CFP triple is listed in the station local CFPS or in any CFPS received in beacon frames during current SBTT interval, as formally described in $Pj=\{CFPn: CFPn \in Dj, Sj$ not equal first element in CFPn triple$\}$ Equation 9.

38—Feature set 35-, where a station shall use CSMA/CA contention access method for its CF periods where the CFP triple for its period if it is listed in its local CFPS but not listed in every CFPS received in beacon frames during current SBTT interval; and the entire duration of that CFP does not overlap with any CFP in any of the CFPS received in beacon frames during the current SBTT interval, as formally described in $CPj=\{CPk: CPk$ does not overlap with any $CFPn \in Dj\}$ Equation 10.

39—Feature set 35-, where a station is permitted to transmit non beacon frames on the shared channel using CSMA/CA contention access method during any period within the Superframe period when data exchange will not overlap with the scheduled beacon period, the contended beacon period, nor with any CFP period listed in the local CFPS or any CFPS received in beacon frames during the current SBTT interval, and Sj equals first element in CFPc triple$\}$ Equation 11 provides a formal description of this feature set.

40—Feature set 1, wherein CRAM stations can be programmed to support IBSS pre-provisioned operational mode where a preplanned fixed partitioning of channel resources is performed by statically configuring the contents of the CFPS in all IBSS CRAM stations listed in the static IBS.

41—Feature set 1, wherein CRAM stations can be programmed to support IBSS on-demand operational mode where channel resources are allocated at run time by CRAM stations and CFPS contents are established when MS reserve CF periods and where CFPS will be updated and maintained synchronized across all IBSS MSs currently listed in the common IBS.

42—Feature set 41-, wherein CF-RSV-REQ frame is used by a station that needs to reserve a CFP by sending it to the station that transmitted a scheduled beacon frame during the current SBTT interval. The CF-RSV-REQ frame body will have two information elements the duration needed for the CFP being reserved and either an information element containing a back-off period value between zero and 7 slot-times that the reserving station must select randomly when it has no need to specify a specific offset within the SBTT period for the reserved CFP, or an information element with value reflecting a specific offset for the CFP that reserving station specifies for the station that sent the scheduled beacon to ensure that the reserved period will be at specific offset from the start of the SBTT. Table 2 CF-RSV-REQ Frame body contents provide detail description of information elements used in this management frame.

43—Feature set 41, wherein CF-RSV-RESP frame is transmitted only by a station that sent a scheduled beacon during current SBTT interval in response to CF-RSV-REQ frame it received within the same SBTT interval. The destination of the CF-RSV-RESP frame shall be the MAC address of the station that sent the CF-RSV-REQ to the station that sent the scheduled beacon. The CF-RSV-RESP frame will contain a result information element; in addition the frame body will contain another information element reflecting the allocated CFP offset value when the result is success. Table 3 CF-RSV-RESP Frame body contents and Table 4 CF-RSV-RESP Frame Result Field Codes provides full description of the contents of the body of CF-RSV-RESP frame.

44—Feature set 1, wherein each CRAM Mobile station will employ a decentralized algorithm that will use IBSS Beacon Schedule (IBS) received in beacon messages transmitted by other stations in the same IBSS to identify differences from its local IBSS Beacon Schedule; updating mobile station local image of IBSS beacon schedule by inserting missing elements listed in the received IBSS beacon schedules; comparing local IBSS beacon schedule against IBSS beacon schedule received from an IBSS CRAM station in order to notify the station that transmitted that beacon about missing elements and location of these missing elements when local CRAM station determines that received IBS is missing elements.

45—Feature set 1, wherein CRAM stations configured to operate in $D^2QMAC$ on-demand mode will be able to utilize IBSS-JOIN-REQ to join the CRAM team responsible for managing resources of an established IBSS by sending this frame to the station that transmitted the scheduled beacon during current SBTT interval, provided that it is one hop away from the station that established that IBSS.

46—Feature set 45, wherein IBSS-JOIN-RESP frame is used to communicate result of a CRAM join attempt; the station that transmitted a scheduled beacon message and received IBSS-JOIN-REQ in the current SBTT period responds to the requesting station by sending IBSS-JOIN-RESP frame with result information element to inform that station and other recipient of the outcome of join attempt.

47—Feature set 1, wherein stations operating in Borders State shall broadcast IBSS-Borders-Exposed-CFPS frame periodically to communicate all contention free periods where the border station is assigned a CFP or where the CFP is assigned to any other mobile stations operating in same IBSS or another adjacent IBSS. The IBSS-Borders-Exposed-CFPS frame will support one information element to list all CFP triples and a second information element providing the time offset between the start of start of this frame and the start of the SBTT period where this frame was sent. CFP Triple will have zero address when CFP entry is formed at the border station that sent the frame by combining overlapping CF periods at adjacent IBSSs.

48—Feature set 1, wherein CRAM station shall send Soliciting-CRAM-Stations frame to declare their intention to establish a new IBSS when they are not able to receive any beacon frames; and method in this feature set wherein, CRAM-solicit-response frame is sent in response to the Soliciting-CRAM-Stations frame in the same SBTT interval to prevent creation of new IBSS and including the current contents of CFPS, the current contents of IBS, and identify the station that should send the next scheduled beacon in three separate information elements in the body of the CRAM-solicit response frame.

49—Feature set 1, wherein CFP-RELEASE-REQ frame may be used by a mobile station operating in $D^2QMAC$ on-demand mode in order to explicitly release a CFP that was previously allocated to it and the station no longer needs this CFP; also this frame can be used to release any CFP that may have been assigned to a station due to protocol anomaly. This frame will be sent to the station that transmitted a beacon frame where the CFP to be released is listed in the CFPS information element in that beacon; and the sender of this frame must be the station that have reserved that CFP as indicated in the IBSS CFPS. The CFP-RELEASE-REQ frame body will support an information element to specify the offset of that CFP and a second information element for the duration of the CFP; the frame header will include the sender MAC address which should match the MAC address of the station that reserved this CFP. The method in the current feature set, wherein the CRAM station that sent a beacon frame and received CFP-RELEASE-REQ will release the CFP and respond to the sender of that frame by sending CFP-RELEASE-RESPONSE frame to complete the CFP release process where the CFP-RELEASE-RESPONSE frame body will include one information element to hold the CFP offset, a second information element for the duration of the CFP; and the frame header will have the destination address set to the MAC address of the station that was allocated that CFP.

50—Feature set 1, wherein IBSS station will employ decentralized algorithms that will rely on use of reverse MAC address comparison function for vendor neutral/independent MAC sorting process and conflict resolution when all other methods recommended to resolve conflict have not identified a preferred conflict resolution.

51—Feature set 1, wherein each CRAM must use decentralized algorithm to synchronize CFPS contents across all CRAM stations by comparing the CFPS contents received in beacon messages (CBCFPS) against the local copy of CFPS in order to identify any differences that may update the local copy of the CFPS (LCCFPS) and other differences that may update the contents of other IBSS CRAM stations; and use of IBSS-SYNC-UPDATE frames as described in equations 1,2, 3 and 4 as well as the flow chart depicted in FIG. 14. IBSS-SYNC-UPDATE frame body format allows sending station to insert multiple instances of Missing-Beacon-Station information element to allow the sending station to inform the destination of one or more missing entries in its IBS. Table 5 IBSS-SYNC-UPDATE Information Elements provides description of the contents and format of IBSS-SYNC-UPDATE frame used to recover for out-of-sync condition between CRAM stations in an IBSS.

52—Feature set 1, wherein IBSS stations are required to support of a finite set of parameters with preset default values in mobile station software that implements $D^2QMAC$ decentralized algorithms along with other parameters necessary to support a CSMA/CA access method wherein the values of these parameters will be included in every beacon frames transmitted and stations shall use values received in beacon frame to reset their local values of these parameters to match the values received in IBSS beacon frames before allowed to participate in using the IBSS shared channel. Section 3.2 provides a list and description of these parameters used by $D^2QMAC$ decentralized algorithms.

53—Feature set 1, wherein the polarity of mobile station participate in CRAM function by playing an equal role in managing and allocating resources of a shared channel and perform admission control function in order to improve overall system robustness by eliminating single point of failure and distributing the expenditure of required energy to perform these function from the limited energy that can be stored in each mobile station.

54—Feature set 1, wherein the boundary of the IBSS is defined by transmission range of mobile station that initiated that IBSS and the communication range of the mobile stations actively participating in an IBSS CRAM function such that these CRAM stations must be operating in either the established or the Joined CRAM functional state, and the maximum distance between the MS that initiated the IBSS and any of these station is one hop. This boundary is selected in order to allow rapid, effective, and efficient dissemination of updates of the contents of the shared CFPS and IBS lists used to manage the shared resources of the channel and perform contention free admission control function. The method in this feature set, wherein the MAC address of the MS that initiated the IBSS is used to produce a globally unique ID for the IBSS and must be an entry in the IBS that lists all active CRAM stations for the IBSS.

55—Feature set 1, wherein the CRAM station that transmitted the scheduled beacon frame during an SBTT interval for an IBSS operating in on-demand mode is the only station during the same SBTT period that other stations must address their request to join the IBSS CRAM list and it is the only station during this period with authority to accept or reject other stations CRAM join requests on behalf of that IBSS. The method in the current feature set where CRAM stations are granted this authority in turns in round robin fashion according to their position in the IBS list as they take turns in transmitting the scheduled beacon frame for the IBSS at start of every SBTT period.

56—Feature set 1, wherein a decentralized CRAM control algorithm that can be implemented using Finite State Machine (FSM) is used by every $D^2QMAC$ station configured to perform CRAM function where this decentralized algorithm controls the behaviors of CRAM station in regard to participation in IBSS beacon frames transmission, scanning the channels to detect any IBSS operating within the reception range, establishing a new IBSS, joining an established IBSS, as well as detection and processing of IBSS split and merge events, FIG. 8 depicts a preferred embodiment of this decentralized control algorithm using a FSM logic showing the states, events and transitions in this FSM. The method in this feature set wherein the decentralized CRAM control algorithm prevents CRAM station from joining an IBSS unless it was able to receive beacon frame from the initiator CRAM station of that IBSS; the decentralized algorithm will ensure that CRAM station send its request to join only to the station that sent a scheduled beacon frame in the current SBTT interval.

57—The method in feature set 56-, where any CRAM station not able to receive beacon frames form the station that initiated an IBSS, IIMS, but is able to receive beacon frames from one or more other CRAM stations is forced to operate as a border CRAM station where it is no longer allowed to transmit scheduled or contended beacon frames for its IBSS.

58—The method in feature set 56-, where any CRAM station that receives beacon frames from one or more CRAM stations of an adjacent dominant IBSS while not able to receive beacon frames from the IIMS of that dominant IBSS are required to operate as border CRAM stations where these border stations are not allowed to send any beacon frames.

59—The method in feature sets 57- and 58-, wherein any border CRAM station is required to revert back to function as any CRAM station within its IBSS whenever that CRAM station is able to receive beacon frame from the IIMS of its IBSS and is not able to receive beacon frames from CRAM stations of another dominant IBSS; and where this CRAM station was able to find its MAC address in the IBS received in beacon frame from the IIMS of its IBSS.

60—The method in feature set 58-, wherein any border CRAM station is required to revert back and operate as the IIMS and start transmitting scheduled beacon and contended beacons for its IBSS when that border CRAM station was the IIMS for its IBSS and it is no longer receiving Beacon frames from any dominant IBSS within its reception range.

61—Feature sets 56- through 62-, wherein any CRAM station is required to leave its IBSS and join an adjacent dominant IBSS when that CRAM station is one hop away from the IIMS of a dominant IBSS. The method in this feature set where a CRAM station considers itself one hop away from IIMS of dominant IBSS when it is able to receive beacon frames from that IIMS.

62—Feature set 56-, wherein any CRAM station that is not the IIMS for its current IBSS is required to establish a new IBSS whenever this CRAM station is no longer receiving any beacon frames from any CRAM station within its receiving range.

63—Feature sets 56- through 62-, wherein a CRAM stations considers an IBSS a dominate IBSS when any of the following conditions occurs: a station is no longer first neighbor of the IIMS of its IBSS while it is first neighbor of the IIMS for an adjacent IBSS, then the adjacent IBSS is the dominant for this CRAM station; a station is first neighbor of IIMS of its IBSS and also first neighbor of one or more IIMS for adjacent IBSSs, then the IBSS with highest ratio of received beacons from its IIMS is considered the dominant IBSS. Also an IIMS or other CRAM station for an IBSS is within reception range of CRAM stations operating in one or more adjacent IBSS but none of the IIMS of these IBSSs, then the IIMS and other CRAM stations are required to perform the following checks in the order provided each time a beacon is received from another IBSS and the CRAM should consider itself within coverage area of another dominant IBSS whenever a condition in this list is satisfied 1—If the CRAM station current CFPS has no entries and the other IBSS have one or more CFP allocated.
2—If the CRAM station local CFPS is a proper subset of the CFPS for the other IBSS.
3—If CRAM station Local CFPS is identical to the CFPS for another IBSS, but the other IBSS has more entries in its IBSS beacon schedule.
4—If the CRAM station local CFPS content does not match the CFPS for other IBSS but its local CFPS has fewer entries than the CFPS of the other IBSS.
5—If CRAM station CFPS has same number of entries as CFPS of the other IBSS but the IBSS beacon schedule for the other IBSS has more entries than the CRAM station's IBSS beacon schedule.
6—If none of the conditions above are met, then if IBSSID for the CRAM station is found to be lower than IBSSID of adjacent IBSS using reverse-MAC compare method, where the Least Significant Octet (LSO) of IBSSID of the CRAM station current IBSSID is smaller than the IBSSID of the other IBSS, and if they are equal the second LSOs is used to compare, continue until all 6 octets are used. Note that IBSSID is global unique since IBSSID in $D^2QMAC$ equals the initiator MAC address which will guarantee that one IBSS will be dominant over other overlapping IBSSs.

64—Feature set 62- wherein a CRAM station attempting to become an IIMS for a new IBSS after being able to construct local CFPS using beacon frames received from its previous IBSS should align the start of the Superframe structure for the new IBSS within a randomly selected contention period inside the SBTT interval of the previous IBSS; and where duration of the randomly selected contention period must be longer than the combined duration of scheduled beacon period and contended beacon period. The method of this feature set, wherein the CFPS scheduled for the newly formed IBSS will have every CFP that was listed in the CFPS of the previous IBSS; and where the offset value in triple for each CFP shall be adjusted to reflect proper timing offset between the original timing of each CFP and the start of SBTT interval of the newly established IBSS instead of the original offset timing between start of that CFP and start of the SBTT interval of the old IBSS. FIG. 10 provides an example of these timing adjustments for SBTT start and offset value for each CFP triple in the CFPS for the newly formed BSS.

65—Feature set 56-, wherein a CRAM station will scan the list of channels to find an established IBSS to join and will establish a new IBSS only after scanning all channels and concluding that its receiver is not within beacon reception range from any other IBSS CRAM stations.

66—The method in feature set 56-, wherein a three-nodes exchange is required to complete an IBSS CRAM join process in order to expand the geospatial coverage area where CRAM stations may receive one or more frames reflecting implicitly or explicitly changes in the contents of the shared IBS before subsequent SBTT starts and the medium becomes available for IBSS stations to request additional changes from the next CRAM station that will be authorized to accept or reject changes in IBS. The method in this feature set where the three nodes exchange consists of request frame to the station that transmitted the scheduled beacon in current SBTT interval, a response frame from the station that transmitted the scheduled beacon in the current SBTT interval, and a confirmation by the CRAM station that sends a beacon frame in the subsequent SBTT interval. FIG. 9 provides an example of IBSS join process and depicts how it increases number of CRAM stations that will be within the reception range of one or more of the frames exchanged during IBSS CRAM join process. The method in this feature set where the beacon frames are leveraged to provide a bandwidth efficient mechanism to confirm that modification in IBS is observed by CRAM station other than the station attempting to join the IBSS and the station that sent the last scheduled beacon that was authorized to accept or reject requests to join the IBSS CRAM list.

Figure 13:
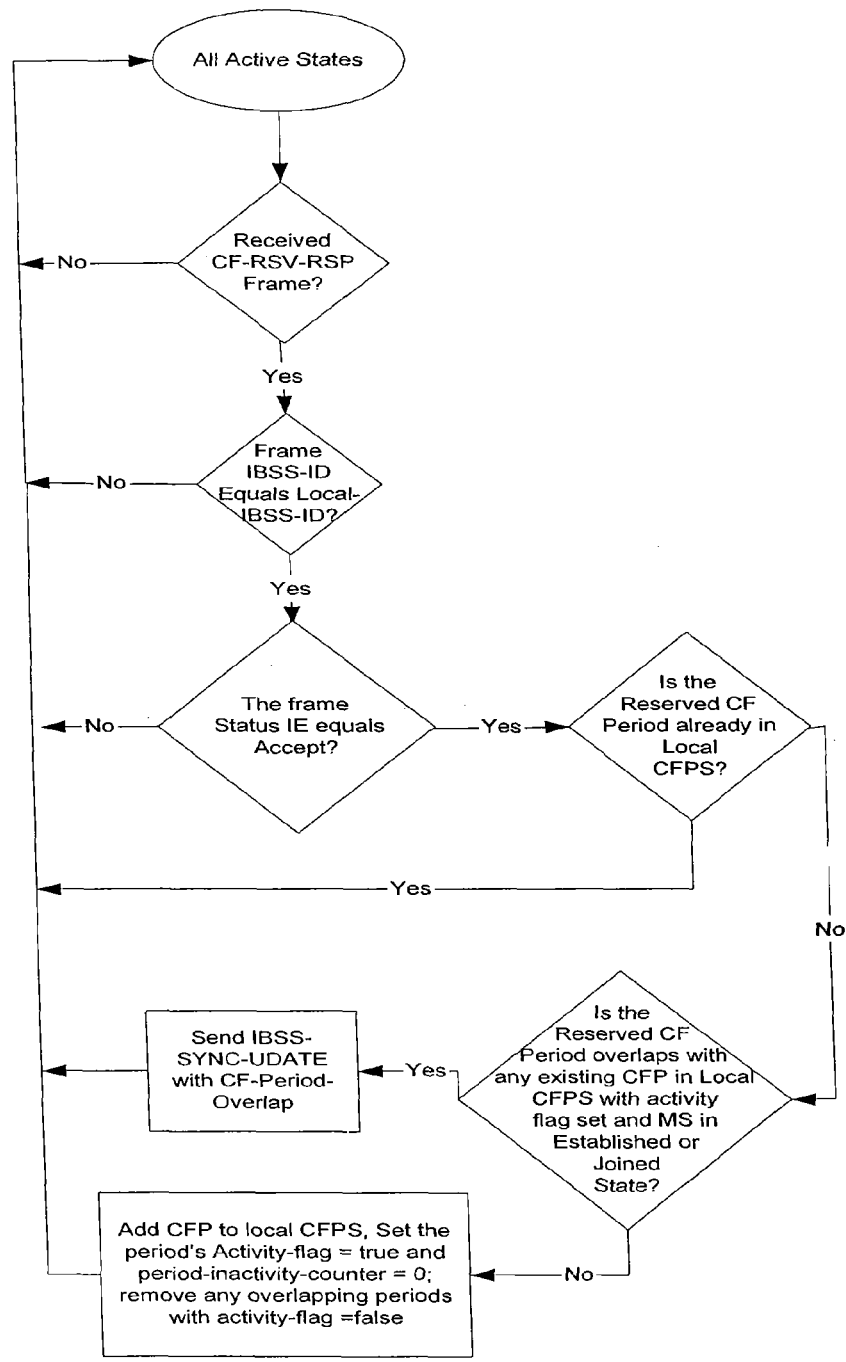
FIG. 13 is an example flow chart of how a MS should add new a CFP to its local CFP.

67—The method in feature set 41-, wherein a decentralized algorithm and three nodes exchange is used to reserve periodic CFP in order to expand geospatial coverage area such that more IBSS CRAM stations will likely be within the reception range of one of the messages transmitted by these three nodes during any CFP reservation process, the method of this feature set where the decentralized algorithm running at CRAM stations will process each reservation request frame that will be sent by IBSS station that desires to reserve a CFP that shall include information elements with the required duration for the period, and a locally produced random time to be added to optimal CFP offset computed by CRAM stations when the reserving station does not wish to dictate where this CFP should start within the IBSS Superframe; or the request frame will have a desired explicit offset for the CFP instead of random time when this periodic CFP must start at specific offset from the start of the SBTT interval; upon arrival of this request at CRAM stations, these stations will evaluate the request to determine if this request should be accepted or rejected based on the current state of the CFPS and desired duration and offset of the reserved CFP; if there is no reason to reject this request and the request was addressed to the station that sent the scheduled beacon from current SBTT interval then all CRAM stations will add a new CFP triple to the current CFPS and the CRAM station that transmitted the scheduled beacon for the current SBTT interval will send a CFP reservation response to the reserving station indicating success and providing the allocated duration and offset for the reserved CFP; however if the CFP can not be accommodated then CRAM stations will not add any entry to the current CFPS and the CRAM station that sent the scheduled beacon for the current SBTT will send to the reserving station a response frame with reject status. At the start of next SBTT interval, CRAM stations will transmit beacon frames with CFPS information element, the reserving station shall not be able to use its periodic CFP unless it finds its triple in next beacon frames; all other CRAM stations that receive beacon frames with new CFP triple should add this CFP to their local CFPS. A CFP reservation request shall be rejected if it was not sent to the CRAM station that sent the scheduled beacon in the current SBTT interval, or if requested duration of CFP exceeds maximum allowed, if the number of periods in CFPS exceeds the maximum allowed, if the CFP desired offset and duration will cause overlap with an existing CFP, if the remaining bandwidth for the channel contention periods will be lower than allowed for the IBSS, if there will be no contention period with duration long enough to accommodate scheduled beacon and contended beacon periods, or for any other configured policy for CFP allocation process. FIG. 11 provides an example of three nodes exchange during CFP reservation process, FIG. 12 provides an example implementation of the decentralized algorithm employed by every CRAM station to process each received CFP reservation request frame, and FIG. 13 provides an implementation of the decentralized algorithm employed by every CRAM station to process each received CFP reservation response frame.

68—Feature set 67-, wherein the CRAM station that sent the scheduled frame during an SBTT period is the only station authorized during that SBTT period to receive contention free period reservation requests from IBSS stations and it is also the only station authorized to respond to each CFP reservation request and indicate acceptance or rejection of the request. The method in this feature set, wherein the authority to perform this task is delegated to each CRAM station at the start of SBTT in round robin fashion as CRAM stations take turns in sending the beacon frame for the IBSS during the scheduled beacon period.

69—Feature set 67-, wherein CFP reservation requests with specific desired offset value can be used by a station residing within reception range of beacons frames sent by its IBSS CRAM stations and beacons sent by CRAM stations of adjacent IBSS to be able to ensure that its CFP(s) are not overlapping with any allocated dedicated beacon periods or CF periods at any IBSS. The station will not be able to use and should abandon and release any of its already allocated CFP when it discovers that any portion of the period duration overlaps with dedicated beacon periods or any CFP in adjacent IBSS, this station should identify a time duration currently used for contention traffic in all adjacent IBSS and should initiate CFP reservation request in all adjacent IBSS with specific desired offset value in each request appropriate for each IBSS SBTT interval timing alignment. The method in this feature set, where a station operating in one IBSS and within reception of beacon frames from adjacent IBSS and discovers that the entire duration of any of its CFP is aligned with contention period in adjacent IBSS shall be able to use that CFP and should reserve a CFP from the adjacent IBSS to protect that CFP traffic from interference from stations in the adjacent IBSS and to prevent any new CFP reservations in the adjacent IBSS from overlapping with that CFP.

70—Feature set 67-, wherein a decentralized algorithm used by IBSS CRAM stations to support explicit CFP release process that may be initiated by any station that does intend to use reserved CFP in the foreseeable future where IBSS station should remove the CFP triple from its local CFPS and send CFP release request frame that includes the period offset and period duration information elements to CRAM stations that send scheduled beacon frames with CFPS information element that includes a CFP for that station where the station does not intend to use that CFP and the CFP is not listed in its local CFPS. The CRAM station that transmitted the scheduled beacon in the current SBTT interval should verify that the station releasing the CFP was allocated that CFP and responds by sending a CFP release confirm frame that includes the released CFP duration and CFP offset information elements. The method in this feature set, where all IBSS CRAM stations upon receive CFP release request frame addressed to the CRAM station that transmitted the scheduled beacon for current SBTT interval or CFP release response from that CRAM station are required to verify that CFP was allocated to the station releasing it, and should remove the CFP triple from its local CFPS if it was listed.

71—Feature set 67-, wherein CRAM stations implement a decentralized algorithm to support implicit release of abandoned CFP(s). IBSS CRAM stations will reclaim any CFP if MAXIMUM-inactive-CF-Periods consecutive SBTT intervals elapse without receiving any frame that was transmitted from or received by the station that was allocated that CFP. The method of this feature set, where IBSS CRAM stations must maintain a counter for each CFP listed in their local CFPS to keep track of idle CFP and CRAM stations reset this counter each time the CRAM station detects energy during the CFP. The CFP counter is incremented when the channel remains idle for the entire CFP or CRAM station was able to receive frames where MAC address of the station that reserved the CFP is not listed as sender or intended receiver.

72—Feature set 1, wherein each IBSS CRAM station shall implement a decentralized CFPS synchronization algorithm to detect and recover from CFPS out-of-sync condition that may occur between one or more CRAM stations operating in the same IBSS. This algorithm will process every beacon frame received from another CRAM station operating in the same IBSS. During each SBTT period, every IBSS CRAM station will use each received beacon frame to detect out-of-sync condition between its local CFPS and the CFPS local to the CRAM station that transmitted beacon for that IBSS. A CRAM station detects and identifies differences by comparing the contents of their local CFPS against contents of the CFPS in the received beacon. The CRAM station notifies the station that transmitted a beacon frame about every CFP that exist in local CFPS missing in the received beacon provided that the missing CFP had its active flag set to true. The CRAM station shall remove from its local CFPS any CFP with active flag set to false that was not listed in a received beacon. However, if the CFP has active flag set, then the station must notify the station that transmitted the beacon that its local CFPS is missing a CFP. In addition, this CFP synchronization algorithm, must identify any CFP listed in the received beacon but missing in local CFP, and should add each missing CFP provided it does not overlap with any other CFP in the local CFPS. When the duration of one or more CFP in the local CFPS overlap with the duration of one or more CFP in the received beacon frame, this synchronization algorithm will replace the CFPs in its local CFPS by the overlapping CFPs in the received beacon, when the number of CFPs in the received beacon exceeds the number of CFPs that overlaps with them in the local CFPS. However, the station should notify the station that transmitted the beacon that it is CFPS is missing CFPS and identify each missing period when the number CFPS in local CFPS exceeds the number of CFPs that overlaps with them in the received beacon frame. This notification will cause the station that transmitted the beacon to update its local CFPS because it will have notification message, IBSS-SYNC-UPDATE, identifying several missing CFPs and the number of the periods will exceed the number of overlapping periods in its local CFPS. When a CRAM station receives beacon frame and discovers overlap in duration between equal number of CFPs in the local CFPS and CFPS in the received beacon, the CRAM station must identify the CFP with lowest MAC address using reverse-MAC compare method. The CRAM station will replace these overlapping CFPs when the CFP with lowest MAC was among the overlapping CFP in the received beacon; However, if the CFP with lowest MAC was in its local CFPS then this CRAM station shall notify the station that transmitted the beacon that its CFPS is missing CFPs by listing these CFPs that overlapped and include a CFP with lowest MAC. This notification will cause the station that transmitted beacon to replace the overlapping CFPs in its local CFPS with CFPs that have a CFP lowest MAC address.

73—Feature set 72-; wherein each IBSS CRAM station shall implement a decentralized algorithm to process IBSS-SYNC-UPDATE frames received with one or more missing CFP entries. This algorithm will add to the local CFPS any CFP listed in the received that does not overlap with any CFP in the local CFPS. In case there are overlap between periods in local CFPS and received IBSS-SYNC-UPDATE frame, then when the number of CF periods in local CFPS exceeds the number of overlapping CF periods in the IBSS-SYNC-UPDATE frame the CRAM station will ignore these overlapping CF periods in the received IBSS-SYNC-UPDATE frame. However, when the number of CF periods in local CFPS less than the number of overlapping CF periods in the IBSS-SYNC-UPDATE frame then these overlapping CF periods will replace the CFP entries that overlaps with them in the local CFPS. When number overlapping entries is equal, then the IBSS CRAM station shall use reverse MAC compare function to identify where is the CFP with smallest MAC address value; and if the smallest entry was in the local CFPS then the CRAM station must ignore the overlapping entries in the received IBSS-SYNC-UPDATE frame; and when the entry with smallest MAC is not in the local CFPS, then the CRAM station must replace the overlapping entries in local CFPS with those entries in the received IBSS-SYNC-UPDATE frame.

74—Feature set 1, wherein each IBSS CRAM station shall implement a decentralized IBS synchronization algorithm to detect and recover from IBS out-of-sync condition that may develop between one or more CRAM stations operating in the same IBSS. This decentralized algorithm shall process every beacon frame received from other CRAM stations within the same IBSS. The algorithm will compare the local IBS contents against the IBS contents in the received frame. The algorithm will add to local IBS all missing entries that don't conflict with current contents of local IBS, these newly inserted entries will be considered inactive entries. In case there is a conflict in contents between local IBS and contents of IBS in the received Beacon where one or more entries in local IBS are missing from the received IBS are positioned at same location of any number of entries found only in the IBS of the received beacon. This decentralized algorithm will consider the contents of IBS for the initiator station are valid. However, when the conflict is detect by non IIMS and the beacon was not sent by IIMS, then the decentralized algorithm will use reverse MAC sort process in order resolve conflicts that may arise when one or more entries in local IBS are missing from the received IBS are positioned at same location of any number of entries found only in the IBS of the received beacon. The algorithm will combine all these conflicting entries from local and received IBS and sort these entries using reverse MAC ordering and ensuring that all inactive and conflicting entries in local IBS are placed after any active entry in local IBS and any conflicting entry in the received IBS. When the received beacon is not sent by IIMS, the decentralized algorithm will use IBSS-SYNC-UPDATE frame to notify the CRAM station that transmitted the beacon of every IBS entry that was missing from its IBS. This algorithm will monitor each IBSS-SYNC-UPDATE frame and update its local IBS by inserting missing entries in local IBS, if they don't exist and shall remove every missing entry from IBSS-SYNC-UPDATE frame that is pending transmission. This IBSS-SYNC-UPDATE frame must be sent if it has at least one information element identifying at least one missing IBS entry and frame can be sent within the same Superframe period where the beacon frame was received.

75—Feature set 1, wherein when operating in $D^2QMAC$ on-demand mode each CRAM station shall implement a decentralized algorithm to detect when any other CRAM station in its IBSS is no longer active in generating beacon frame. This algorithm will remove any station from the local IBS when the number of consecutive missed scheduled beacons from that station exceeds a configurable threshold value where the count of these scheduled beacon misses shall be reset to zero on reception of any scheduled or contended beacon frame from that station.

76—Feature set 1, wherein stations operating in border state shall implement decentralized algorithms that maintain a Border Contention Free Periods Scheduled (B-CFPS) to track all contention free periods assigned in any IBSS that the border station is able to receive its beacon frames. The B-CFPS maintenance algorithm will normalize the offset for each CFP in the B-CFPS to be the duration from the start of SBTT interval for the border station's IBSS. Border station B_CFPS maintenance algorithm will combine overlapping CF periods assigned in its adjacent IBSSs into one contiguous CFP reflecting when this border station is exposed to contention free traffic from adjacent IBSS. The border stations will contend to transmit IBSS-Borders-Exposed frame periodically. This frame will allows border station to inform its neighbors with current contents of its B-CFPS.

77—Feature set 1, wherein stations operating in $D^2QMAC$ on-demand mode use a decentralized scheme to allow rapid detection and prevent collisions when overlapping CFP are assigned in one IBSS as to two different IBSS MS that reserve CFP at different SBTT intervals where the stations that transmitted the scheduled beacon and assigned the CFP in each of these SBTT periods are hidden from each other and sequence of scheduled beacon transmission in the time between these CFP reservations did not allow propagation of CFPS changes to reach the CRAM station that transmitted the scheduled beacon and handled the second CFP reservation. This scheme requires MS station that reserves a CFP without specifying a desired offset to provide a random-back-off-interval value in the reservation request to allow the stations that receive an overlapping CFP an opportunity to detect energy and avoid collisions during CFP transmission. That station that picked the shortest random value will own the duration. CRAM station will resolve this conflict as CFPS propagates across the IBSS through beacon transmission. When two CFPS are out sync such that two overlapping CFP are assigned in the same IBSS, CRAM stations should update their local CFPS by preserving the CFP with shorter offset and releasing the CFP with longer offset.

78—Feature set 1, wherein mobile stations will implement a decentralized Medium access control algorithm that will process received beacon frames every SBTT interval to determine when the station is allowed to send using contention free access method, when it may use contention access to transmit, and when it is required to relinquish the channel and does not attempt to send using any method. These decentralized medium access control algorithms computed the set of CFP triples using set union of contents of CFPS in received beacon frames with contents of local CFPS to identify each CFP assigned to other stations during SBTT interval; the IBSS station must relinquish the channel and prevented from initiating any transmission during these CFPs. The decentralized medium access control algorithms at every SBTT must compute the set intersection of CFPS in received beacons and the local CFPS to identify every CFP that the station reserved and is allowed to use contention free access to transmit in the current SBTT interval. These decentralized medium access control algorithms allow the station to identify any time duration in the current SBTT not overlapping with any CFP listed in the result of set union operation and not overlapping with scheduled or contended periods in the current SBTT as contention period that the station may use CSMA/CA method to transmit traffic. The algorithm allow station to identify any CFP duration that the station reserved and found in the CFPS union set but not in the CFPS intersection set to be accessible using contention access method in the current SBTT period. These decentralized schemes minimize the impact of CFPS out-of-sync condition that may occur temporarily between IBSS stations.

79—Feature set 41-, wherein CRAM stations configured to operate in $D^2QMAC$ on-demand mode may be configured to have a static set of CF periods to be used in any IBSS CFPS; each static CFP will have its duration and MAC address of the station that owns it and these CF periods will never be reclaimed by CRMS stations. Moreover, when conflict arise and any of the static CF periods is found to be overlapping with another CFP during CFPS synchronization or at boundary of adjacent IBSS, the static CFP entry will always be considered dominant CFP by the CRAM station; also station assigned a static CFP should use contention free access method even when its CFP overlaps with other CFP in received beacon. CRAM stations operating in $D^2QMAC$ on-demand mode shall support reservation and release of additional CF periods in the IBSS CFPS according to process described in previous feature sets.

11. Conclusion

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A method of operating a decentralized ad-hoc wireless network including wireless stations, each of the wireless stations including a wireless transceiver configured to wirelessly communicate with each of the other wireless stations over a common wireless channel, comprising:

establishing, through wireless communication between the wireless stations, a common time reference among the wireless stations, which is used by the wireless stations to share access to the common wireless channel, the common time reference having a periodic superframe structure based on a repeating Scheduled Beacon Transmit Time (SBTT) interval, the SBTT interval including
a Scheduled Beacon Period near a start time of the SBTT interval during which only one of the wireless stations is scheduled to transmit a Scheduled Beacon Message to all of the other wireless stations, the Scheduled Beacon Message including wireless network information used by the wireless stations for managing the wireless stations in the ad-hoc network and controlling access of the wireless stations to the common wireless channel,
a Contended Beacon Period, following the Scheduled Beacon Period, during which each of the wireless stations that failed to receive the Scheduled Beacon Message, if any, transmits a respective Contended Beacon Message in contention with any of the other wireless stations that also failed to receive the Scheduled Beacon Message, and
following the Contended Beacon Period,
Contention Periods (CPs) during each of which the wireless stations may contend with each other for access to the common wireless channel for communication with each other over the common wireless channel, and
Contention Free Periods (CFPs) during each of which only one of the wireless stations is scheduled for access to the common wireless channel for communication with each other over the common wireless channel;
granting access, using wireless communication between the wireless stations, to the CPs to at least some of the wireless stations requesting the access to the CPs; and
time-scheduling, using wireless communication between the wireless stations, the CFPs to at least some of the wireless stations requesting access to the CFPs.

2. The method of claim 1, wherein said establishing includes transmitting the Scheduled Beacon Message from each of the wireless stations one after the other in a specific order in successive SBTT intervals according to a Beacon Schedule shared in common across the wireless stations.

3. The method of claim 2, wherein each of the wireless stations is uniquely identified by an address, and wherein the Beacon Schedule includes a list of the addresses of the wireless station arranged so as to indicate the specific order in which the wireless stations are to transmit the Scheduled Beacon Message in the successive SBTT intervals.

4. The method of claim 2, wherein the Scheduled Beacon Message further includes
a Contention Free Period Schedule (CFPS) for a current SBTT interval, wherein the CFPS
defines a timing of the CFPs in the current SBTT interval, and
identities of the wireless stations allocated thereto.

5. The method of claim 2, wherein said scheduling of the CFPs includes transmitting, in the Schedule Beacon Message, a Contention Free Period Schedule (CFPS), the CFPS defining for each said Contention Free Period (CFP) in a current SBTT interval:
(i) when that CFP occurs in the current SBTT interval;
(ii) a duration of that CFP; and
(iii) an identity of the wireless station to which that CFP is assigned for non-contended access to the common wireless channel during that CFP.

6. The method of claim 2, wherein said establishing includes transmitting, during the Contended Beacon Period by each of the wireless stations that failed to receive the Scheduled Beacon Message, if any, a respective Contended Beacon Message in contention with any of the other wireless stations that also failed to receive the Scheduled Beacon Message.

7. The method of claim 6, further comprising, suspending transmission of the Contended Beacon by a wireless station that failed to receive the Scheduled Beacon Message when that wireless station detects that a Contended Beacon was transmitted earlier from another wireless station.

8. The method of claim 2, wherein the Contended Beacon includes
a Beacon Schedule defining the specific order in which the wireless stations are to transmit the Scheduled Beacon Message in the successive SBTT intervals, and
a Contention Free Period Schedule (CFPS) for a current SBTT interval, the CFPS defining a timing of the CFPs for the current SBTT interval and identities of wireless stations allocated thereto for contention free access to the common wireless channel.

9. The method of claim 1, wherein the CFPs are non-contiguous and adjacent CFPs in an SBTT interval are separated from each other by a CP.

10. A method of operating a decentralized ad-hoc wireless network including wireless stations, each of the wireless stations including a wireless transceiver configured to wirelessly communicate with each of the other wireless stations over a common wireless channel, comprising:
establishing, by wireless communication between the wireless stations, a common time reference which is used by the wireless stations to share access to the common wireless channel, the common time reference having a periodic superframe structure based on a repeating Scheduled Beacon Transmit Time (SBTT) interval, the SBTT interval including
a Scheduled Beacon Period near a start of the SBTT interval during, in any given SBTT interval, only one of the wireless stations is scheduled to transmit a Scheduled Beacon Message to all of the other wireless stations,
a Contended Beacon Period, following the Scheduled Beacon Period, during which each of the wireless stations that failed to receive the Scheduled Beacon Message, if any, transmits a respective Contended Beacon Message in contention with any of the other wireless stations that also failed to receive the Scheduled Beacon Message, and
following the Contended Beacon Period,
Contention Periods (CPs) during each of which the wireless stations may contend with each other for access to the common wireless channel for communication with each other over the common wireless channel, and
Contention Free Periods (CFPs) during each of which only one of the wireless stations is scheduled for access to the common wireless channel for communication with each other over the common wireless channel; and
transmitting the Scheduled Beacon Message from each of the wireless stations one after the other in a specific order in successive SBTT intervals, the Scheduled Beacon Message including
a Beacon Schedule identifying the wireless stations and defining the specific order in which the wireless stations are to transmit the Scheduled Beacon Message in the successive SBTT intervals, and a Contention Free Period Schedule (CFPS) for a current SBTT interval, the CFPS defining a timing of the CFPs for the current SBTT interval and identities of wireless stations allocated thereto for contention free access to the common wireless channel.

11. The method of claim 10, further comprising:
maintaining, in each of the wireless stations, local copies of each of the Beacon Schedule and the CFPS;
determining differences between the local copies of the Beacon Schedule and the CFPS and the Beacon Schedule and the CFPS in the Scheduled Beacon Message transmitted in the current SBTT interval; and
updating the local copies of the Beacon Schedule and the CFPS so as to minimize the determined differences.

12. The method of claim 10, further comprising
maintaining, in each of the wireless stations, local copies of each of the Beacon Schedule and the CFPS; and
for each wireless station, transmitting during a CFP in a current SBTT interval only when all of (i) the local copy of the CFPS for that wireless station, (ii) the Scheduled Beacon Message received by that wireless station in the current SBTT interval, if any, and (iii) any Contended Beacon Messages received by that wireless station in the current SBTT interval, indicate, in agreement, that the wireless station is scheduled to transmit in that CFP.

13. The method of claim 10, further comprising, for each wireless station, not transmitting during a CFP in a current SBTT interval when (i) the local copy of the CFPS for that wireless station, (ii) the Scheduled Beacon Message received by that wireless station in the current SBTT interval, if any, or (iii) any Contended Beacon Messages received by that wireless station in the current SBTT interval, indicates that another wireless station is scheduled to transmit in that CFP.

14. The method of claim 10, further comprising, permitting each wireless station to transmit non-Beacon Message data on the common wireless channel using CSMA/CA contention access during any time period within a current SBTT interval if the time period will not overlap the Scheduled Beacon Period, the Contended Beacon Period, nor any CFP listed in the local CFPS for that wireless station or any CFP listed in the Scheduled Beacon Message or any Contended Beacon Message received during the current SBTT interval.

15. A network that uses a common wireless channel, comprising: wireless stations each having a wireless transceiver configured to wirelessly communicate with each of the other wireless stations over the common wireless channel, the wireless stations configured to establish, through wireless communication between themselves,
a common time reference among themselves, which is used by the wireless stations to share access to the common wireless channel, the common time reference having a periodic superframe structure based on a repeating Scheduled Beacon Transmit Time (SBTT) interval,
the SBTT interval including a Scheduled Beacon Period near a start time of the SBTT interval during which only one of the wireless stations is scheduled to transmit a Scheduled Beacon Message to all of the other wireless stations,
the Scheduled Beacon Message including wireless network information used by the wireless stations for managing the wireless stations in a ad-hoc network and controlling access of the wireless stations to the shared common wireless channel,
a Contended Beacon Period, following the Scheduled Beacon Period, during which each of the wireless stations that failed to receive the Scheduled Beacon Message, if any, transmits a respective Contended Beacon Message in contention with any of the other wireless stations that also failed to receive the Scheduled Beacon Message, and
following the Contended Beacon Period, Contention Periods (CPs) during each of which the wireless stations may contend with each other for access to the common wireless channel for communication with each other over the common wireless channel, and
Contention Free Periods (CFPs) during each of which only one of the wireless stations is scheduled for access to the common wireless channel for communication with each other over the common wireless channel,
wherein the wireless stations time-schedule, using wireless communication between the wireless stations, the CFPs in the SBTT interval to at least some of the wireless stations requesting access to the CFPs.

16. The network of claim 15, wherein the wireless stations establish the common time reference by transmitting the Scheduled Beacon Message from each of the wireless stations one after the other in a specific order in successive SBTT intervals according to a Beacon Schedule shared in common across the wireless stations.

17. The network of claim 16, wherein each of the wireless stations is uniquely identified by an address, and wherein the Beacon Schedule includes a list of the addresses of the wireless station arranged so as to indicate the specific order in which the wireless stations are to transmit the Scheduled Beacon Message in the successive SBTT intervals.

18. The network of claim 16, wherein the Scheduled Beacon Message further includes
a Contention Free Period Schedule (CFPS) for a current SBTT interval, wherein the CFPS
defines a timing of the CFPs in the current SBTT interval, and
identities of the wireless stations allocated thereto.

19. A network that uses a common wireless channel, comprising:
wireless stations each having a wireless transceiver configured to wirelessly communicate with each of the other wireless stations over the common wireless channel, the wireless stations configured to establish, through wireless communication between themselves, a common time reference among themselves, which is used by the wireless stations to share access to the common wireless channel, the common time reference having a periodic superframe structure based on a repeating Scheduled Beacon Transmit Time (SBTT) interval, the SBTT interval including
a Scheduled Beacon Period near a start of the SBTT interval during, in any given SBTT interval, only one of the wireless stations is scheduled to transmit a Scheduled Beacon Message to all of the other wireless stations,
a Contended Beacon Period, following the Scheduled Beacon Period, during which each of the wireless stations that failed to receive the Scheduled Beacon Message, if any, transmits a respective Contended Beacon Message in contention with any of the other wireless stations that also failed to receive the Scheduled Beacon Message, and
following the Contended Beacon Period,
Contention Periods (CPs) during each of which the wireless stations may contend with each other for access to the common wireless channel for communication with each other over the common wireless channel, and Contention Free Periods (CFPs) during each of which only one of the wireless stations is scheduled for access to the common wireless channel for communication with each other over the common wireless channel, wherein the wireless stations take turns transmitting the Scheduled Beacon Message one after the other in a specific order, the Scheduled Beacon Message including a Beacon Schedule defining the specific order in which the wireless stations are to transmit the Scheduled Beacon Message, and a Contention Free Period Schedule (CFPS) for a current SBTT interval, the CFPS defining a timing of the CFPs for the current SBTT interval and identities of wireless stations allocated thereto for contention free access to the common wireless channel, and wherein the wireless stations schedule the CFP in the SBTT interval to at least some of the wireless stations requesting access to the common wireless channel, and wherein the wireless stations each maintain therein local copies of the Beacon Schedule and CFPS.

20. The network of claim 19, wherein each of the wireless stations:

determines differences between the local copies of the Beacon Schedule and the CFPS and the Beacon Schedule and CFPS in the Scheduled Beacon Message transmitted in the current SBTT interval; and updates the local copies of the Beacon Schedule and CFPS so as to minimize the determined differences.

21. The network of claim 19, wherein:

each wireless station transmits during a CFP in a current SBTT interval only when all of (i) the local copy of the CFPS for that wireless station, (ii) the Scheduled Beacon Message received by that wireless station in the current SBTT interval, if any, and (iii) any Contended Beacon Messages received by that wireless station in the current SBTT interval, indicate, in agreement, that the wireless station is scheduled to transmit in that CFP; and wherein each wireless station does not transmit during a CFP in a current SBTT interval when (i) the local copy of the CFPS for that wireless station, (ii) the Scheduled Beacon Message received by that wireless station in the current SBTT interval, if any, or (iii) any Contended Beacon Messages received by that wireless station in the current SBTT interval, indicates that another wireless station is scheduled to transmit in that CFP.

22. A network, comprising:

at least one Independent Basic Service Set (IBSS), where an IBSS includes member wireless communication stations (WSs) that share access to a common wireless channel, the WSs including one or more Channel Resources Allocation and Management (CRAM) stations that each perform CRAM functions, the CRAM stations including an initiator WS (IWS) that initially formed the IBSS, and non-CRAM stations, if any, that do not perform CRAM functions, wherein the CRAM functions include:

establishing, through wireless inter-communication with the other CRAM stations over the common wireless channel, a common time reference for the IBSS including a repeating SBTT interval, the SBTT interval including a period for a Beacon Message during which only one of the wireless stations is scheduled to transmit a Beacon Message, Contention Free Periods (CFPs) during which only one of the wireless stations is scheduled for non-contended access to the common wireless channel, Contention Periods (CPs) during which the wireless stations may contend with each other for access to the common wireless channel;

transmitting a Beacon Message including an IBSS Beacon Schedule (IBS) identifying the CRAM stations and an order in which they are to transmit their respective Beacon Messages in successive SBTT intervals, and a Contention Free Period Schedule (CFPS) that defines a timing of the CFPs in the current SBTT interval, and identities of the wireless stations allocated thereto; and scheduling WSs to the CFPs, wherein each CRAM station performs the CRAM functions only when it is no more than a first predetermined number of hops away from the IWS and no more than a second predetermined number of hops away from at least one other of the CRAM stations.

23. The network of claim 22, wherein a CRAM station that is a member of a first IBSS transitions to a border state in which it stops transmitting Beacon Messages if that CRAM station is more than the first predetermined number of hops away from the IWS for the first IBSS for a predetermined number of SBTT intervals, or receives Beacon Messages from a second IBSS, of which the CRAM wireless station is not a member, that is a dominant over the first IBSS, wherein the second IBSS is dominant if the Beacon Messages in the second IBSS indicate a higher number of CFPs in the second IBSS than that of the first IBSS, or if the number of CFPs is the same, then the number of CRAM stations in the second IBSS is higher than that of the first IBSS, or if both the number of CFPs and the number of CRAM stations are the same, then an address identifying the IWS of the first IBSS and an address identifying the IWS of the second IBSS have a predetermined relationship to each other.

24. The network of claim 23, wherein the CRAM station, from the border state, joins the dominant second IBSS, and thereby becomes a member of the second IBSS, if the CRAM station is no more than the first predetermined number of hops away from the IWS of the second IBSS, wherein the CRAM station is added to the IBS of the second IBSS and begins transmitting Beacon Message in the second IBSS according to the common time reference of the second IBSS.

25. The network of claim 23, wherein:

the CRAM station, from the border state, becomes an initiator WS and forms a new IBSS when the CRAM station fails to receive a predetermined number of Beacon Messages from the first IBSS, wherein, as the IWS of the new IBSS, the CRAM station begins transmitting Beacon Messages for the new IBSS so as to align a start of an SBTT interval of the new IBSS within a randomly selected CP of the first IBSS, and wherein the CFPS of the new IBSS includes every CFP listed in the CFPS of the first IBSS, and wherein, for each CFP listed in the CFPS of the new IBSS, a time offset of the CFP from a start time of the SBTT interval for the new IBSS is such that the CFP in the new IBSS will occur at the same absolute time at which it would have occurred in the first IBSS; and CRAM stations and non-CRAM stations from the first IBSS that receive Beacon Messages from the first IBSS and at least one other IBSS transmits periodically in a Contention Period common to both the first IBSS and the other IBSS an IBSS-Borders-Exposed-CFPS message, including a CFPS for the first IBSS and a time offset from a start of the SBTT interval of the first IBSS in during which the IBSS-Borders-Exposed-CFPS is transmitted.

* * * * *